US005699056A

United States Patent [19]
Yoshida

[11] Patent Number: 5,699,056
[45] Date of Patent: Dec. 16, 1997

[54] TRAFFIC INFORMATION SYSTEM

[75] Inventor: Masato Yoshida, Nagaokakyo, Japan

[73] Assignee: Omron Corporation, Kyoto, Japan

[21] Appl. No.: 580,192

[22] Filed: Dec. 28, 1995

[30] Foreign Application Priority Data

Dec. 28, 1994 [JP] Japan ............................... 6-337432

[51] Int. Cl.⁶ ...................................................... G08G 1/09
[52] U.S. Cl. ........................ 340/905; 340/995; 364/436
[58] Field of Search ............................ 340/905, 995; 364/436, 437, 438

[56] References Cited

U.S. PATENT DOCUMENTS

| | | | |
|---|---|---|---|
| 4,706,086 | 11/1987 | Panizza | 364/436 |
| 5,117,363 | 5/1992 | Akiyama et al. | 340/995 |
| 5,126,941 | 6/1992 | Gurmu et al. | 364/436 |
| 5,133,081 | 7/1992 | Mayo | 340/905 |
| 5,164,904 | 11/1992 | Sumner | 340/905 |
| 5,214,793 | 5/1993 | Conway et al. | 340/905 |
| 5,293,163 | 3/1994 | Kakihara et al. | 340/995 |
| 5,343,399 | 8/1994 | Yokoyama et al. | 340/995 |
| 5,369,588 | 11/1994 | Hayami et al. | 340/995 |
| 5,402,117 | 3/1995 | Zijoerhand | 340/905 |
| 5,428,542 | 6/1995 | Liesveld | 340/995 |
| 5,428,544 | 6/1995 | Shyu | 364/436 |

OTHER PUBLICATIONS

*Proceedings of the Vehicle Navigation and Information Systems Conference.* (VNIS); Individual Comm. Function of RAC: Road Automobile Comm. Sys.; Fukui, et al.; Toronto, Canada; Sep. 11–13 1989; pp. 206–213.

*Ingenieurs de l'Automobile*; Prometheus Les Promesses Seront–Elles Tenues; Paris, France, Nov.–Dec. 1994; pp. 16–17.

*Ingenieurs De L'Automobile*; "Systeme Universal d'Information du Vehicule" (Universal Vehicle Information System); M.H. Sodeikat; Mar. 1, 1994; pp. 38–40.

Primary Examiner—Jeffery Hofsass
Assistant Examiner—John Tweel, Jr.
Attorney, Agent, or Firm—Foley & Lardner

[57] ABSTRACT

Disclosed is a traffic information system high in the ability to collect information. An on-vehicle apparatus is carried on a vehicle, to collect traffic information such as traffic jam information, accident information and weather information. The on-vehicle apparatus comprises a car navigation system, where position information is sensed, and information relating to a traffic jam, an accident and weather are manually entered or are automatically sensed. The on-vehicle apparatus further comprises a laser radar, where the number of vehicles, the speeds of vehicles, and the shapes of vehicles are sensed, and traffic jam information and accident information are created based thereon. Various information collected by the vehicle are transmitted to a center via a repeater. Information processed by the center are transmitted to vehicles again.

56 Claims, 68 Drawing Sheets

Fig. 17

| VEHICLE ID | AREA ID | PRECEDING DATA (TIME, POSITION, VEHICLE SPEED) | TRAVELING LANE | TRAFFIC INFORMATION, WEATHER INFORMATION |
|---|---|---|---|---|
| | | | | |
| | | | | |
| | | | | |

VEHICLE INFORMATION AREA

Fig. 19

| VEHICLE ID | PRECEDING DATA | CURRENT DATA | TRAVELING LANE | OTHER INFORMATION |
|---|---|---|---|---|
| | | | | |
| | | | | |
| | | | | |
| | | | | |

VEHICLE INFORMATION AREA

Fig.30

| SENSING POINT NUMBER | X | Z | Y | RECEIVED LIGHT SIGNAL LEVEL |
|---|---|---|---|---|
| 0 | | | | |
| 1 | | | | |
| 2 | | | | |
| 3 | | | | |
| 4 | | | | |
| ... | ... | ... | ... | ... |
| 997 | | | | |
| 998 | | | | |
| 999 | | | | |

DURATION OF STATE
WHERE NUMBER OF VEHICLES IS LARGE

DURATION OF STATE
WHERE NUMBER OF VEHICLES IS SMALL

DURATION OF STATE
WHERE AVERAGE DISTANCE
BETWEEN VEHICLES IS SHORT

DURATION OF STATE
WHERE AVERAGE DISTANCE
BETWEEN VEHICLES IS LONG

DURATION OF STATE
WHERE AVERAGE SPEED IS LOW

DURATION OF STATE
WHERE AVERAGE SPEED IS HIGH

Fig. 73

| VEHICLE ID | NUMBER OF TIMES OF PROVISION OF INFORMATION |
|---|---|
|  |  |
|  |  |
|  |  |
|  |  |
|  |  |
|  |  |
|  |  |
|  |  |

1

TRAFFIC INFORMATION SYSTEM

BACKGROUND OF THE INVENTION

1. Field of the invention

The present invention relates to a traffic information system for reporting traffic information including traffic jam information, accident information, weather information and the like to a vehicle traveling on a road.

2. Description of the Prior Art

In this type of traffic information system, it is presumed that basic data (the number of vehicles, the speeds of vehicles, etc.) for creating traffic jam information, accident information and weather information are collected. It is desirable that the basic data are collected at as many points as possible, accurately and in real time.

In the existing facilities, vehicle sensors (including television cameras) are only disposed in primary points of a road. An attempt to increase the number of points at which data are collected brings about the necessity of providing various sensors at many points, the cost of which will be considerably high.

SUMMARY OF THE INVENTION

An object of the present invention is to provide a system capable of collecting data relating to traffic at many points, accurately and in real time even if no sensors for collecting data are installed at many points, to provide suitable traffic information.

The present invention grasped from a first point of view includes an individual information collecting apparatus, which is to be used on a vehicle, for collecting individual information relating to traffic or the like and a center apparatus for creating synthesis information relating to a region within a predetermined range on the basis of the individual information transmitted from the individual information collecting apparatus.

The individual information collecting apparatus comprises position sensing means for measuring at least a position to produce position data, manual information entering means for manually entering information representing environmental circumstances, a first transmitter for transmitting individual information including the position data produced by the position sensing means and the information entered by the manual information entering means, a first receiver for receiving the synthesis information transmitted from the center apparatus, and a reporting device for reporting the synthesis information received by the first receiver.

The center apparatus comprises a second receiver for receiving the individual information transmitted from the first transmitter in the individual information collecting apparatus, information processing means for creating the synthesis information relating to a region within a predetermined range on the basis of the individual information received by the second receiver, and second transmitting means for transmitting the synthesis information created by the information processing means to the individual information collecting apparatus. Preferably, the individual information collecting apparatus is provided with clocking means. Time data obtained by the clocking means is included in the individual information and is transmitted to the center apparatus. It is possible to use, as the time data, time at the time point where the second receiver in the center apparatus receives the individual information.

Information relating to an accident, a traffic jam or weather, for example, is entered by the manual information entering means in the individual information collecting apparatus.

The individual information collecting apparatus is used by being carried on the vehicle. There exist a number of vehicles traveling on a road. From many of or some of the vehicles, information representing environmental circumstances of the vehicles are transmitted to the center apparatus. In the center apparatus, it can be judged on the basis of the information what situation occurs and where the situation occurs (where an accident or a traffic jam occurs and on what scale the accident or the traffic jam occurs).

Since the individual information collecting apparatus is carried on the vehicle traveling on the road, necessary information are collected even if no vehicle sensor or the like is provided in various points of the road. Since a driver manually enters information, information indicating how the situation is seen with the human eyes is obtained, whereby suitable judgment is made possible.

In one embodiment, the individual information collecting apparatus further comprises a storage device for storing an identification code of the individual information collecting apparatus or the vehicle carrying the individual information collecting apparatus, the first transmitter in the individual information collecting apparatus transmits at least the position data, the time data and the identification code at least twice at predetermined time intervals, and transmits, in response to entry of the information from the manual information entering means, the entered information and at least the identification code. The information processing means in the center apparatus judges the traveling direction of the vehicle carrying the individual information collecting apparatus on the basis of the position data, the time data and the identification code which are received at least twice.

Consequently, the traveling direction (a lane in which the vehicle is traveling) of the vehicle carrying the individual information collecting apparatus is judged. The flow of traffic on the road is generally bidirectional flow. In many cases, an accident or a traffic jam occurs only in one direction. Since the traveling direction of the vehicle is judged as described above, the direction in the flow of traffic on the road in which an accident or a traffic jam occurs is judged, whereby it is possible to provide suitable traffic information. The individual information collecting apparatus carried on the vehicle may calculate, on the basis of two position data at predetermined time intervals, their displacement vector, judge the lane in which the vehicle carrying the individual information collecting apparatus is traveling on the basis of the displacement vector, and transmit the results of the judgment to the center.

The present invention provides an information collecting apparatus used in the traffic information system.

The information collecting apparatus comprises position sensing means for measuring at least a position to produce position data, manual information entering means for manually entering information representing environmental circumstances, and a first transmitter for transmitting individual information including the position data produced by the position sensing means and the information entered by the information manual entering means. Data representing time at the time of manual entry is included in the individual information if required.

Preferably, the information collecting apparatus further comprises a first receiver for receiving the synthesis information transmitted from the center apparatus and a reporting device for reporting the synthesis information received by the first receiver.

The information collecting apparatus can be implemented utilizing a car navigation system. At least position sensing means and manual information entering means are provided in the car navigation system.

The present invention further provides a car navigation system. The car navigation system comprises position sensing means for measuring a position to produce position data, and manual information entering means for manually entering information relating to at least one of an accident, a traffic jam and weather.

The car navigation system tends to gradually spread. Consequently, a part of the function of the information collecting apparatus is assigned to the car navigation system, whereby it is possible to reduce the economical burden of a person who installs the information collecting apparatus. A car navigation system having all functions of the information collecting apparatus, of course, can be prepared.

A traffic information system according to the present invention grasped from a second point of view comprises individual information collecting apparatus, which is to be used on a vehicle, for collecting individual information relating to the travel of the vehicle and a center apparatus for creating traffic information in a region within a predetermined range on the basis of the individual information transmitted from the individual information collecting apparatus.

The individual information collecting apparatus comprises position sensing means for measuring at least a position to produce position data, a storage device for storing an identification code of the individual information collecting apparatus or the vehicle carrying the individual information collecting apparatus, a first transmitter for transmitting individual information including the position data produced by the position sensing means and the identification code stored in the storage device at least twice at a predetermined time interval, a first receiver for receiving the traffic information transmitted from the center apparatus, and a reporting device for reporting the traffic information received by the first receiver.

The center apparatus comprises a second receiver for receiving the individual information transmitted from the first transmitter in the individual information collecting apparatus, information processing means for creating the traffic information in a region within a predetermined range on the basis of the individual information received at least twice by the second receiver, and second transmitting means for transmitting the traffic information created by the information processing means to the individual information collecting apparatus.

The second invention is characterized in that the minimum data such as at least the position data and the identification code are transmitted to the center apparatus from the individual information collecting apparatus on the vehicle. Further, the second invention is characterized in that the data are transmitted at least twice at a time interval. The transmission is automatically made. The individual information collecting apparatus also transmits, together with the data, time data as required.

The position data and the identification code are received at least twice from the same vehicle, and the time data (transmitted from the vehicle or obtained by sensing time at the time point of receiving in the center apparatus) is added thereto, whereby the traveling direction and the speed of the vehicle can be calculated in the center apparatus. In the center apparatus, it is possible to judge the presence or absence of a traffic jam and judge, if there is a traffic jam, the location of the traffic jam on the basis of the information.

The traffic jam information can include the presence or absence of a traffic jam and the degree thereof.

In a preferred embodiment, the individual information collecting apparatus includes vehicle speed sensing means for sensing the traveling speed of the vehicle carrying the individual information collecting apparatus. The first transmitter transmits data representing the traveling speed sensed by the vehicle speed sensing means to the center apparatus.

Also in the second invention, various data are obtained from the vehicle traveling on the road, whereby special information collecting facilities need not be installed in a number of points of the road.

The second invention further provides an information collecting apparatus used in the traffic information system.

The information collecting apparatus comprises position sensing means for measuring at least a position to produce position data, a storage device for storing an identification code of the information collecting apparatus or the vehicle carrying the information collecting apparatus, and a first transmitter for transmitting individual information including the position data produced by the position sensing means and the identification code stored in the storage device at least twice at a predetermined time interval. Preferably, the information collecting apparatus is provided with clocking means, and time data outputted from the clocking means is also included in the individual information and is transmitted.

More preferably, the information collecting apparatus further comprises a first receiver for receiving the traffic information transmitted from the center apparatus, and a reporting device for reporting the traffic information received by the first receiver.

A traffic information system according to the present invention grasped from a third point of view comprises an individual information collecting apparatus, which is to be used on a vehicle, for collecting individual information relating to traffic or the like and a center apparatus for creating synthesis information relating to a region within a predetermined range on the basis of the individual information transmitted from the individual information collecting apparatus.

The individual information collecting apparatus comprises position sensing means for measuring at least a position to produce position data, a radar for projecting an electromagnetic wave (including light) into a predetermined range, receiving its reflected wave, and creating environmental information representing environmental circumstances of the vehicle on the basis of a received wave signal, a first transmitter for transmitting individual information including the position data produced by the position sensing means and the environmental information created by the radar, a first receiver for receiving the synthesis information transmitted from the center apparatus, and a reporting device for reporting the synthesis information received by the receiver.

The center apparatus comprises a second receiver for receiving the individual information transmitted from the first transmitter in the individual information collecting apparatus, information processing means for creating the synthesis information relating to a region within a predetermined range on the basis of the individual information received by the second receiver, and second transmitting means for transmitting the synthesis information created by the information processing means to the individual information collecting apparatus.

The third embodiment of the invention is characterized in that the environmental information of the vehicle is collected by the radar. The collected information is automatically transmitted to the center apparatus. Since various information are obtained by the radar, it is possible to provide more accurate traffic information.

Examples of the environmental information created by the radar include the position, the shape, the direction of movement and the speed of an object to be sensed existing in the vicinity of the vehicle, the number of vehicles, the distance between vehicles, and the shape of a road.

Preferably, the individual information collecting apparatus further comprises traffic information creating means for creating traffic information on the basis of the environmental information created by the radar. The first transmitter transmits the traffic information created by the traffic information creating means to the center apparatus.

More preferably, the individual information collecting apparatus is provided with vehicle speed sensing means for sensing the speed of the vehicle.

The present invention further provides an information collecting apparatus used in the traffic information system.

The information collecting apparatus comprises position sensing means for measuring at least a position to produce position data, a radar for projecting an electromagnetic wave into a predetermined range, receiving its reflected wave, and creating environmental information representing environmental circumstances of the vehicle on the basis of a received wave signal, and a first transmitter for transmitting individual information including the position data produced by the position sensing means and the environmental information created by the radar.

Preferably, the information collecting apparatus comprises a first receiver for receiving the synthesis information transmitted from the center apparatus, and a reporting device for reporting the synthesis information received by the first receiver.

A traffic information system according to the present invention grasped from a fourth point of view comprises an individual information collecting apparatus, which is to be used on a vehicle, for collecting individual information relating to traffic or the like and a center apparatus for creating synthesis information relating to a region within a predetermined range on the basis of the individual information transmitted from the individual information collecting apparatus.

The individual information collecting apparatus comprises position sensing means for measuring at least a position to produce position data, a sensor for sensing information representing environmental circumstances, a first transmitter for transmitting individual information including the position data produced by the position sensing means and the information sensed by the sensor, a first receiver for receiving the synthesis information transmitted from the center apparatus, and a reporting device for reporting the synthesis information received by the first receiver.

The center apparatus comprises a second receiver for receiving the individual information transmitted from the first transmitter in the individual information collecting apparatus, information processing means for creating the synthesis information relating to a region within a predetermined range on the basis of the individual information received by the second receiver, and second transmitting means for transmitting the synthesis information created by the information processing means to the individual information collecting apparatus.

Preferably, the individual information collecting apparatus comprises clocking means, and time data obtained by the clocking means is included in the individual information transmitted by the first transmitter.

The fourth invention is characterized in that in the individual information collecting apparatus carried on the vehicle, the information representing environmental circumstances is automatically sensed and is transmitted to the center apparatus. The information representing environmental circumstances includes traffic information (accident information, traffic jam information, etc.) and weather information.

Consequently, the sensor is at least one of a sensor for sensing traffic information and a sensor for sensing weather information. Alternatively, the sensor is at least one of a sensor for sensing accident information, a sensor for sensing traffic jam information, and a sensor for sensing weather information. Alternatively, the sensor is at least one of a laser radar, a road surface condition discriminator, and a rainfall sensor.

Thus, the information representing environmental circumstances of the vehicle is automatically collected and is transmitted to the center apparatus, whereby the burden of the driver is reduced. Moreover, the synthesis information processed in the center apparatus is transmitted to the vehicle and is reported, whereby the driver can have more information.

Furthermore, the present invention provides an information collecting apparatus used in the traffic information system.

The information collecting apparatus comprises position sensing means for measuring at least a position to produce position data, a sensor for sensing information representing environmental circumstances, and a first transmitter for transmitting individual information including the position data produced by the position sensing means, an identification code relating to the information collecting apparatus, and the information sensed by the sensor. Preferably, the information collecting apparatus comprises a first receiver for receiving the synthesis information transmitted from the center apparatus, and a reporting device for reporting the synthesis information received by the first receiver.

In the above-mentioned all traffic information systems, communication between the individual information collecting apparatus and the center apparatus is repeated by repeaters as required. The repeaters are provided with suitable spacing at suitable locations in the vicinity of the road.

The first receiver and the reporting device are provided in a large-sized reporting apparatus installed in the vicinity of the road instead of or in addition to being provided in the individual information collecting apparatus. The second transmitting means in the center apparatus transmits the synthesis information to the large-sized reporting apparatus. Traffic information are transmitted once for all to a number of vehicles by the large-sized reporting apparatus.

The present invention further provides a vehicle carrying the information collecting apparatus or the car navigation system.

The present invention grasped from a fifth point of view is characterized in that in all the traffic information systems, the center apparatus comprises means for storing for each identification code the number of times of receiving of the individual information transmitted from the individual information collecting apparatus having the identification code, and means for outputting data relating to the identification code corresponding to the number of times of receiving which reached a predetermined value.

A list of persons who provided individual information the number of times which is equal to or more than the predetermined value is outputted from the center apparatus. Some reward (e.g., a money reward or a commodity reward) is offered to a person who provided many information. Consequently, many persons who try to positively provide information appear, whereby many information are collected in the center apparatus from many locations. It can be expected that traffic information high in accuracy can be created in the center apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 illustrates a vehicle information area of a center;

FIG. 19 illustrates another example of a vehicle information area of a center;

FIG. 29a illustrates a vertical plane of the sensing area, and FIG. 29b illustrates a plane;

FIG. 30 illustrates data at sensing points obtained by a laser radar;

FIG. 73 illustrates the contents of a memory in a center; and

DESCRIPTION OF THE PREFERRED EMBODIMENTS

First Embodiment

Figure 1:
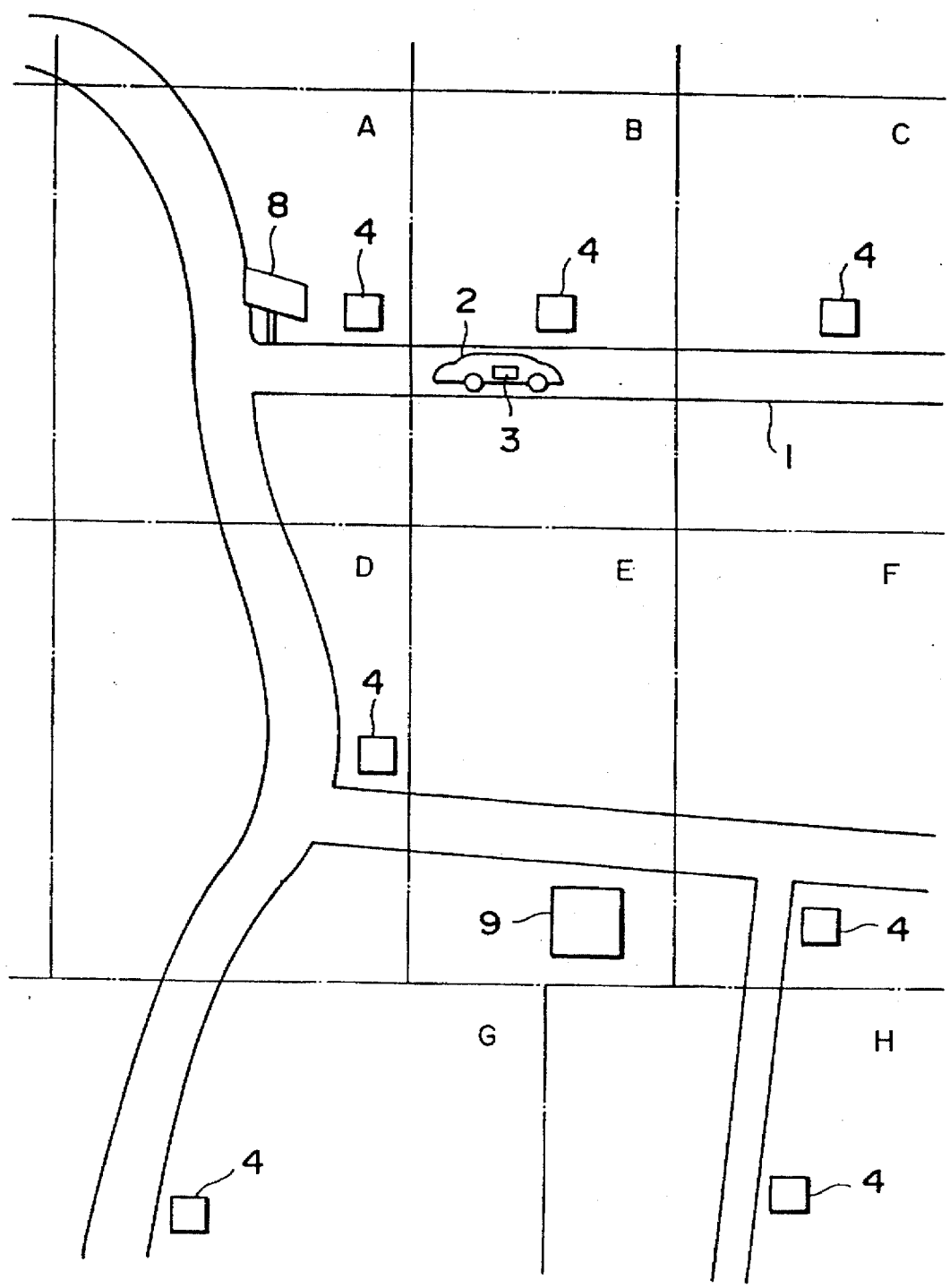
FIG. 1 illustrates the spatial configuration of a traffic information system.

FIG. 1 illustrates the spatial configuration of a traffic information system.

The traffic information system basically comprises an on-vehicle apparatus 3 carried on a vehicle 2 traveling on a road 1, repeaters 4 provided at suitable locations in the vicinity of the road 1, and a center 9. The repeaters 4 are preferably attached to facilities including road-related structures such as a signal, a lamppost, a pedestrian bridge, an overpass and the like, buildings, accommodations and so on. The repeaters, of course, can be also attached to supporting towers dedicated to repeaters. The traffic information system includes a display panel 8, as required. The display panel 8 is, for example, an electric bulletin board, on which information is so displayed using large characters, a drawing, a picture, or the like as to be readable from a distance. It will be preferable that the display panel 8 is also attached to the above-mentioned road-related facilities.

The traffic information system is provided over a region having a proper area. This region may be one having such an area as throughout Japan, Hokkaido, Honshu, Shikoku or Kyushu. Further, the region may be a unit such as the Tokyo district, the Kanto district or the Chubu district. The region may be each administrative district (Prefectures or cities, towns and villages). The region may be over a plurality of administrative districts.

In either case, a region where a traffic information system is provided is divided into a plurality of areas. The area is preferably determined using as a unit a spread or a district suitable for collection of traffic information, a district suitable for control of the flow of traffic, or the like. In FIG. 1, identification codes A to H (hereinafter referred to as area IDs) are respectively assigned to the areas.

Preferably, at least one repeater 4 is provided in one area. A range which can be covered by one repeater 4 may be one area. The center 9 is provided in the area E, and the center 9 serves as a repeater, whereby no repeater is provided in the area E.

Figure 2:
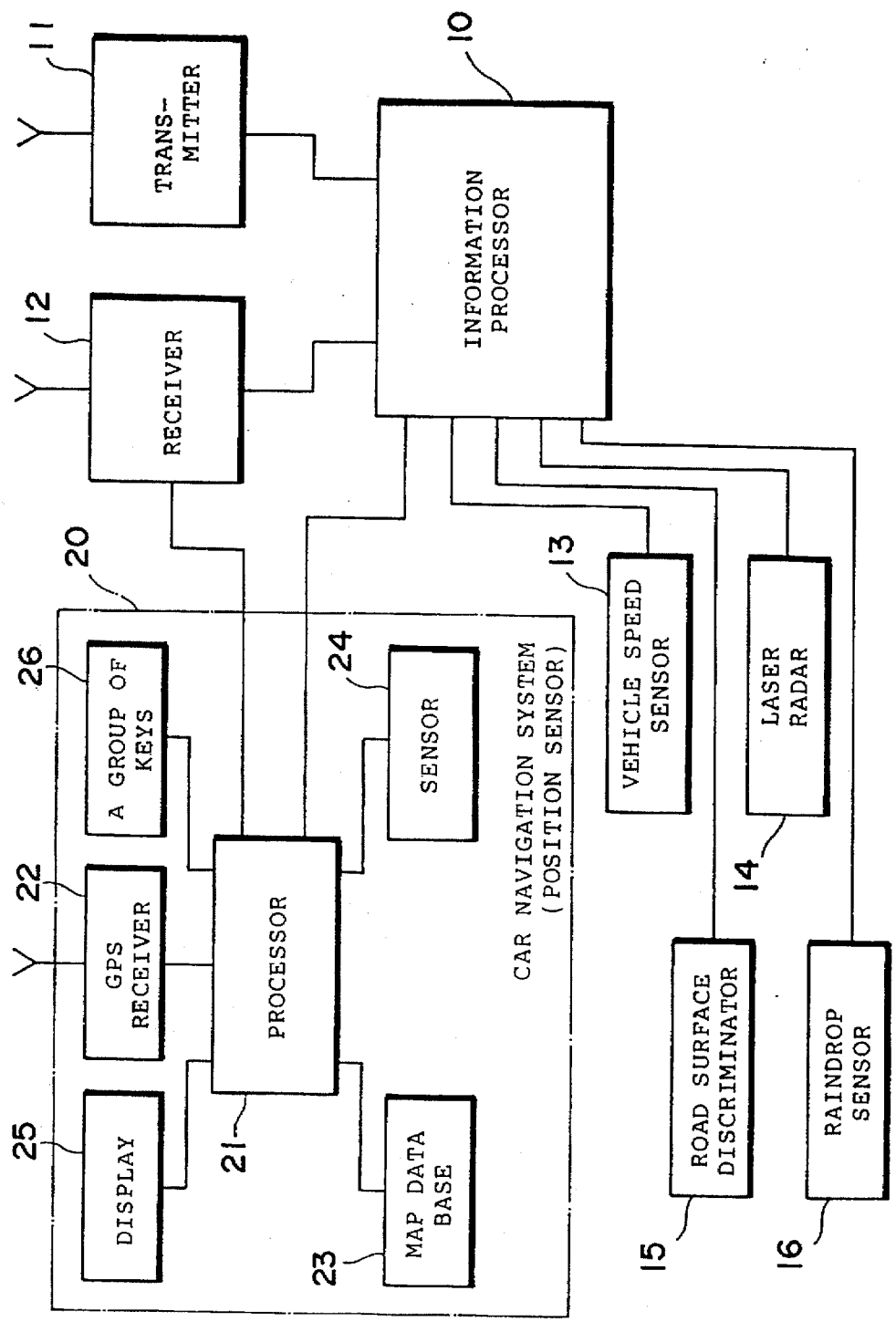
FIG. 2 is a block diagram showing the electrical configuration of an on-vehicle apparatus.

FIG. 2 illustrates an example of the electrical configuration of the on-vehicle apparatus 3 to be carried on a vehicle. The on-vehicle apparatus 3 mainly comprises various sensors, a communication device, and an information processor.

In the present embodiment, a vehicle speed sensor 13, a laser radar 14, a road surface discriminator 15, a raindrop sensor 16, and a position sensor are provided as various sensors. The vehicle speed sensor 13 can be implemented by a speed indicator provided in a standard-sized vehicle.

The laser radar 14 projects laser light toward the front of a vehicle and scans the projected laser light horizontally in one dimension or horizontally and vertically in two dimensions, receives light reflected from an object ahead, and creates information relating to environmental circumstances (the relative speed, the distance to the object, the shape of the object, the shape of a road, traffic jam information, accident information, weather conditions, etc.) by signal processing using the received light signal.

The road surface discriminator 15 projects light onto a road surface, and senses the road surface conditions (wet, freezing, rain, etc.) on the basis of its reflected light and the temperature of the road surface sensed by a road surface thermometer as required.

The raindrop sensor 16 measures the size of raindrops, the amount of rainfall, and the like using light. In the present embodiment, the laser radar 14, the road surface discriminator 15 and the raindrop sensor 16 are not necessarily required. The details of the laser radar 14, the road surface discriminator 15 and the raindrop sensor 16 will be described later.

As the position sensor, a car navigation system 20 is utilized in the present embodiment. The position sensor outputs data representing the position of a vehicle (the latitude, the longitude, and the altitude as required). The car navigation system, of course, need not be utilized as the position sensor.

The communication device comprises a transmitter 11 and a receiver 12, and is mainly used for communicating with the repeaters 4.

The information processor 10 comprises a small computer or a microprocessor, a memory (a ROM, a RAM or a disk storage device as required), an interface circuit, and the like. The information processor 10 carries out such control as to send various information obtained from the sensors 13, 14, 15 and 16 and the car navigation system 20 as is or after processing to the repeaters 4 from the transmitter 11 and output traffic information, weather information, and the like which are transmitted from the repeaters 4 and received by the receiver 12 utilizing a display device 25 in the car navigation system 20 or a voice output unit (a buzzer, a microphone, etc.). A display device dedicated to traffic and weather information may be provided without utilizing the display device 25 in the car navigation system 20.

As is well known, the car navigation system is used for displaying a map and explicitly indicating the current position, the target position, the most suitable path, and the like on the map, and comprises a processor 21, a GPS receiver 22 and various sensors 24 for position measurement, a map data base 23, and a display device 25 and a group of keys 26 serving as a man-machine interface.

The map data base 23 is generally implemented by a CD-ROM, and stores data representing several maps on a reduced scale.

There are various systems for measuring a position. An accurate position is generally found by using a plurality of systems in combination with each other. A GPS (Global Positioning System) is a system for receiving radio waves projected from a plurality of artificial satellites by the GPS receiver 22, measuring the time when the radio waves reach the GPS receiver 22, and calculating the distances from the satellites to know a position. There is a system for receiving radio waves from radio wave transmission facilities (called beacons) provided on the roadside to measure a position. The above-mentioned repeaters 4 function as beacons. A signal for measuring a position is received by the receiver 12, and the received signal is fed to the processor 21. The sensor 24 includes a gyroscope and a wheel speed difference sensor. The processor 21 corrects the position on the basis of the received radio waves and signals from the sensors, using a road map represented by a map data base as required (map matching), to obtain data representing an accurate position.

Figure 3:
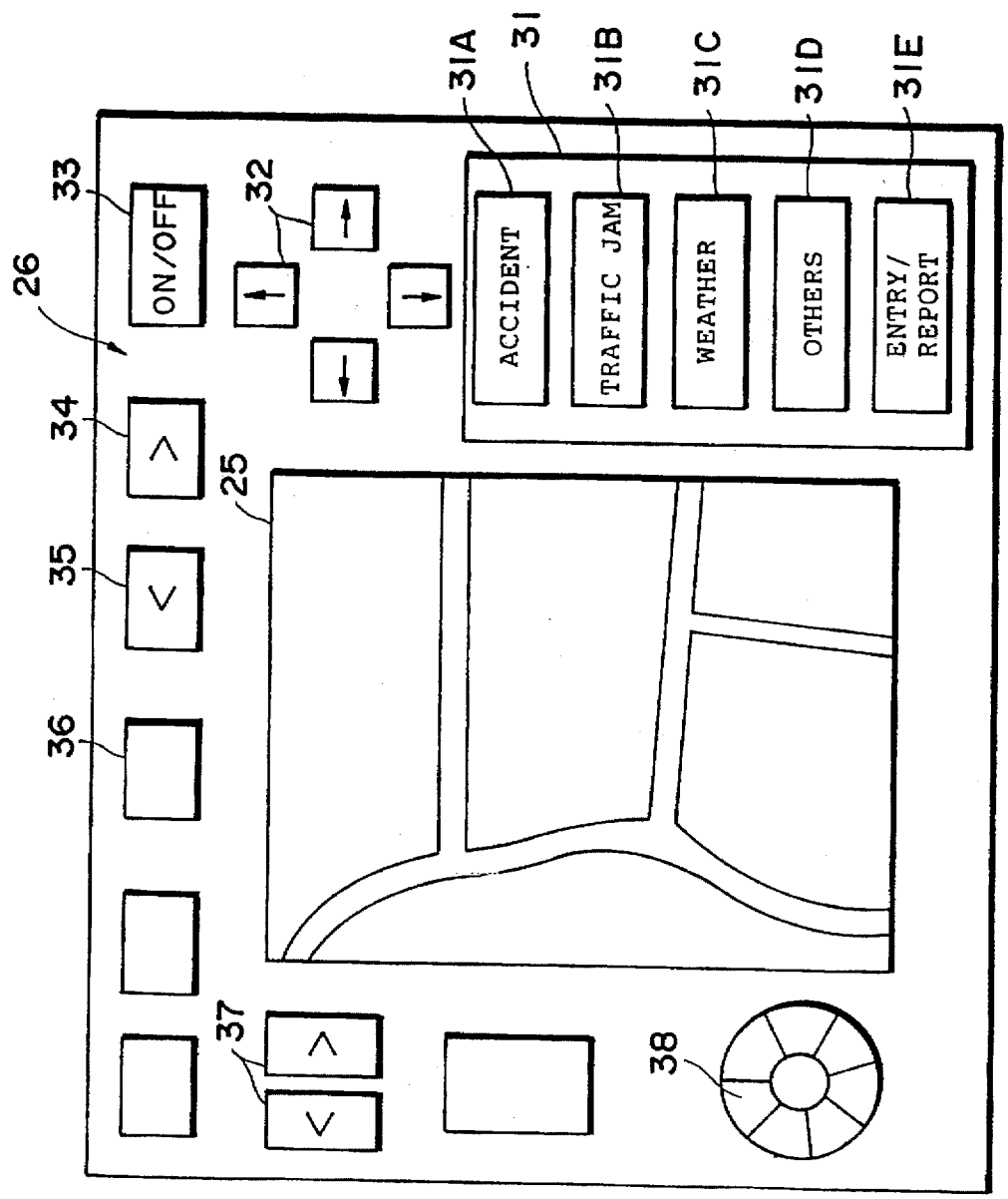
FIG. 3 illustrates a man-machine interface in a car navigation system.

FIG. 3 illustrates a man-machine interface (the display device 25 and the group of keys 26) in the car navigation system 20.

There is a display device (a display screen) 25 in the center, where a map, information from the center 9 or a menu (an entry guide) as described later are displayed. The group of keys 26 is provided around the display device 25.

The group of keys 26 comprises a manual transmission operating unit 31 for a driver manually entering traffic information (accident information, traffic jam information, etc.) around a vehicle carrying an on-vehicle apparatus (hereinafter referred to as the present vehicle), weather information and the other information. The operating unit 31 is also used for entering a command to display the received traffic information, weather information and other information on the display device 25. The operating unit 31 comprises five touch switches 31A to 31E, and their functions are variably displayed on the touch switches 31A to 31E, respectively (the details will be described later). Particularly the touch switch 31E is for selecting either one of an manual information entry mode and an information report mode. The modes are alternately selected every time the touch switch 31E is depressed. In the present embodiment in which the operating unit 31 is used only for the driver entering various information using the touch switches 31A to 31D, the touch switch 31E is not required, and in this case, the operating unit 31 is always in the information manual entry mode. Also in a second embodiment in which the driver need not enter various information, the touch switch 31E is not required. In this case, the operating unit 31 is always in the information report mode.

The group of keys 26 further comprises a key for manually adjusting the displayed position of the present vehicle, a power switch 33 of the car navigation system, keys 34 and 35 for instructing the reduction and the enlargement of a map to be displayed, a switch 36 for switching a television/radio/navigation, a switch 37 for adjusting the brightness of the screen, a knob 38 for volume control, and the like. The volume of a beep sound produced when the vehicle has reached the destination and a voice for guiding traffic information and weather information are adjusted by the knob 38.

FIGS. 4 through 7 illustrate examples of map display on the display device 25 in the car navigation system 20.

Figure 4:
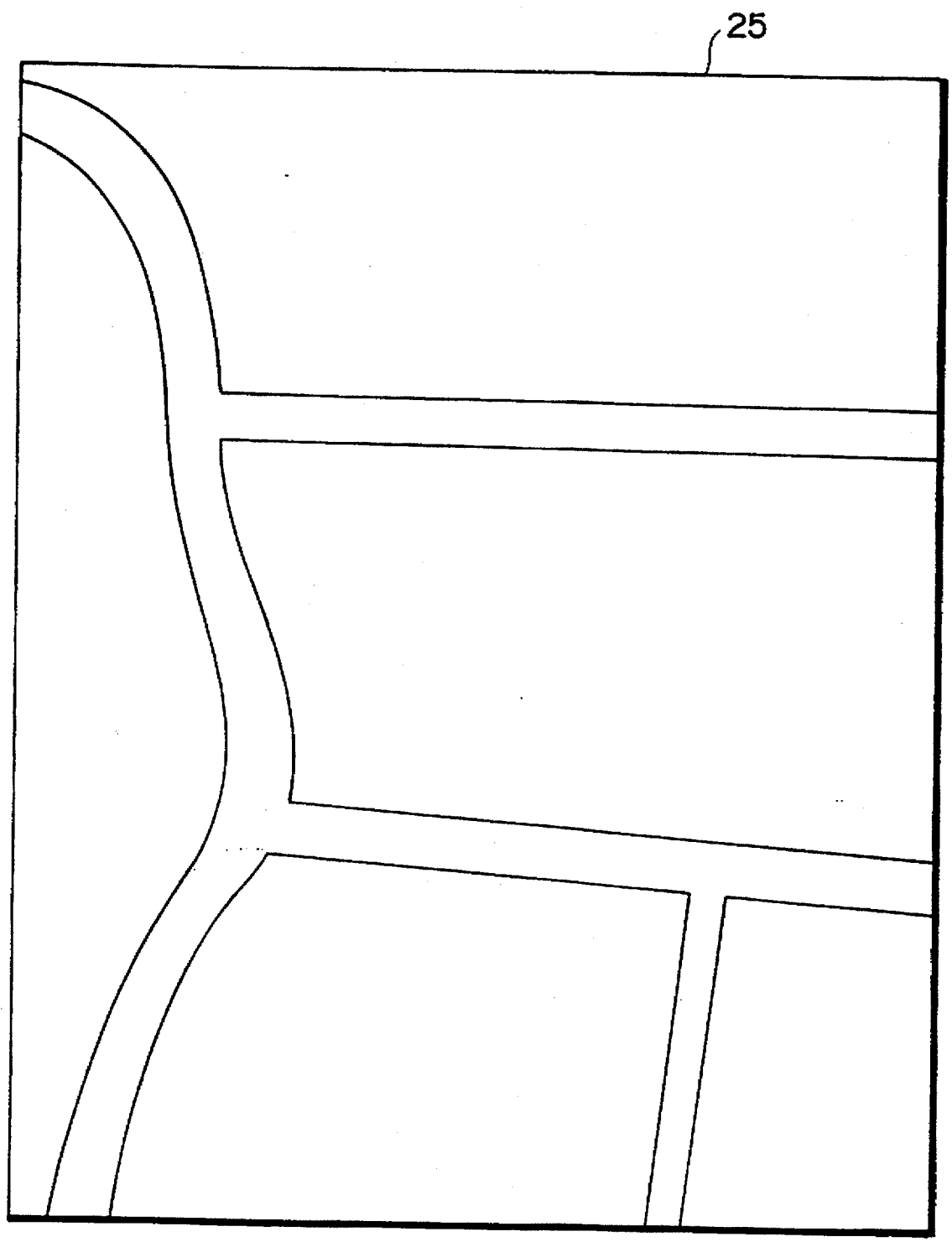
FIG. 4 illustrates an example of display of a road on a display device.
Figure 5:
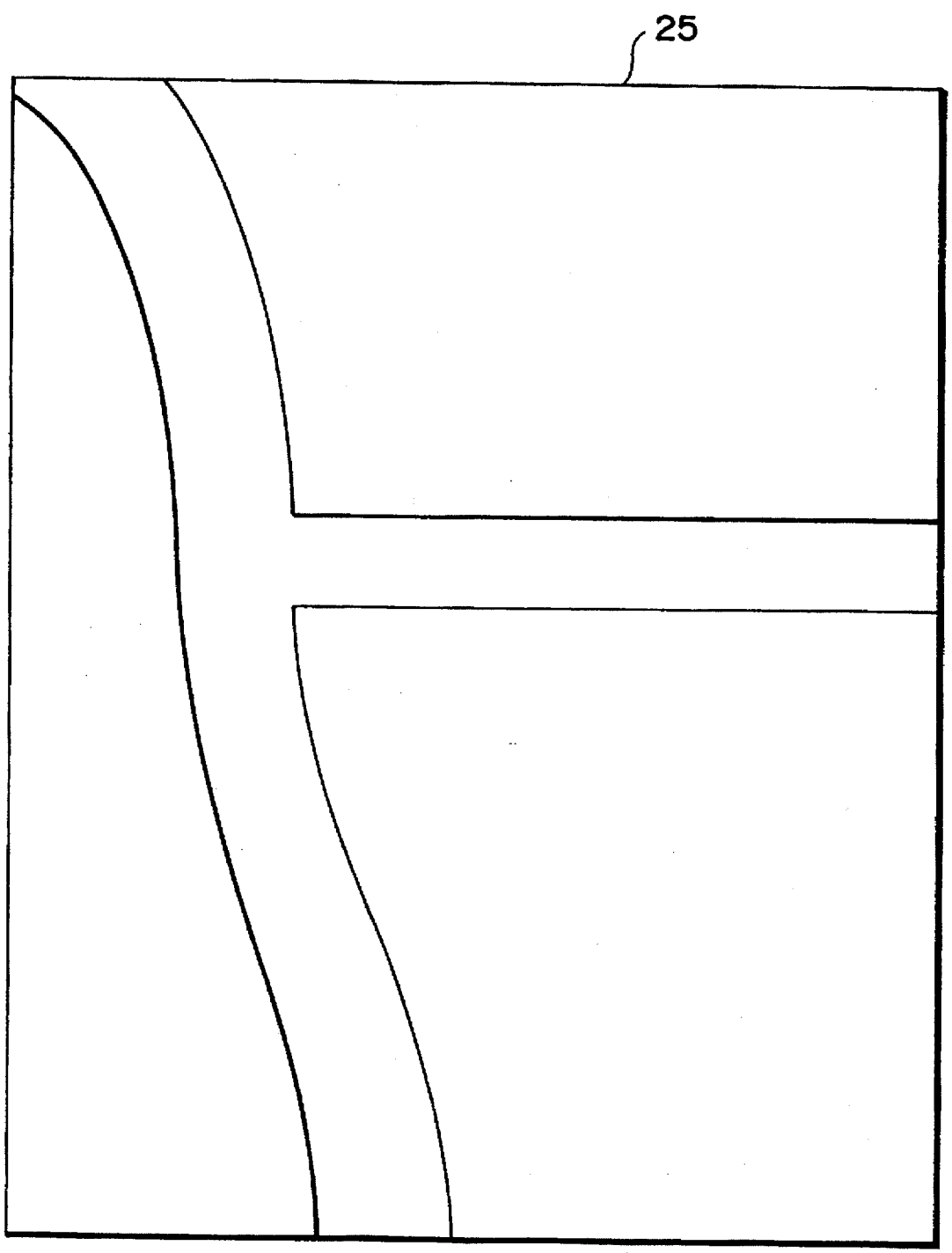
FIG. 5 illustrates an example of enlarged display of a road on a display device.
Figure 6:
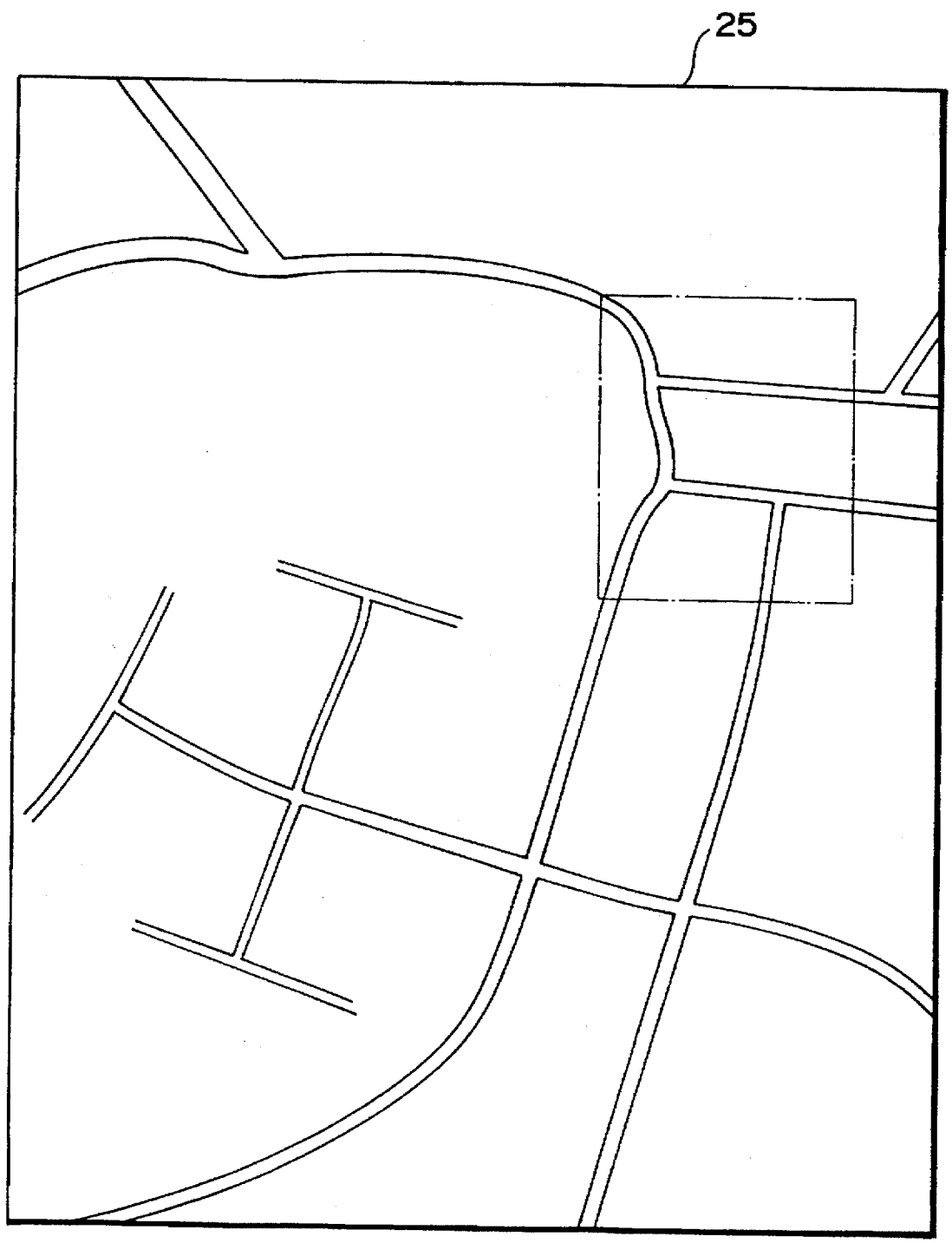
FIG. 6 illustrates an example of reduced display of a road on a display device.
Figure 7:
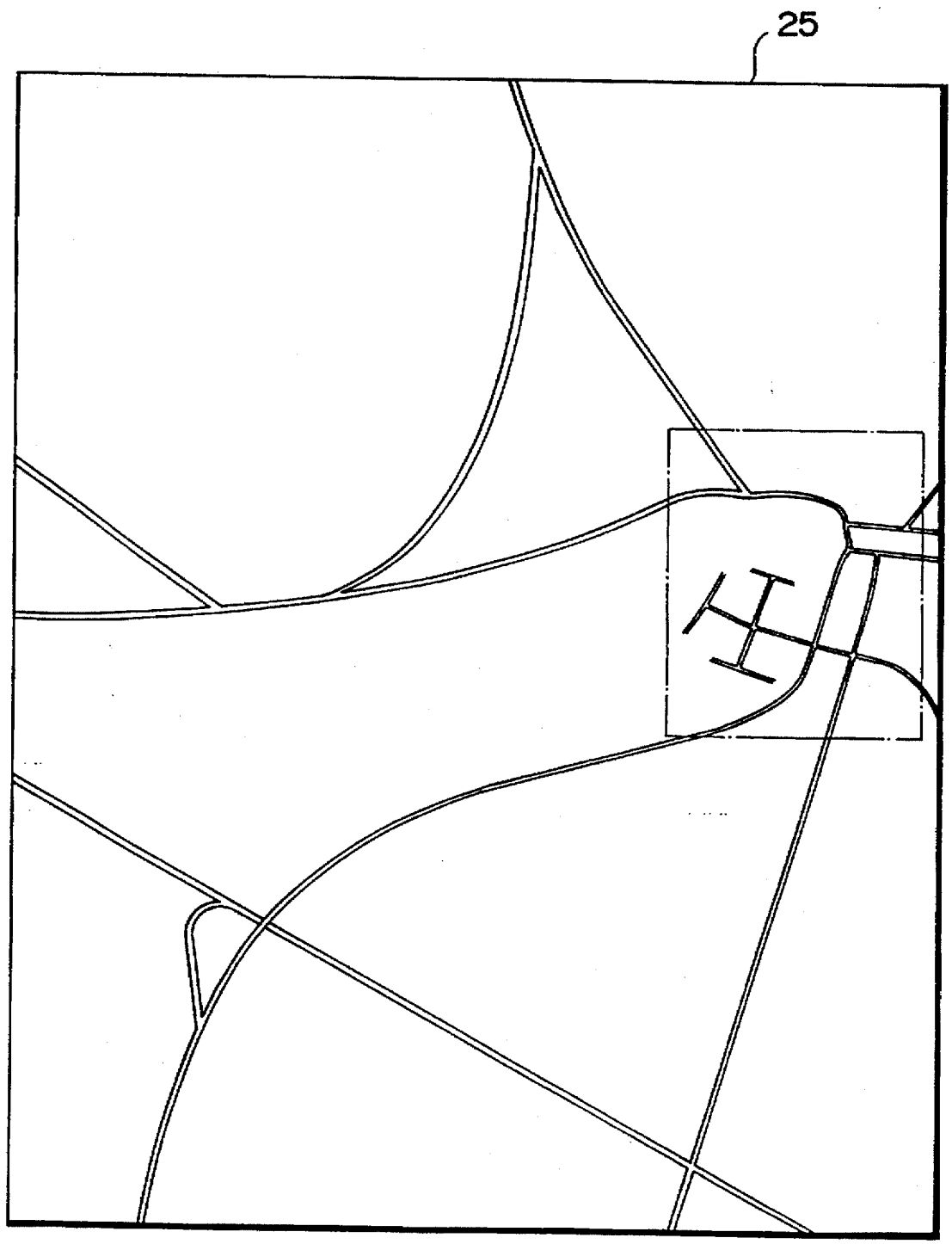
FIG. 7 illustrates an example of still reduced display of a road on a display device.

FIG. 4 illustrates a map on the same scale as that shown in FIG. 3. When an enlargement key 35 is depressed, an enlarged map is displayed as shown in FIG. 5. When a reduction key 34 is depressed in this state, the map is returned to the map on the scale shown in FIG. 4. When the reduction key 34 is depressed again, a reduced map is displayed as shown in FIG. 6. An area before the reduction (the range shown in FIG. 4) is indicated by a dots-and-dashes line. When the reduction key 34 is further depressed, a further reduced map is displayed as shown in FIG. 7. Also in FIG. 7, an area before the reduction (the range shown in FIG. 6) is indicated by a dots-and-dashes line.

Figure 8:
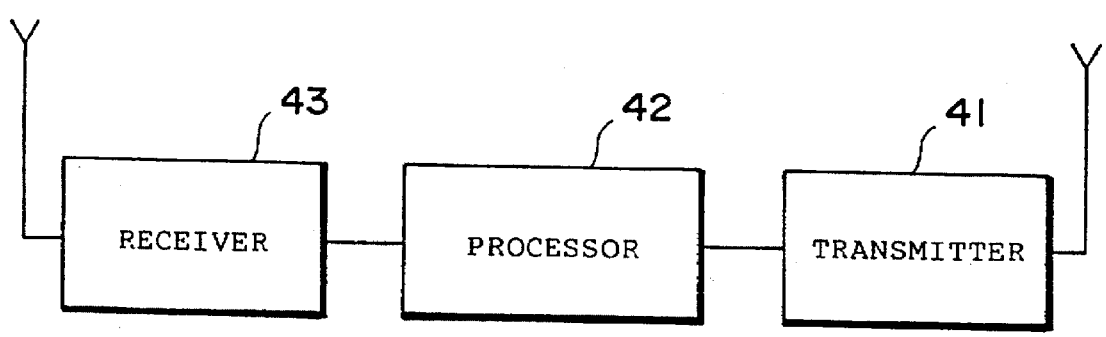
FIG. 8 is a block diagram showing the electrical configuration of a repeater.

FIG. 8 illustrates an example of the construction of the repeater 4. The repeater 4 comprises a transmitter 41, a processor 42, and a receiver 43. The receiver 43 receives radio waves from the on-vehicle apparatus 3 on the vehicle 2 or the center 9, and transfers information included therein to the processor 42. The processor 42 transfers the received information as is or after processing to the transmitter 41. The transmitter 41 transmits the radio waves including the received information toward the center 9 or the on-vehicle apparatus 3 on the vehicle 2. Thus, the information obtained by the on-vehicle apparatus 3 is sent to the center 9 via the repeaters 4, and the information created in the center 9 is sent to the on-vehicle apparatus 3 via the repeaters 4. The processor 42 may be a mere amplifier.

Figure 9:
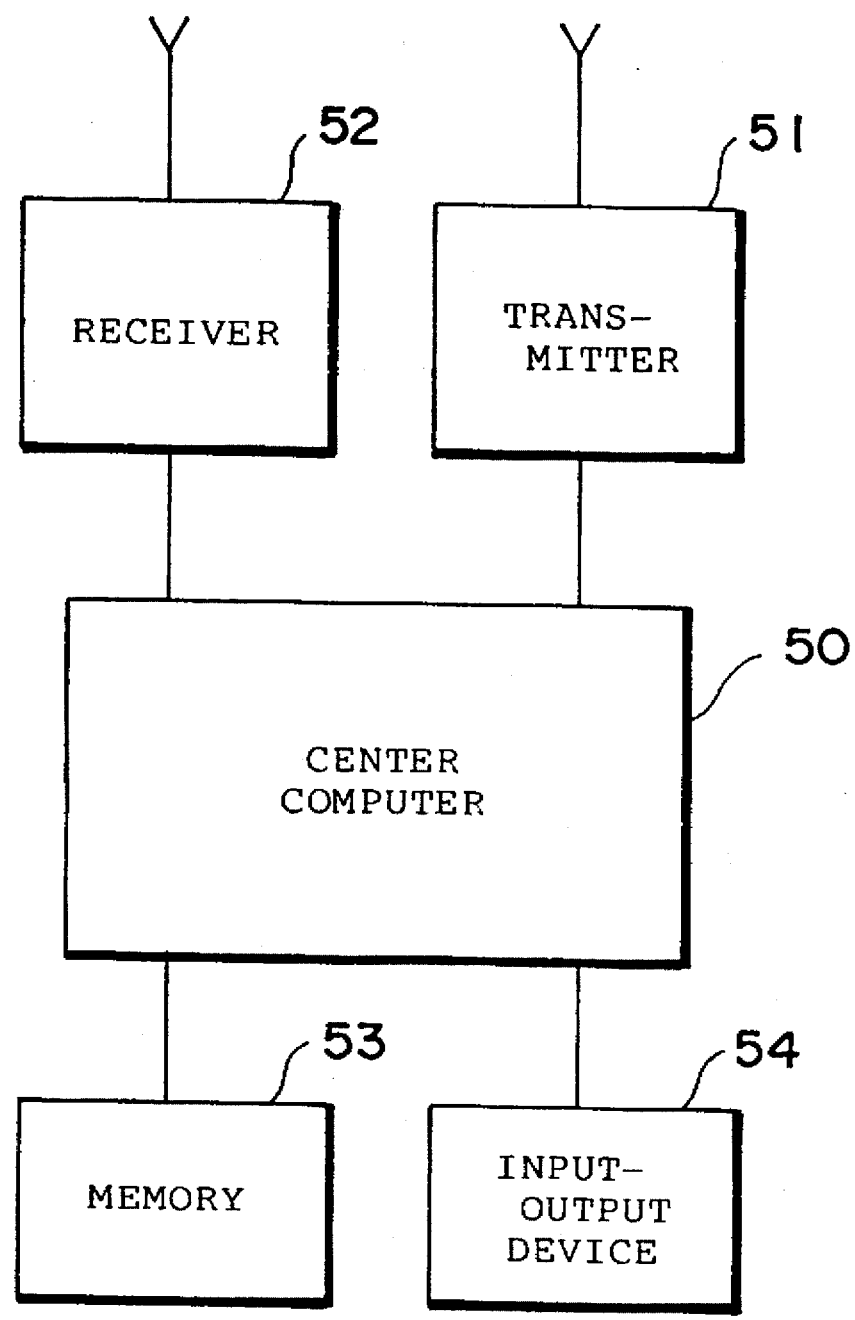
FIG. 9 is a block diagram showing the electrical configuration of a center.

FIG. 9 illustrates a system provided in the center 9. The center system (this is also indicated by reference numeral 9) is basically a computer system, to which a transmitter 51 and a receiver 52 are connected. A memory (a semiconductor memory, a disk memory, etc.) 53 and an input-output device (a keyboard, a display device, a printer, a mouse, etc.) 54 are connected to a center computer 50.

In the present embodiment, the driver enters traffic information, weather information and the other information using the display device 25 and the touch switches 31A to 31E in the manual transmission operating unit 31 in the car navigation system 20, and the entered information are sent to the center 9 from the on-vehicle apparatus 3 via the repeaters 4. Information to be transmitted are accident information, traffic jam information, weather information and the other information.

As shown in FIG. 3, characters "accident", "traffic jam", "weather", "others" and "entry/report" are respectively displayed on the touch switches 31A to 31D in the normal state.

Figure 10:
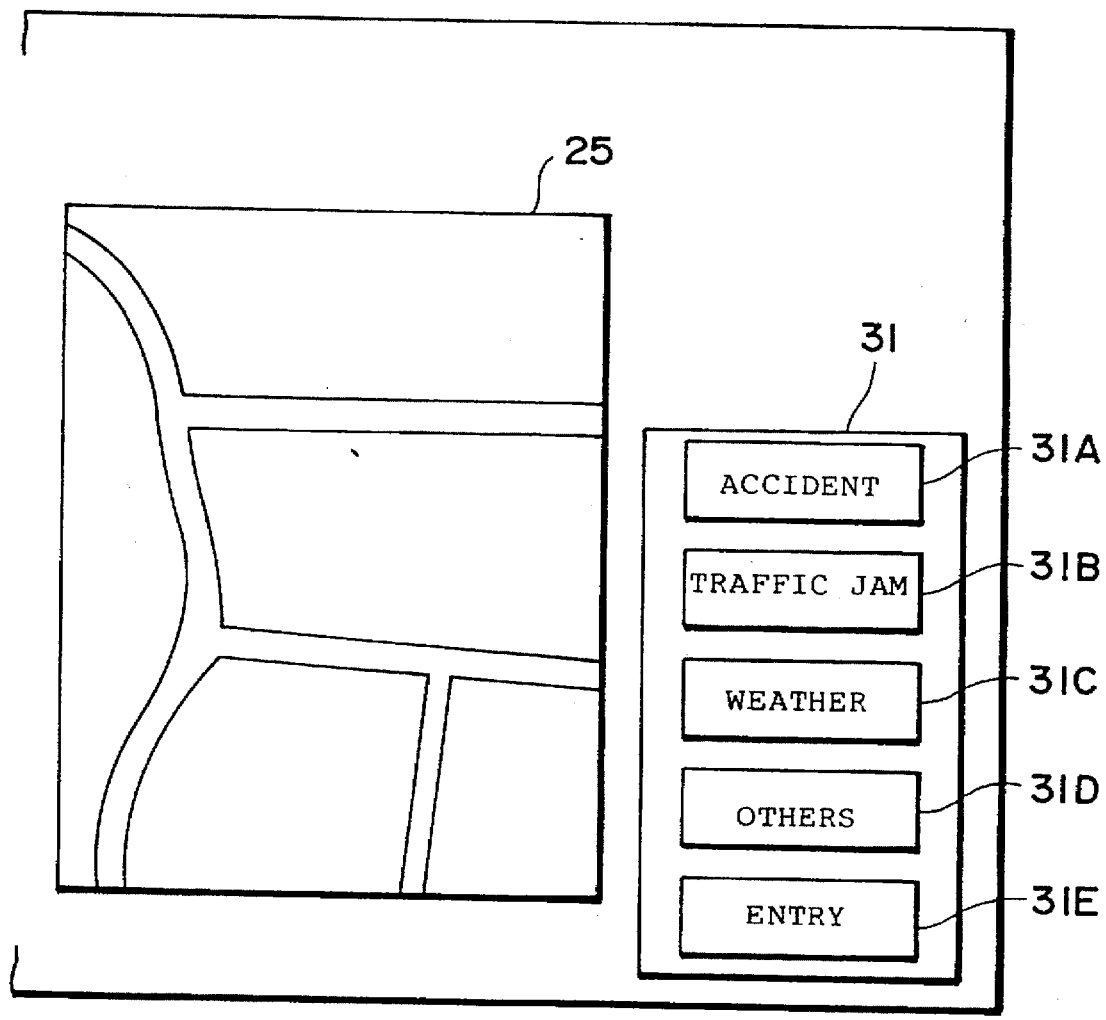
FIG. 10 illustrates the initial state in a case where information is entered from a car navigation system.

When a driver has found out an accident and tries to transmit information relating to the accident, the driver selects the information manual entry mode using the touch switch 31E. As shown in FIG. 10, the characters on the touch switch 31E is changed from "entry/report" to "entry".

Figure 11:
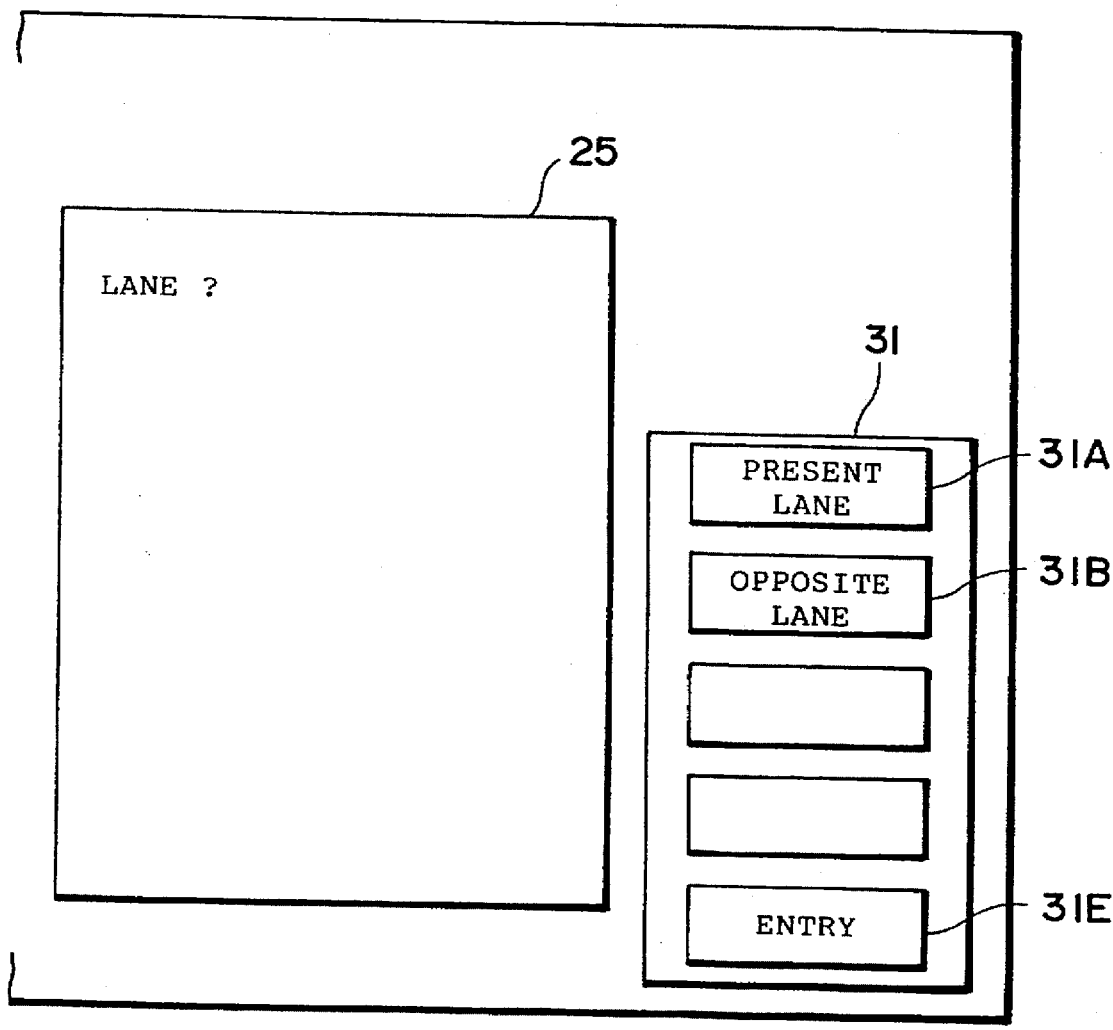
FIG. 11 illustrates a display screen and a group of keys in a case where accident information is entered.

The driver then depresses the touch switch 31A. As a result, the characters displayed on the touch switches 31A to 31D are changed to as shown in FIG. 11. Characters "present lane" representing a lane in which the present vehicle is traveling and characters "opposite lane" are respectively displayed on the switch 31A and the switch 31B. No characters are displayed on the switches 31C and 31D. The driver depresses either one of the switches 31A and 31B, to enter a lane in which an accident occurs.

Figure 12:
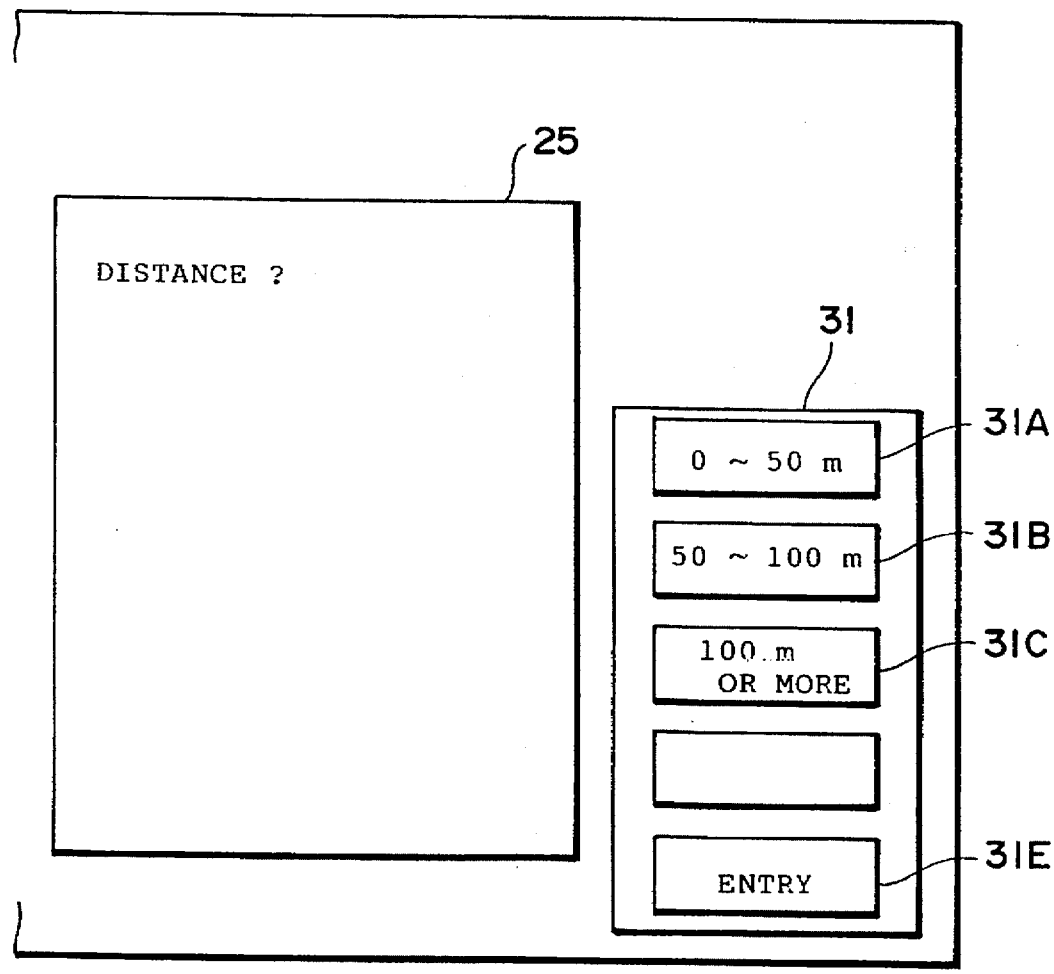
FIG. 12 illustrates a display screen and a group of keys in a case where accident information is entered.

The characters displayed on the touch switches 31A to 31D are changed to as shown in FIG. 12. In order to enter an approximate distance from the present vehicle to the scene of the accident, characters displayed on the touch switches 31A to 31C are "0-50 m", "50-100 m" and "100 m or more". No characters are displayed on the touch switch 31D. The driver enters the distance using the touch switches 31A to 31C.

The vehicle continuously changes its position because it is traveling. The distance from the vehicle to the scene of the accident gradually changes. In order to make the information accurate, data representing the position of the vehicle at the time point where the driver depresses any one of the touch switches in order to enter the distance is stored by the processor 21 in its memory.

Figure 13:
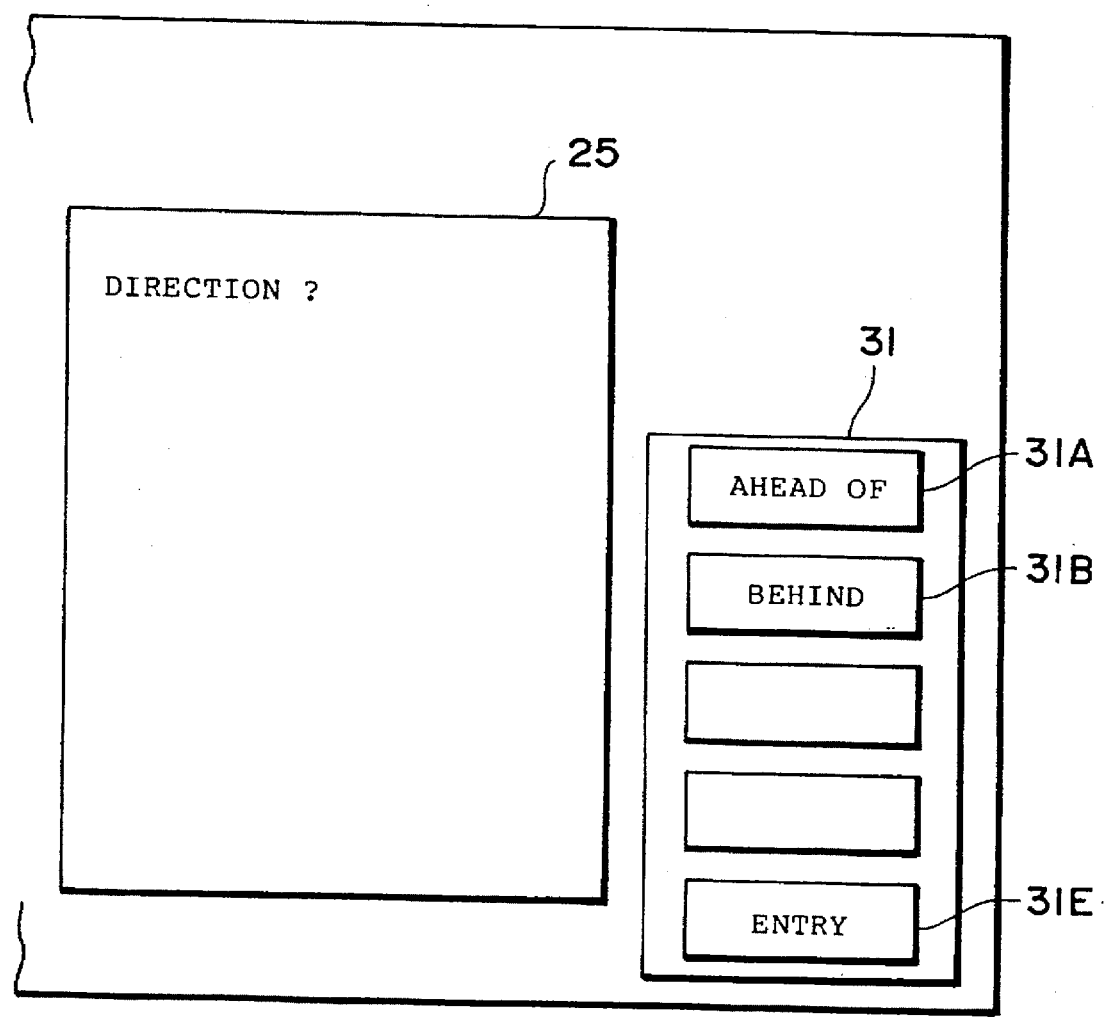
FIG. 13 illustrates a display screen and a group of keys in a case where accident information is entered.

The characters displayed on the touch switches 31A and 31B are then changed to as shown in FIG. 13, to ask whether the position of the accident is "ahead of" or "behind" the present vehicle. The driver enters the direction.

Figure 14:
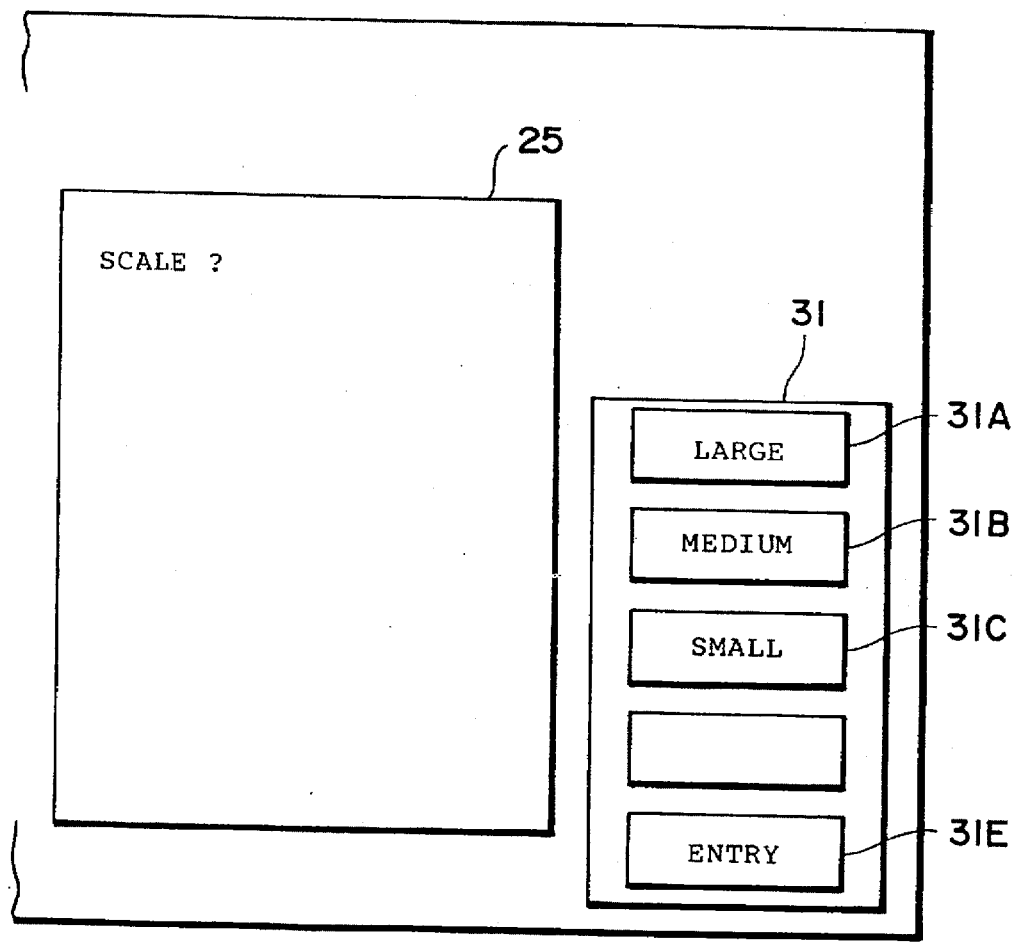
FIG. 14 illustrates a display screen and a group of keys in a case where accident information is entered.

In order to obtain information relating to the scale of the accident, the characters displayed on the touch switches 31A to 31C are finally switched as shown in FIG. 14. The driver selects any one of "large", "medium" and "small" by sensible judgment, to enter the scale of the accident.

As the characters displayed on the touch switches 31A to 31D change, such a guide as to urge entry of the lane, the distance, the direction and the scale is displayed on the display device 25.

Consequently, detailed information relating to the accident found out by the driver are entered using the manual transmission operating unit 31 in the car navigation system. The information are summarized by the information processor 10, and are sent to the center 9 via the repeaters When the above-mentioned sequence of entering operations is terminated, the display screen of the display device 25 and the touch switches 31A to 31E are returned to their normal states shown in FIG. 3.

Detailed information relating to a traffic jam will be entered in two stages as follows. When the touch switch 31B representing a traffic jam is depressed, the characters displayed on the touch switches 31A and 31B are respectively changed into "present lane" and "opposite lane" which are lanes to be entered. When the lanes are entered, "front" and "rear" are respectively displayed on the touch switches 31A and 31B in order to enter the place (the direction) where traffic is jammed. The degree of the traffic jam may be entered.

Detailed information relating to weather will be entered in three stages, for example, as follows. In order to enter the type of the current weather, "snow", "rain", "cloudy" and "fair" are first respectively displayed on the touch switches 31A to 31D. In order to enter the degree of the weather, "large", "medium" and "small" are then displayed on the touch switches. In order to enter the state of the change in the weather, "direction of improvement" and "direction of deterioration" are finally displayed.

The switch 31D representing "others" will be used in order to enter information other than the accident information, the traffic jam information and the weather information, for example, "wet" and "freezing" which are not in the above-mentioned weather, the presence or absence of a restaurant, and how a particular restaurant is crowded with people. Also in this case, it is preferable that item menus to be entered by the driver are previously prepared and are displayed on the display device 25 and the touch switches 31A to 31D. The information may be entered using alphabet keys and the like by the driver.

Figure 15:
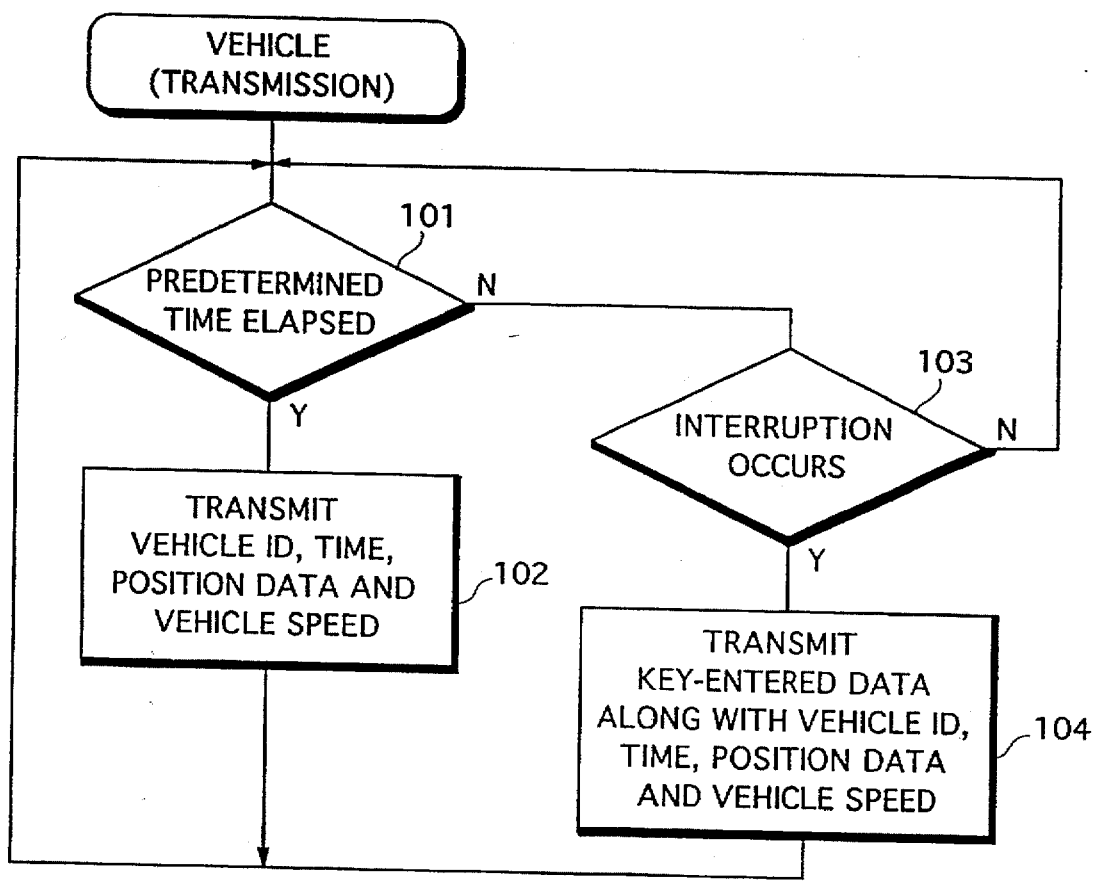
FIG. 15 is a flow chart showing the procedure for processing in an on-vehicle apparatus.

FIG. 15 shows the procedure for processing of the information processor 10 in the on-vehicle apparatus 3 on the vehicle.

An identification code (hereinafter referred to as a vehicle ID) is assigned to the on-vehicle apparatus 3. The vehicle ID may be a production number of the on-vehicle apparatus 3, a serial number, a vehicle number on a license plate, or an identification code of a driver. The vehicle ID is previously stored in a memory of the information processor 10. Further, a clock is included in the information processor 10.

The information processor 10 adds the vehicle ID to time data obtained from the clock, position data obtained from the car navigation system 20 and vehicle speed data obtained from the vehicle speed sensor 13 to edit a telegraphic message for each predetermined time (for each relatively short time, by second or by minute), and transmits the telegraphic message from the transmitter 11 (steps 101 and 102).

When the above-mentioned sequence of operations is performed from the manual transmission operating unit 31, the entered data are temporarily stored in the memory, and an interruption occurs at the time point where the operations are terminated (step 103).

In response to the interruption, the data (information) entered from the operating unit 31 (including position data in a case where the distance is entered) and data relating to the time, the position and the vehicle speed at that time, along with the vehicle ID, are transmitted (step 104).

Figure 16:
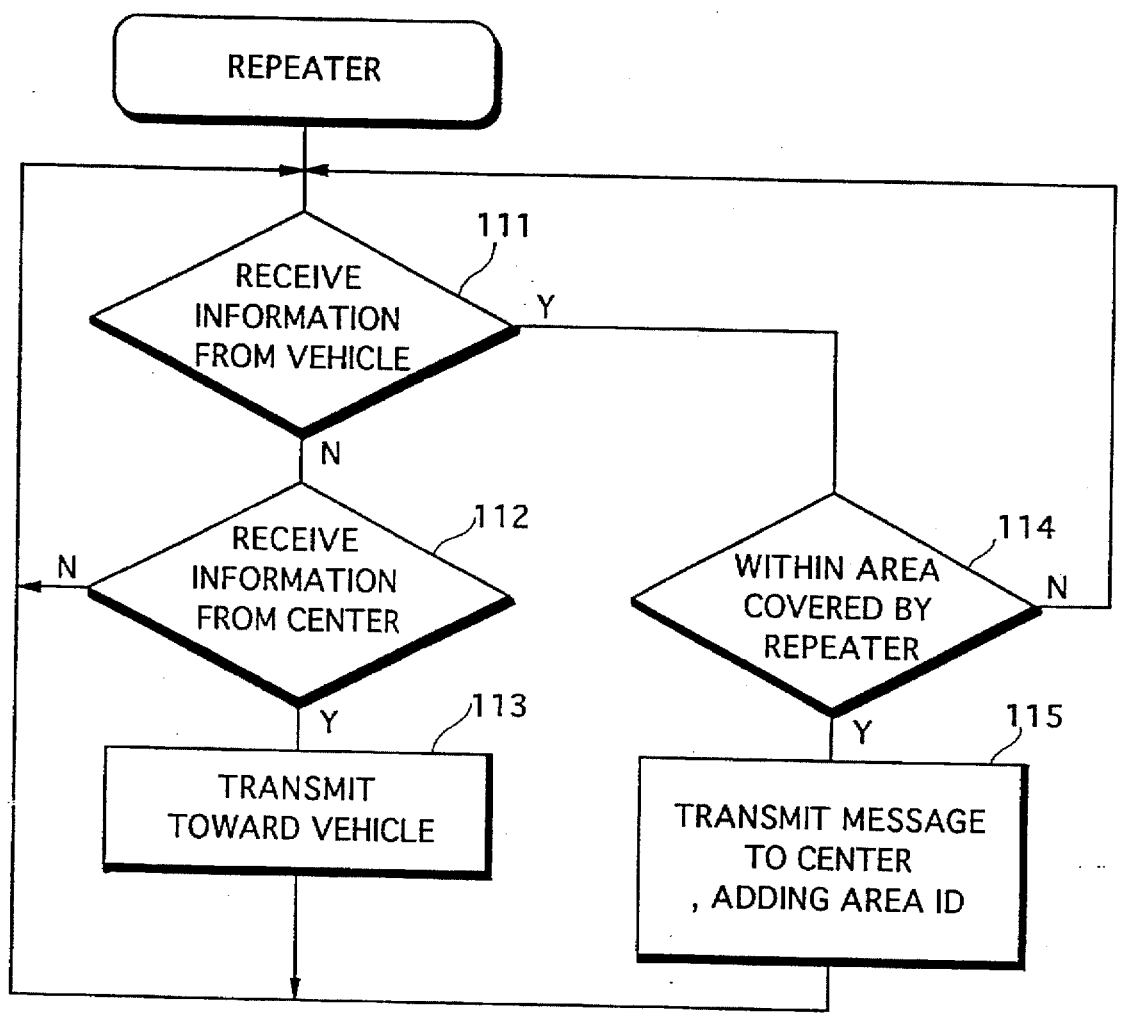
FIG. 16 is a flow chart showing the procedure for processing in a repeater.

FIG. 16 shows the procedure for processing of the processor 42 in the repeater 4.

It is judged whether or not the receiver 43 has received the telegraphic message, and whether the telegraphic message is sent from the on-vehicle apparatus 3 on the vehicle or the center 9 when it has been received (steps 111 and 112). When the telegraphic message is sent from the center 9, the telegraphic message is transmitted as is toward the vehicle 2 from the transmitter 41 (over the range which the repeater 4 covers) (step 113).

when the telegraphic message from the vehicle 2 is received, it is judged whether or not the telegraphic message is from a vehicle existing within an area covered by the repeater 4 on the basis of position data included in the telegraphic message (step 114). Position data representing the boundary of the area of which the repeater 4 takes charge is previously set in the processor 42 in the repeater 4, and the position data transmitted from the vehicle and the position data representing the boundary are compared with each other, to judge whether or not the vehicle is within the area managed by the repeater 4.

When the telegraphic message is sent from the vehicle existing in the area managed by the repeater 4, its area ID (the above-mentioned symbol A~H, etc.) is added to the telegraphic message, and the telegraphic message is transmitted to the center 9 (step 115). When the telegraphic message is not sent from the vehicle in the area managed by the repeater, the telegraphic message is ignored, not to be transmitted to the center 9.

Since each of the repeaters thus transmits only the telegraphic message from the vehicle existing in the area covered by the repeater to the center 9, the center 9 cannot receive the same telegraphic message from the same vehicle, whereby the burden of the center 9 is reduced.

The repeater 4 may also be constructed to transmit the telegraphic message from the vehicle as is to the center 9. In this case, the processor 42 may be an amplifier or a simple logic circuit. The center 9 judges whether or not there are the same telegraphic messages on the basis of the vehicle ID and the time data in the received telegraphic message. When two or more identical telegraphic messages are received, all but one of telegraphic messages will be rejected.

FIG. 17 illustrates a vehicle information area provided in the memory 53 in the center 9. This area stores for each vehicle ID an area ID of an area where there exists a vehicle which has sent a telegraphic message via the repeater for each predetermined time (transmitted in the steps 102 and 115), and data relating to the time, the position and the vehicle speed (which have been received the previous time). The area ID and the data relating to the time, the position and the vehicle speed are updated every time they are received.

The center computer 50 compares position data in the preceding received data and position data in the current received data, to judge a lane in which the vehicle is traveling. Data representing this lane is also stored in conformity with the vehicle ID. For example, a displacement vector of the vehicle is calculated on the basis of the position data in the current received data and the position data in the preceding received data. The displacement vector is compared with a direction vector in the up direction of the road. If an angle formed between both the vectors is smaller than 90°, it is judged that the vehicle is traveling in the up lane. It is similarly judged whether or not the vehicle is traveling in the down lane on the basis of comparison between the displacement vector of the vehicle and a direction vector in the down direction of the road. The lane will be stored in relation to road map data. The direction of the road is coded on the map, and the lane is coded in relation to the direction. If such moving direction (traveling lane) judging processing is performed by the information processor 10 in the vehicle, and the results of the judgment are transmitted to the center, the necessity of the lane judging processing in the center is eliminated.

Furthermore, for each vehicle ID, traffic information, weather information and the like (including data relating to the time, the position and the vehicle speed) which are entered using the manual transmission operating unit 31 in the on-vehicle apparatus 3 and transmitted (transmitted in the step 104) are stored in relation to the vehicle ID. The information are also updated when new information is received.

Figure 18:
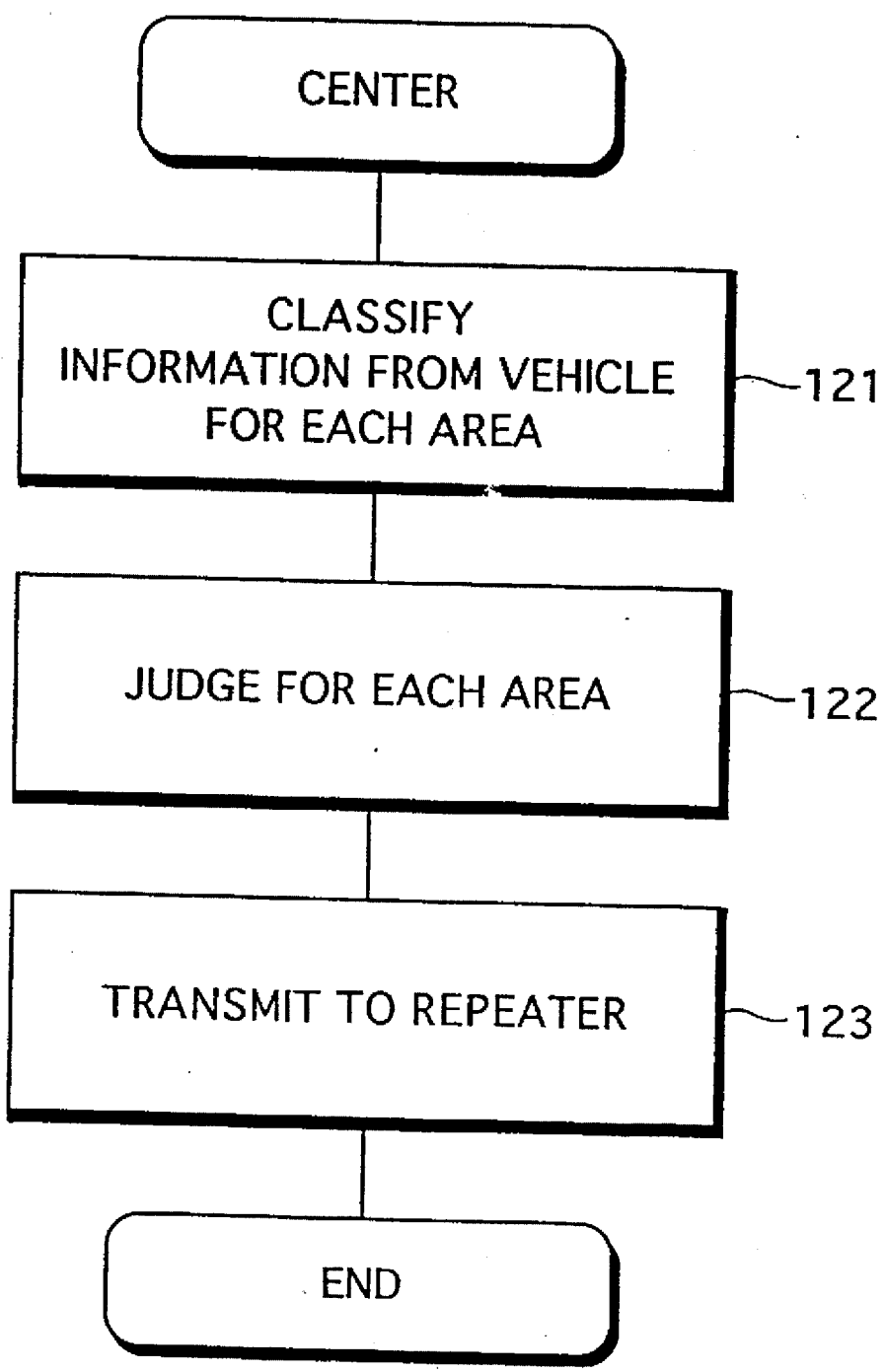
FIG. 18 is a flow chart showing the procedure for processing in a center.

FIG. 18 shows the procedure for processing with respect to the traffic information, the weather information, and the like by the center computer 50.

The traffic information, the weather information, and the like which are stored in the vehicle information area are classified for each area where a vehicle which has transmitted the information exists (step 121), and judging processing of the information is performed for each area (step 122).

The accident information sent from the vehicle includes, for example, the lane, the distance, the direction, the scale, the position of the vehicle, the time indicating the time point where the distance is entered, and the vehicle speed. A reference time point is assumed, and a reference point is determined within an area. Based on data relating to the lane, the position of the vehicle, the time, and the vehicle speed which are sent from the Vehicle, the position where the vehicle exists at the reference time point (with the reference point used as a basis) is calculated. An approximate position where an accident occurs is calculated from data representing the calculated position, the distance, the direction and the lane. When information are obtained from a plurality of vehicles in one area, the average value of the positions of the scene of the accident which have been calculated on the basis of the information from the respective vehicles is calculated, whereby the position of the accident is determined. The scale of the accident is determined in accordance with the principle of decision by majority.

The accident information thus judged is transmitted to each of the vehicles via the repeater 4 in the area (via repeaters in a plurality of areas in the case of general information) from the center 9. In each of the vehicles, the accident information is displayed on the display device 25 in the on-vehicle apparatus 3. When a driver desires to display information relating to an accident, the driver selects the information report mode using the touch switch 31E and then selects the information relating to the accident using the touch switch 31A. When it is necessary to always know an accident to the driver because the accident is a serious accident, information relating to the accident may be automatically displayed without operating the touch switches. The position of the scene of the accident will be preferably indicated by suitable marks, characters, symbols, or the like on the map displayed on the display device 25. Further, a message "a medium-scale accident has occurred in a location about ○ ○ mm upward from ○ ○ intersection" may be displayed on the display device 25 with the name of a place, the name of a building, the name of an intersection, or the like on the map used as a reference point. An example of the display will be described later.

The other information, that is, the traffic jam information, the weather information, and the like are judged for each area on the basis of information from vehicles by the same processing as described above, and the results of the judgment are reported to vehicles.

In the foregoing description, the car navigation system 20 is so constructed that the traffic information, the weather information, and the like are entered in significant detail. However, the car navigation system 20 may be of simpler construction. For example, in the man-machine interface as shown in FIG. 3 in the car navigation system, characters "traffic jam", "accident", "fair", "snow", "freezing", "chain attachment", etc. and their corresponding buttons may be arranged so that a driver merely presses any one of the buttons or two or more buttons. In this case, data representing the pressed button, position data of the vehicle, and data representing the time when the button is pressed (more preferably, a vehicle ID of the vehicle as well) are sent to the center. In the center, the condition of the road is judged for each area by decision by majority with respect to the pressed buttons. The results of the judgment are transmitted to vehicles.

The car navigation system generally displays the position of the vehicle on the map, and has no effect on the outer world. When the above-mentioned system is considered centered with respect to the car navigation system, data collected by the car navigation system are transmitted to the center, and data obtained by processing in the center are received and are displayed (outputted) by the car navigation system. This is a car navigation system interacting with the outer world, which can be said to be a car navigation system having bidirectional properties.

Second Embodiment

A second embodiment mainly relates to processing for detecting a traffic jam by a center computer 50 in a center 9. The construction of an on-vehicle apparatus 3, repeaters 4 and the center 9 is basically the same as that shown in the above-mentioned first embodiment. The following are differences from the first embodiment.

In the on-vehicle apparatus 3, a driver need not enter information relating to an accident, a traffic jam, weather, and the like. In the second embodiment, the presence or absence of a traffic jam is judged in the center 9 on the basis of only information automatically transmitted to the center 9 from the on-vehicle apparatus 3. A car navigation system 20 serves as a position sensor.

Information transmitted to the center 9 from the on-vehicle apparatus 3 via the repeaters 4 include at least a vehicle ID, time data and position data.

An information processor 10 in the on-vehicle apparatus 3 transmits the above-mentioned information at least twice at suitable intervals (for each relatively short time, by second or by minute). A center computer 50 in the center 9 can calculate the vehicle speed of a vehicle 2 carrying the on-vehicle apparatus 3 using the time data and the position data which are received twice from the same on-vehicle apparatus 3. Since the on-vehicle apparatus 3 includes a vehicle speed sensor 13, it is preferable that vehicle speed data obtained from the vehicle speed sensor 13 is transmitted to the center 9 from the on-vehicle apparatus 3. Consequently, the burden of the center computer 50 can be reduced.

The center computer 50 judges, using the information sent twice from the same on-vehicle apparatus 3 (at least the time data and the position data), a lane in which the vehicle 2 carrying the on-vehicle apparatus 3 is traveling, in the same manner as the first embodiment.

From the on-vehicle apparatus 3 on the vehicle 2, information relating to the distance between the vehicle 2 carrying the on-vehicle apparatus 3 and a vehicle traveling ahead of the vehicle 2, road surface information representing the condition of a road surface (dry, wet, frozen, rain, etc.) of a road 1, information relating to rain, and the like may be transmitted in addition to the foregoing information to the center 9. The information are obtained from a laser radar, a road surface discriminator, a raindrop sensor, and the like (see a third embodiment).

FIG. 19 illustrates an example of a vehicle information area provided in a memory 53 in the center 9. The vehicle information area may be the same as that in the first embodiment shown in FIG. 17, which is drawn in a slightly different way in order to make the features of the second embodiment outstanding.

The vehicle information area stores for each vehicle ID the preceding data, the current data, a traveling lane and the other information. As described above, information are transmitted at least twice at predetermined time intervals from the on-vehicle apparatus 3 on the vehicle 2. The latest information is the current data, and information sent the previous time is the preceding data. The data include time data, position data and vehicle speed data (which may be calculated in the center). When new information is received from the vehicle, the stored current data is stored as the preceding data, and data included in the new information is stored as the current data, whereby the current data and the preceding data are updated. The traveling lane is judged on the basis of the current data and the preceding data. The other information include the distance between vehicles and road surface information as described above.

The center computer 50 in the center 9 performs processing for judging the presence or absence of a traffic jam and the degree thereof as required on the basis of the data in the vehicle information area.

Figure 20:
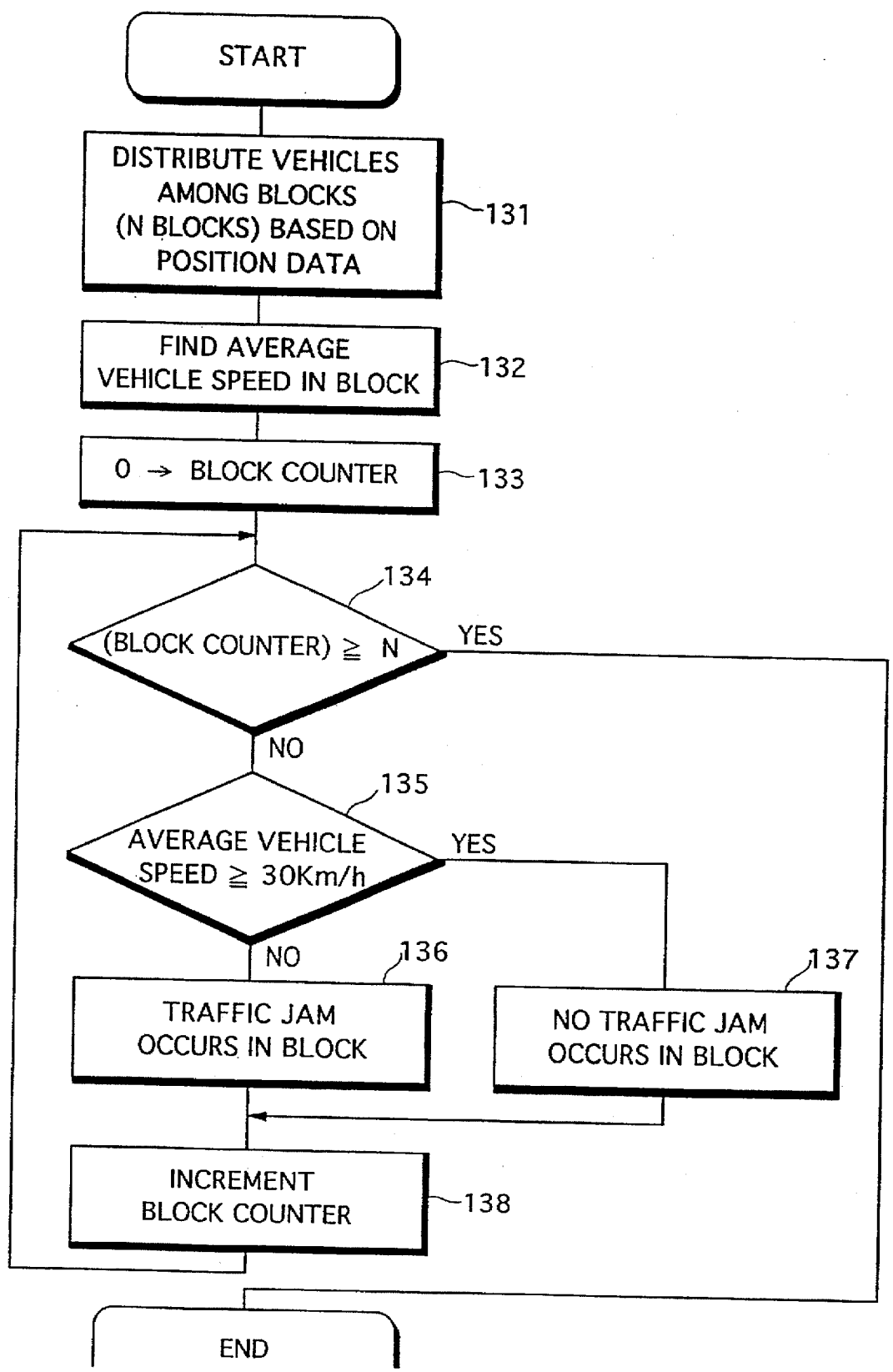
FIG. 20 is a flow chart showing the procedure for traffic jam detecting processing in a center.

FIG. 20 shows one example of traffic jam judging processing. This is the simplest processing paying attention to the fact that the average vehicle speed is lowered if traffic is jammed.

Vehicles are distributed among blocks on a plane of a map on the basis of position data for each vehicle which is stored in the vehicle information area (included in the current data) (step 131). Although the block may be the same as the area in the first embodiment, it shall be preferably one considering a lane. For example, it is assumed that vehicles traveling on the up lane of a particular road in an area A are included in one block. Vehicles traveling on the down lane of the same road belong to the other block. The block may be considered as a unit of the range in which a traffic jam is to be judged.

The average vehicle speed is calculated for each block using the vehicle speeds of all vehicles belonging to the block (included in the current data) (step 132).

Suppose there are N blocks within a region supervised by the center 9. A block counter for counting the blocks is provided. The contents of the block counter are cleared to zero (step 133).

It is judged for each block whether or not the average vehicle speed is not less than 30 Km/h (30 Km per hour) (step 135). It is judged that a traffic jam occurs in the block if the average vehicle speed is less than 30 Km/h (step 136), while no traffic jam occurs if it is not less than 30 Km/h (step 137). The speed used as the basis for judgment of a traffic jam is not limited to 30 Km/h. The speed may be an arbitrary speed.

The block counter is incremented (step 138), and the above-mentioned processing is performed with respect to the succeeding block. When the processing is terminated with respect to all the N blocks (step 134), the traffic jam judging processing is terminated.

Figure 21:
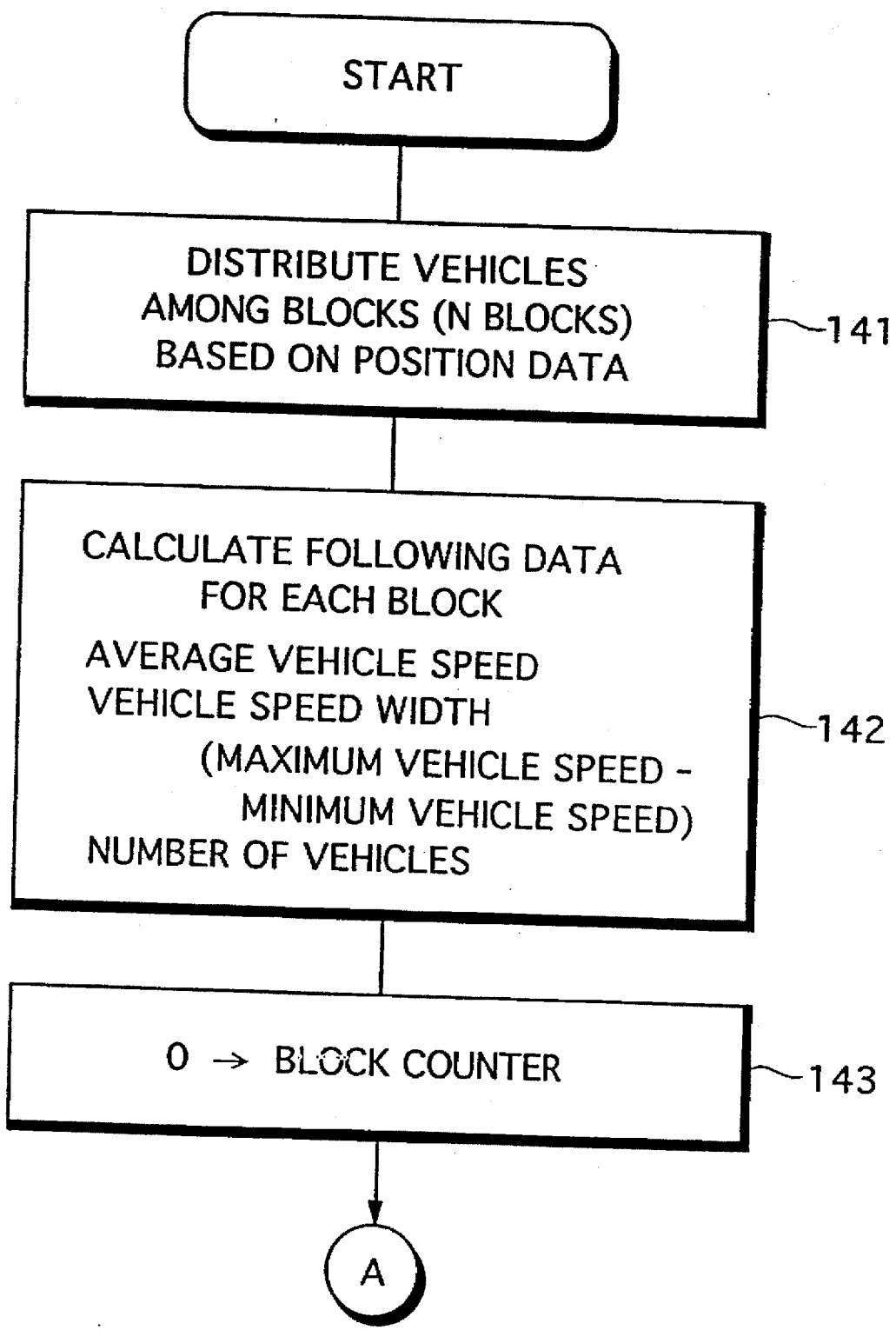
FIG. 21 is a flow chart showing another example of the procedure for traffic jam detecting processing in a center.
Figure 22:
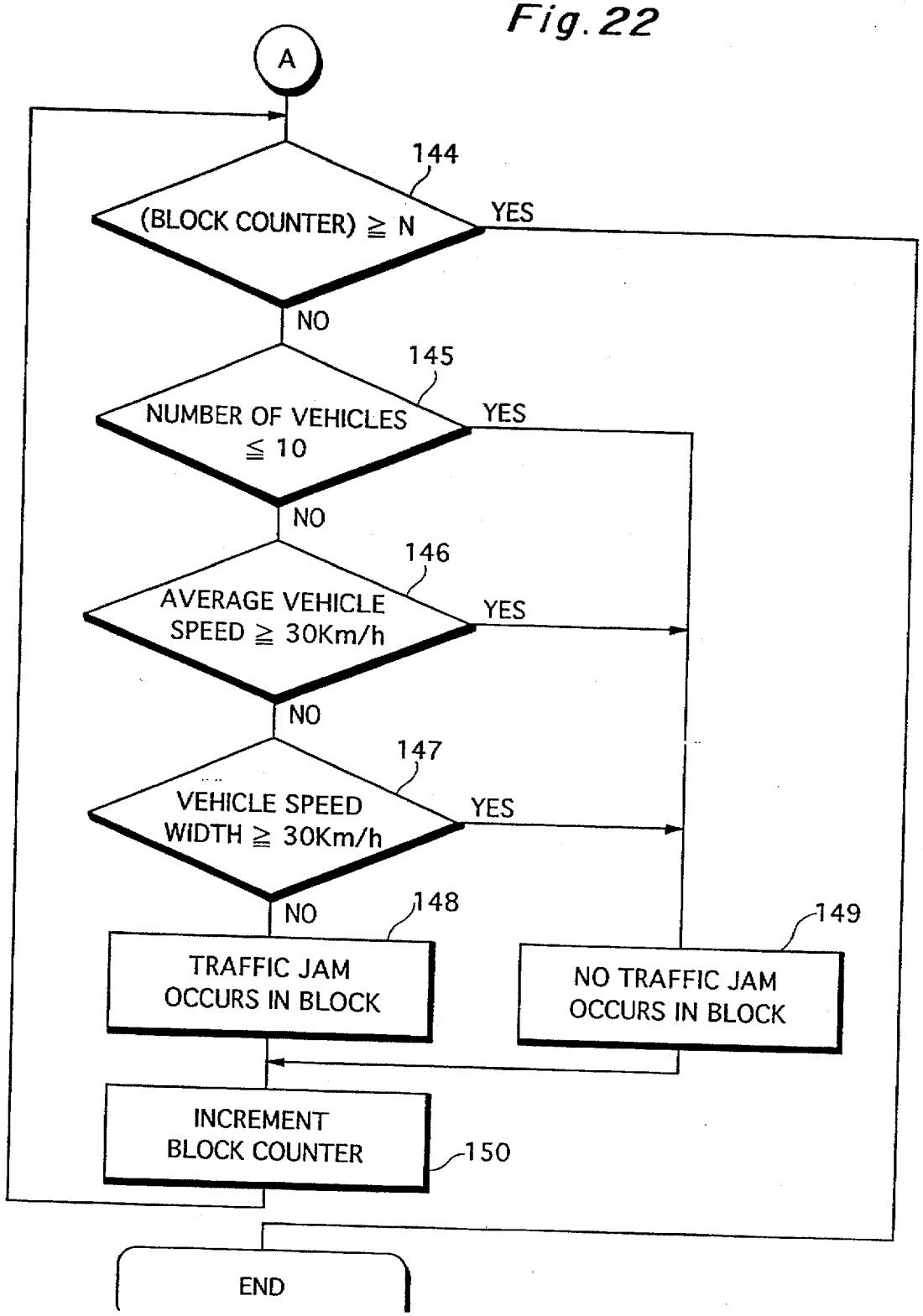
FIG. 22 is a flow chart showing still another example of the procedure for traffic jam detecting processing in a center.

FIGS. 21 and 22 show another example of traffic jam judging processing. This processing pays attention to the fact that the vehicle speeds of all vehicles are lowered in a block in which traffic is jammed.

All vehicles whose data are stored in the vehicle information area are distributed among N blocks in accordance with their position data, in the same manner as the processing shown in FIG. 20 (step 141).

The average vehicle speed, the vehicle speed width and the number of vehicles are calculated for each block with respect to all vehicles belonging to the block (step 142). The vehicle speed width means the difference between the maximum speed and the minimum speed out of the speeds of the vehicles belonging to the block (the difference in speed between the vehicle with the maximum vehicle speed and the vehicle with the minimum vehicle speed). The number of vehicles is the total number of vehicles belonging to the block.

With respect to each of the blocks, it is judged that a traffic jam occurs in the block (step 148) only when the number of vehicles exceeds 10 (step 145), the average vehicle speed is less than 30 Km/h (step 146), and the vehicle speed width is less than 30 Km/h (step 147), while it is judged that no traffic jam occurs in the other cases (step 149). It goes without saying that the number of vehicles, the vehicle speed and the vehicle speed width used as the basis for judgment can be arbitrarily set.

The above-mentioned processing is performed with respect to all the N blocks (steps 143, 144 and 150).

Figure 23:
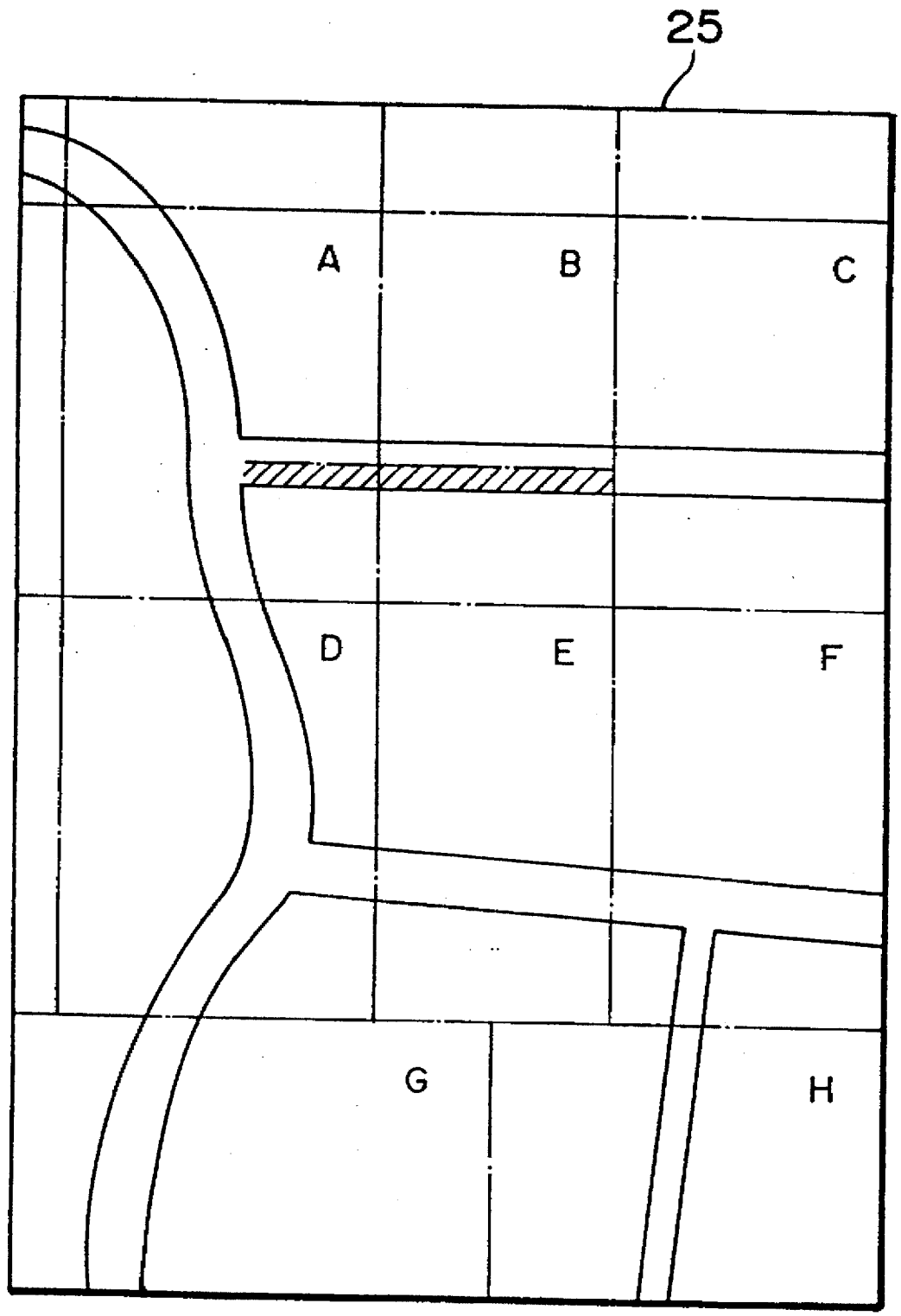
FIG. 23 illustrates an example of display of traffic jam information in a vehicle.

Information representing the presence or absence of a traffic jam obtained from the processing shown in FIG. 20 or FIGS. 21 and 22, along with position information of a block which is judged to be a block in which there is a traffic jam, is transmitted to the on-vehicle apparatus 3 on the vehicle 2 via the repeater 4. In the on-vehicle apparatus 3, traffic jam information, along with the position information, is displayed. When the display device 25 in the car navigation system 20 is used for displaying the traffic jam information, the presence of a traffic jam is displayed in a particular color or pattern (indicated by hatching in FIG. 23) on a block which is judged to be a block in which there is a traffic jam on a displayed map, as shown in FIG. 23, for example. The position where a traffic jam occurs can be also indicated and displayed in characters, for example, "1 Km on the up lane leading to ○ ○ intersection". The position will be also displayed on the display panel 8 as required.

Figure 24:
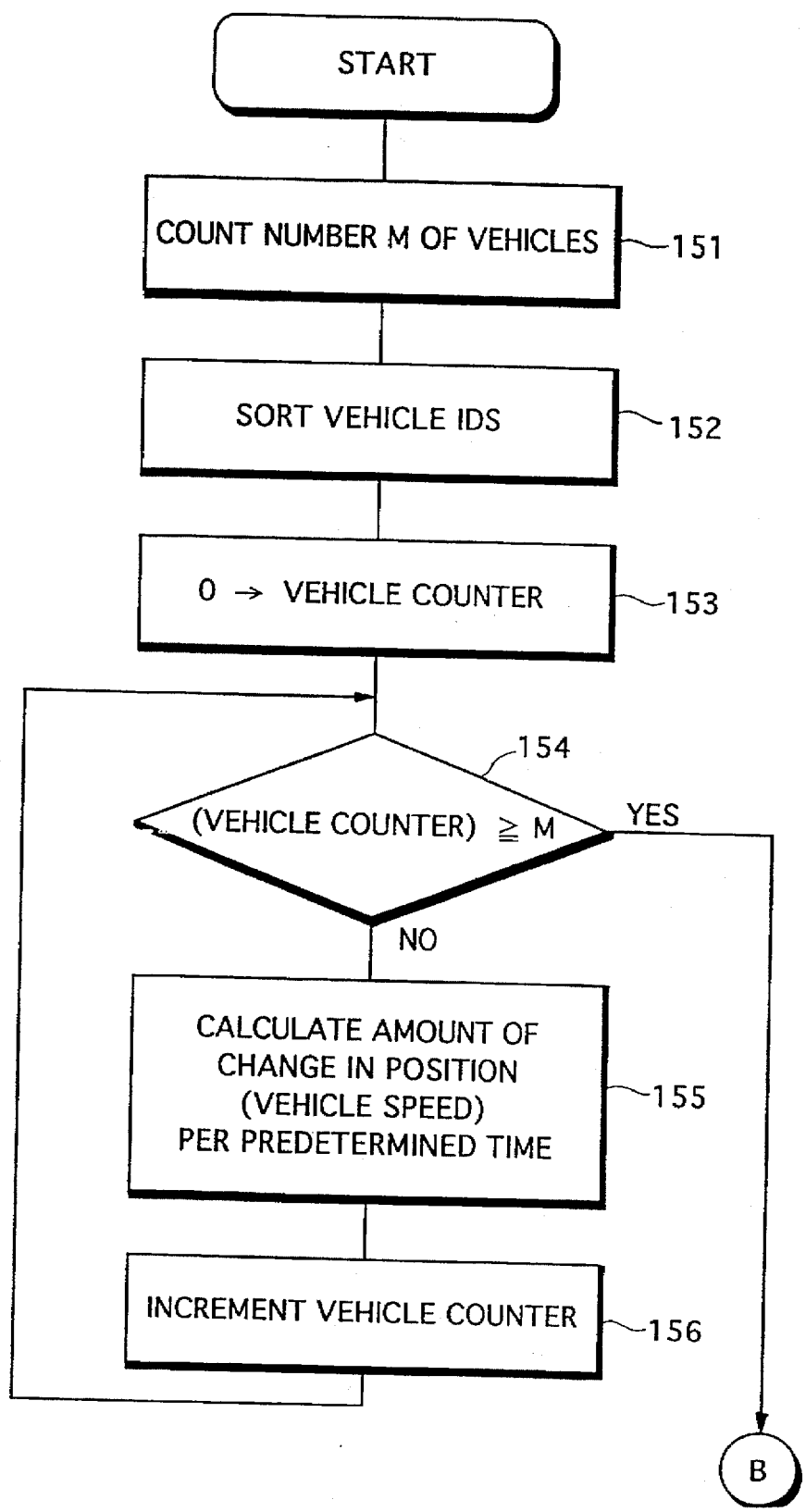
FIG. 24 is a flow chart showing still another example of the procedure for traffic jam detecting processing in a center.
Figure 25:
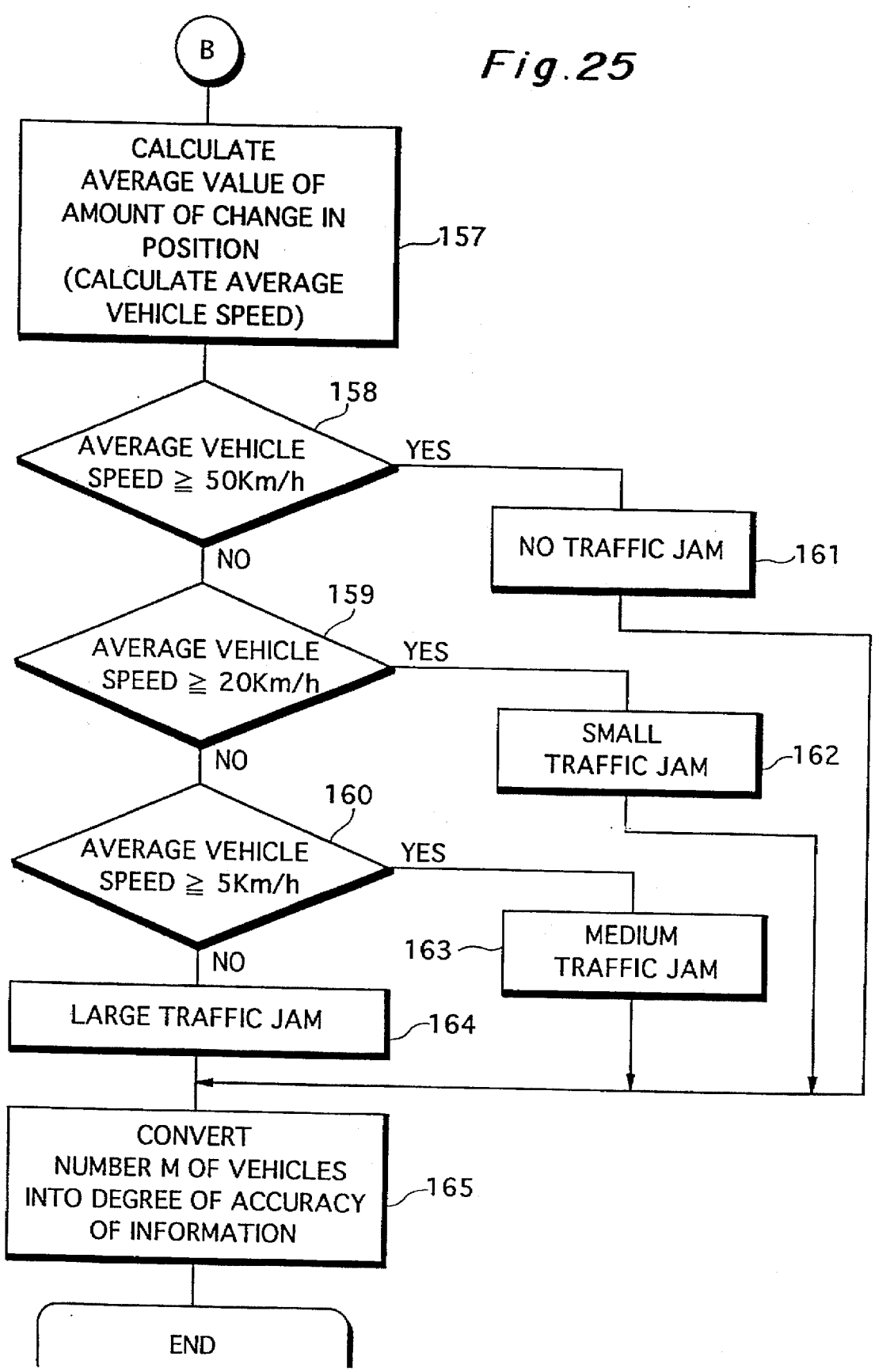
FIG. 25 is a flow chart showing still another example of the procedure for traffic jam detecting processing in a center.

Traffic jam judging processing shown in FIGS. 24 and 25 is for judging a traffic jam on the basis of only a vehicle ID, time data and position data (no vehicle speed data is required) transmitted from a vehicle. Moreover, the degree of the traffic jam is also judged.

This processing is performed for each block. That is, vehicles whose data are stored in the vehicle information area are distributed among blocks prior to the processing.

The number of vehicles belonging to one block which is an object to be processed is counted (step 151). Let M be the number of vehicles.

Vehicles IDs are sorted (rearranged) in the order of increasing vehicle IDs of vehicles belonging to the one block (step 152).

A vehicle counter for counting the number of vehicles which have been processed is provided, and the vehicle counter is cleared (step 153).

For each vehicle (for each vehicle ID), the difference between position data in the current data related thereto and position data in the preceding data is calculated. The difference between time data in the current data and time data in the preceding data is calculated. The difference between the position data is divided by the difference between the time data, whereby the amount of change in the position (the speed) of the vehicle per unit time is calculated (step 155). Processing for calculating the amount of change in the position is performed with respect to all the M vehicles while incrementing the vehicle counter (steps 154 and 156).

The average value of the amounts of change in the position is calculated with respect to the vehicles included in one block which is an object to be processed (step 157). The average value has approximately the same meaning as the above-mentioned average vehicle speed.

The calculated average vehicle speed is compared with the reference vehicle speeds 50 Km/h, 20 Km/h and 5 Km/h, respectively (steps 158, 159 and 160). The reference vehicle speed can be arbitrarily set.

If the average vehicle speed is not less than 50 Km/h, it is judged that no traffic jam occurs in the block (step 161).

When the average vehicle speed is less than 50 Km/h but not less than 20 Km/h, it is judged that a traffic jam occurs and the degree thereof is small (step 162).

When the average vehicle speed is less than 20 Km/h but not less than 5 Km/h, it is judged that a traffic jam occurs and the degree thereof is medium (step 163).

When the average vehicle speed is less than 5 Km/h, it is judged that a traffic jam occurs and the degree thereof is large (step 164).

The larger the number of vehicles belonging to one block is, the higher the accuracy of the above-mentioned judgment becomes. A table or a function for converting the number of vehicles into a value representing the degree of the accuracy is previously set. The number of vehicles M belonging to one block which is an object to be processed is converted into a value representing the degree of the accuracy of information using the table or the function (step 165).

The above-mentioned processing in the steps 151 and 165 is performed for each block with respect to all the blocks. Therefore, for each block, the presence or absence of a traffic jam in the block, the degree of the traffic jam and the degree of the accuracy of traffic information are obtained.

The traffic jam information thus obtained, along with position information representing the position of the block, is transmitted to the on-vehicle apparatus on the vehicle. In the on-vehicle apparatus, the traffic jam information is reported to a driver by the drawing as shown in FIG. 23 or by the above-mentioned sentence. At this time, the degree of the traffic jam is also reported. For example, the degree of the traffic jam is color coded and displayed on the map shown in FIG. 23.

In the processing shown in FIGS. 24 and 25, the number of vehicles included in a block and the vehicle speed width can be basic data for judging the presence or absence of a traffic jam and the degree thereof.

Third Embodiment

A third embodiment collects in an on-vehicle apparatus 3 not only information relating to the present vehicle but also information relating to the place where the present vehicle is traveling and the environment in the vicinity thereof (including information relating to the preceding vehicle) making use of a laser radar and transmit the information to a center 9. In the third embodiment, information relating to the road surface condition judged by a road surface discriminator 15, and information relating to raindrops or rainfall measured by a raindrop sensor 16 are also transmitted from the on-vehicle apparatus 3 to the center 9. The construction of the on-vehicle apparatus 3, repeater 4 and the center 9 is basically the same as that in the above-mentioned first embodiment. The construction and the operations peculiar to the third embodiment, particularly the construction and the operations related to the laser radar 14, the road surface discriminator 15 and the raindrop sensor 16 will be described.

Figure 26:
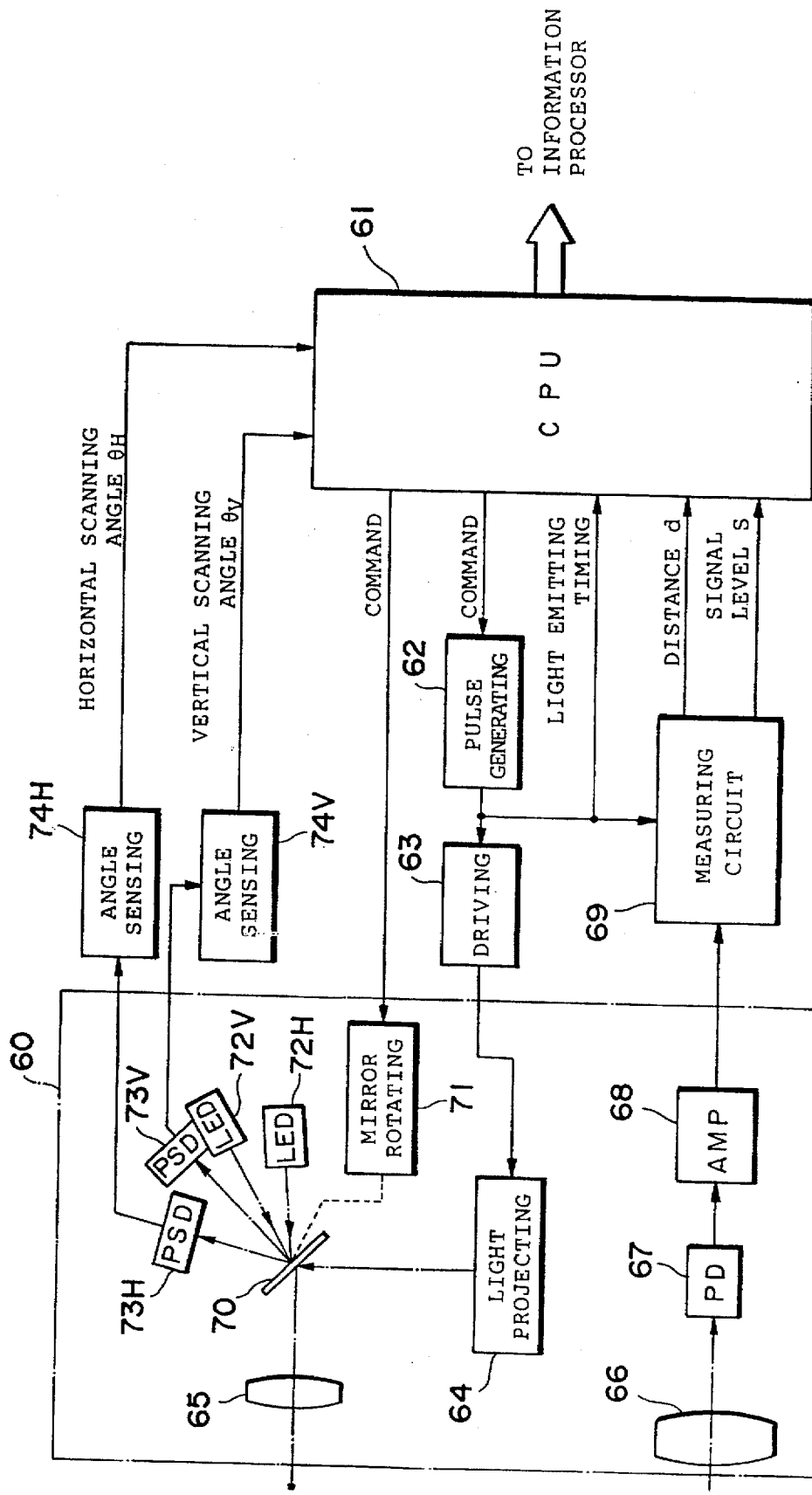
FIG. 26 is a block diagram showing the construction of a laser radar.
Figure 27:
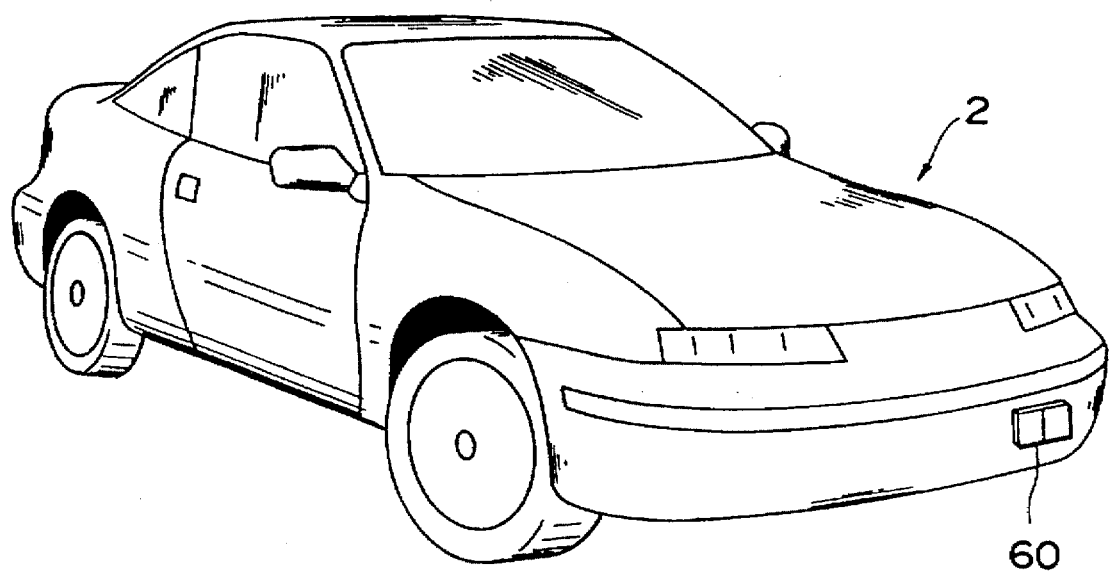
FIG. 27 is a perspective view showing a vehicle carrying a laser radar.

FIG. 26 illustrates the construction of the laser radar 14. The laser radar 14 includes a head 60. The head 60 is so mounted on a vehicle as to project laser light toward the front of the vehicle or the rear thereof (generally, toward the front thereof). The head 60 comprises a light projecting optical system for projecting light and a light receiving optical system for receiving reflected light. When the laser light is projected toward the front of the vehicle, the head 60 is mounted on the front of a vehicle 2, for example, a bumper or its vicinity, as shown in FIG. 27. The whole of the head 60 need not be exposed to the outside of the body of the vehicle 2. The body of the vehicle may be provided with at least a window for projection of the laser light and a window for incidence of the reflected light. Various signal processing circuits will be generally provided inside the body of the vehicle.

Figure 29A:
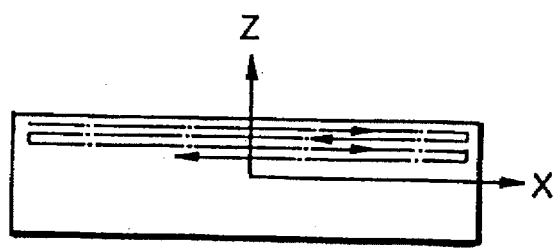
FIGS. 29a and 29b illustrate a sensing area of a laser radar, where
Figure 29B:
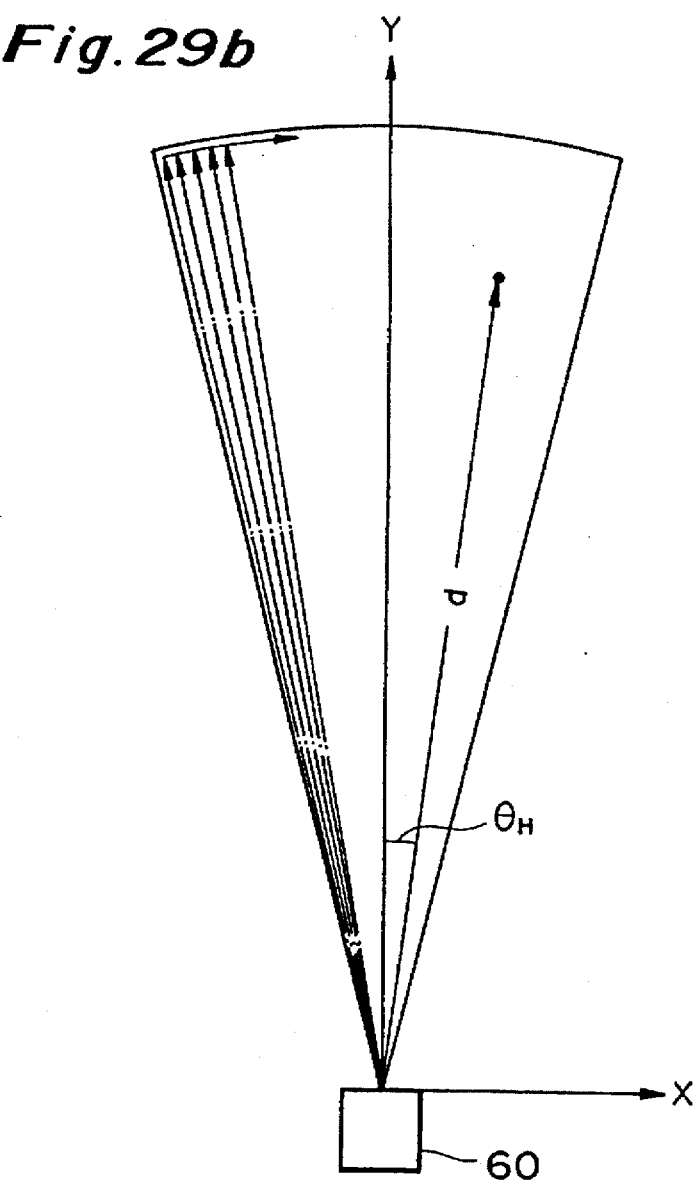

Laser light to be projected is pulse light, as described in detail later, and the direction of projection thereof is scanned in two dimensions. FIGS. 29a and 29b show how the projected laser light is scanned. FIG. 29b is a diagram as viewed from a plane, in which the light is projected from the head 60 toward a sector range (a sensing area) with the head 60 used as its center. FIG. 29a shows on a vertical plane a measurement range (a sensing area) in a position spaced apart from the head 60 by the maximum measurable distance. In the figures, the projected light (see FIG. 29b) and the order of scanning (FIG. 29a) are indicated by dots-and-dashes lines. The projected light is vertically scanned while being horizontally scanned back and forth.

The overall operation of the laser radar 14 is supervised by a CPU 61. The CPU 61 outputs a command to emit light and a command to rotate a mirror. The CPU 61 accepts a signal representing light emitting timing, a signal representing a horizontal scanning angle θH, a signal representing a vertical scanning angle θV, a signal representing the measured distance d, and a signal representing the level S of a received signal, and performs coordinate converting processing, measured data processing, and the like as described later.

When the CPU 61 issues the light emit command to a pulse generating circuit 62, the pulse generating circuit 62 starts the generation of a sequence of light emitting pulses having a predetermined period. The period of the light emitting pulses has time which is not less than time required for light to propagate back and forth the maximum measurable distance. The light emitting pulses are fed to a driving circuit 63, and are fed to the CPU 61 and a measuring circuit 69 as a light emitting timing signal.

The CPU 61 also issues the mirror rotate command to a mirror rotating device 71. In response thereto, the mirror rotating device 71 horizontally rotates a mirror 70 for scanning projected light back and forth within a predetermined angle range, and vertically rotates the mirror 70 through a very small angle at both ends of the predetermined angle range.

Figure 28:
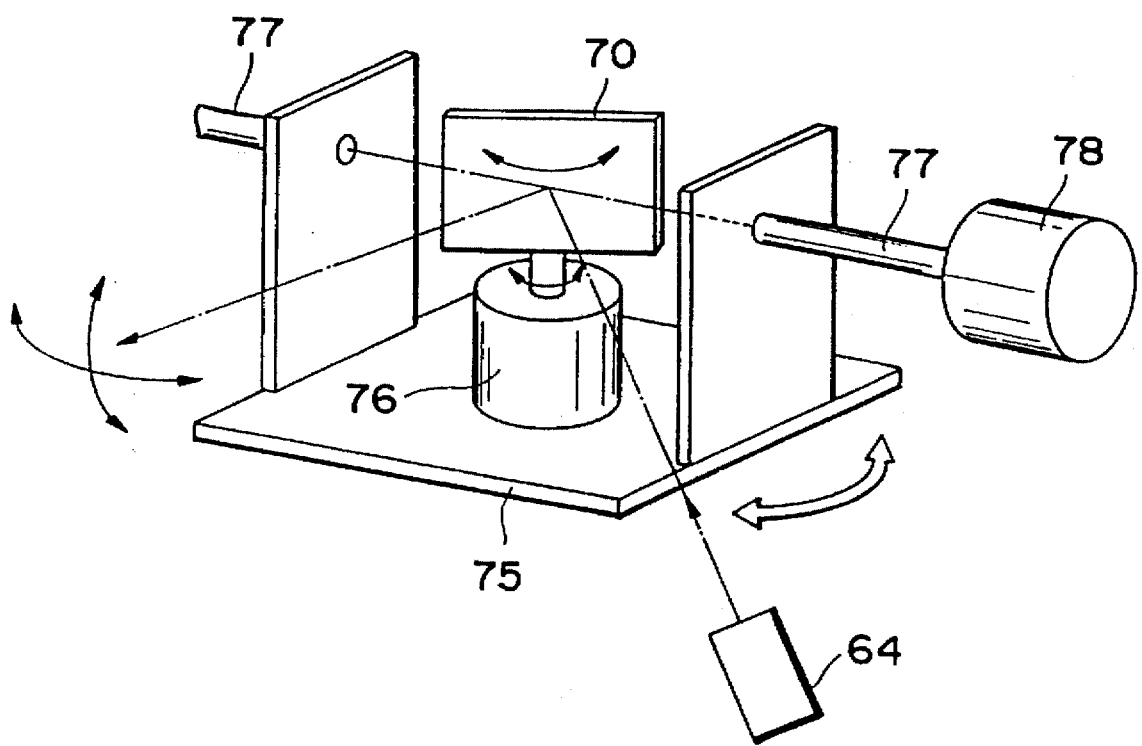
FIG. 28 is a perspective view showing a light projecting optical system of a laser radar.

FIG. 28 illustrates parts of the mirror 70 and the mirror rotating device 71.

The mirror 70 is mounted on the axis of rotation of a horizontal scanning motor 76 directly or via a speed-reducing mechanism. The horizontal scanning motor 76 is mounted on a rotating stand 75. Shafts 77 fixed to the rotating stand 75 are rotatably received by bearings (not shown). One of the shaft 77 is rotated via the speed-reducing mechanism as required by a vertical scanning motor 78. The vertical scanning motor 78 is supported on a frame (not shown) of the head 60.

The horizontal scanning motor 76 is driven by a motor driving circuit for horizontal scanning included in the mirror rotating device 71, and the mirror 70 is rotated within a horizontal plane. The vertical scanning motor 78 is driven by a motor driving circuit for vertical scanning (not shown), and the rotating stand 75 (the mirror 70 and the horizontal scanning motor 76 as well) is rotated, so that the mirror 70 is rotated within a vertical plane.

A light projecting device 64 comprises a laser diode and a collimating lens. Since the laser diode is pulse driven by a driving circuit 63 in response to light emitting pulses, collimated laser light is projected from the light projecting device 64. The laser light is reflected by the mirror 70, and is projected via a light projecting lens 65. The light projecting lens 65 is not necessarily required.

The mirror 70 is horizontally or vertically rotated, whereby the projected light is scanned in two dimensions within a predetermined angle range (a sensing area) as described above.

The horizontal scanning angle $\theta_H$ of the mirror 70 is sensed by a light emitting diode (LED) 72H for projecting light toward an opposite surface (this surface is also a mirror surface) of the mirror 70, a position sensing device (PSD) 73H for sensing the position of reflected light from the mirror 70, and an angle sensing circuit 74H for converting a position signal of the position sensing device 73H into a horizontal scanning angle signal, and is fed to the CPU 61.

The vertical scanning angle $\theta_V$ of the mirror 70 is sensed by a light emitting diode 72V for projecting light toward the opposite surface of the mirror 70, a position sensing device 73V for sensing the position of reflected light from the mirror 70, and an angle sensing circuit 74V for converting a position signal of the position sensing device 73V into a vertical scanning angle signal, and is fed to the CPU 61.

A road has a lot of reflectors (roadside reflectors) provided with suitable spacing along its roadside. A center line of the road or a line for dividing a lane is drawn in white or yellow. Reflectors (road surface reflectors) are also provided on the white line or the yellow line. Two reflectors (vehicle reflectors) are respectively mounted at both ends of the rear (in the vicinity of a location on which a tail lamp is mounted) of a vehicle generally having four or more wheels such as a passenger car, a bus or a truck. One reflector (the vehicle reflector) is mounted on a two-wheeled vehicle. The roadside reflector, the road surface reflector and the vehicle reflector are so-called retroreflectors, and have such property that the direction of reflection is approximately the same as the direction of incidence.

The laser light projected from the head 60 in the laser radar 14 is reflected from the body of the vehicle, the white line or the yellow line on the road surface, the various reflectors, and the like and is returned to the head 60. In general, the intensity of the reflected light from the reflectors is high, and the intensity of the reflected light from the body of the vehicle, the white line, and the like is low. Further, the intensity of the reflected light generally varies depending on the distance from the head 60 to a reflecting object. The shorter the distance is, the higher the intensity of the reflected light is. Even the reflected light from the body of the vehicle, or the like has detectable intensity in a case where the body is a short distance from the head 60.

The reflected light from such a reflecting object is condensed by the light-receiving lens 66, and impinges upon a light receiving element (e.g., a photodiode) 67. A received light signal of the light receiving element 67 enters a measuring circuit 69 via an amplifier 68.

The measuring circuit 69 measures time from the time point where the light emitting timing signal is inputted to the time point where the received light signal is inputted, and calculates the distance d to the reflecting object (the distance the light propagates back and forth; see FIG. 29b) using this time and the speed of light. In addition, the measuring circuit 69 outputs a level signal representing the level S of the received light signal inputted from the amplifier 68. A signal representing the distance d and the signal representing the received light signal level S are inputted to the CPU 61.

Referring again to FIGS. 29a and 29b, the position of the head 60 is taken as the origin, and the Y-axis and the X-axis are respectively drawn forward and rightward from the origin within a horizontal plane. Further, the Z-axis is drawn upward from the origin.

Upon receipt of the horizontal scanning angle $\theta_H$, the vertical scanning angle $\theta_V$ and the distance d with respect to each of scanning points, the CPU 61 converts these values represented by polar coordinates into values on orthogonal coordinates comprising the X, Y and Z axes.

The maximum measurable distance is 150 m, for example. The resolution of the distance is set to 0.01 m. The horizontal scanning angle is set to 400 mrad. It is assumed that the horizontal scanning angle range is divided into 4000, and measurements are made in 4000 angle positions (4000 pulse light rays are projected). Further, the vertical scanning angle is set to 100 mrad. It is assumed that the vertical scanning angle is divided into 40, and measurements are made forty times. It is assumed that the received light signal level S has 20 levels of resolution.

The CPU 61 performs rounding processing (averaging processing) of the obtained distance d and the level S. For example, measured values corresponding to 4000 times which are obtained in the range of the horizontal scanning angle are rounded off to data in 100 directions. That is, 40 data are rounded off to one data. Measured values corresponding to 40 times which are obtained in the range of the vertical scanning angle are rounded off to data in 10 directions. That is, four data are rounded off to one data. The rounding processing may be performed either before conversion to X, Y, and Z coordinates or after the conversion.

In either case, a total of 1000 position data comprising 100 position data in the horizontal direction (the X-axis direction) and 10 position data in the vertical direction (the Z-axis direction) are obtained in one two-dimensional scanning. Data representing the distance to a reflecting object (in the Y-axis direction) and data representing the received light signal level are appended with respect to each of the 1000 position data (1000 sensing points).

FIG. 30 is a diagram in which the above-mentioned data obtained by performing two-dimensional scanning once are summarized. The 1000 position data are assigned sensing point numbers. The CPU 61 produces such data for each two-dimensional scanning and stores the data in its memory.

With respect to the position where no reflecting object is sensed (the position where the level of reflected light is very low or is equal to zero), both the value on the Y-axis and the value of the received light signal level are set to zero. Accordingly, positions where some reflecting objects are sensed and the number of positions (the positions of sensing points and the number of sensing points) are recognized.

The information processor 10 in the on-vehicle apparatus 3 creates various feature quantities or quantities of state on the basis of the data shown in FIG. 30 which are produced by the CPU 61. The information processor 10 also creates traffic jam information, accident information, weather information and the other information on the basis of the feature quantities and the state quantities, and transmits the information to the center 9.

Description is now made of representatives of processing for creating feature quantities or state quantities in the information processor 10.

Data per two-dimensional scanning which are produced by the CPU 61 include data representing the signal level. Data having a low signal level is liable to induce an error in processing, whereby only data at a sensing point having a signal level of not less than a certain threshold level becomes an object to be processed.

Both the reflector and the body of the vehicle are larger than the distance between adjacent sensing points (when a horizontal scanning angle of 400 mrad is divided by 100 sensing light rays, the distance in the X-axis direction between two adjacent sensing points is approximately 4 mm in a position at a distance of 1 m in the Y-axis direction from the head 60). Consequently, reflected light rays are obtained from a plurality of points (sensing points) on the surface of one object to be sensed. Therefore, data based on the reflected light from an identical object to be sensed are put together so as to form one group.

Processing for putting data together (identifying processing) for each identical object to be sensed is performed on the basis of X, Y and Z coordinate data. If X-coordinate data and Z-coordinate data of the two sensing points are included in respective predetermined allowable ranges, it is judged that the two sensing points are sensing points on the identical object to be sensed. Predetermined allowable ranges will be determined in accordance with data representing the distance Y.

When a vehicle exists in a position close to the head 60, reflected light rays from the body of the vehicle and the reflectors form sensing points, and the sensing points are distributed in the range of a contour line of the body of the vehicle as viewed from the head 60, and are put together so as to form one group as ones on the identical object to be sensed (one vehicle) by the above-mentioned processing.

With respect to a vehicle existing in a position far away from the head 60, only reflected light rays from reflectors mounted on the vehicle will form sensing points. The vehicle is provided with two reflectors. There is a predetermined space narrower than the width of the vehicle between the two reflectors. Consequently, sensing points based on reflected light rays from two reflectors which are in approximately the same positions on the Y-axis and between which there is a difference in position which is approximately equal to the above-mentioned predetermined space (determined depending on the Y-coordinate value) in the X-axis direction are put together as ones belonging to the identical object to be sensed (one vehicle).

The position (the X, Y and Z coordinate values) of the object to be sensed which is thus identified and the number of objects to be sensed are detected.

The laser radar 14 is carried on a traveling vehicle. The relative speed of the object to be sensed which is detected in the above described manner relative to the vehicle carrying the laser radar 14 is found in the following manner.

Two-dimensional scanning data (as shown in FIG. 30) corresponding to at least twice (preferably, three times) are used for calculating the relative speed. A window is set in the Y-axis direction on the scanning data. This window is set to the size corresponding to the distance an object moving at the conceivable maximum relative speed displaces or a slightly greater distance during a period (time period) of two-dimensional scanning performed two times. If an object detected on the basis of the preceding (first) two-dimensional scanning data and an object detected on the basis of the current (second) two-dimensional scanning data are included in the window, it is judged that the objects are identical.

A displacement vector leading from the preceding position of the identical object to the current position thereof is set. Preferably, the position where the object will exist in the subsequent (third) two-dimensional scanning is presumed on the basis of the displacement vector. If an object detected on the basis of the third two-dimensional scanning data is in the vicinity of the presumed position, it is determined that the object identified on the basis of the first and second two-dimensional scanning data is reliably an identical object.

The direction of movement and the relative speed of the object to be sensed (with respect to the directions of the X-axis, the Y-axis and the Z-axis and a resultant thereof) are calculated on the basis of the above-mentioned displacement vector. The traveling speed of the vehicle carrying the laser radar 14 is sensed by the vehicle speed sensor 13. The absolute speed of the object to be sensed is found by adding the relative speed (having positive and negative signs) to the sensed vehicle speed.

As described above, a number of reflectors are provided along the shape of the road with predetermined spacing on the center line and on the roadside of the road. It is judged that the reflectors are separate objects to be sensed in the above-mentioned processing for identifying the identical object to be sensed. The reflectors have the properties of being arranged along a straight line or a curved line with predetermined spacing, having a relative speed approximately equal to the vehicle speed sensed by the vehicle speed sensor 13, and moving in the opposite direction. The road surface reflector and the roadside reflector are distinguished from the other objects to be sensed utilizing the properties. Since the road surface reflector and the roadside reflector are provided at different height positions, these two kinds of reflectors can be distinguished from each other using Z-axis coordinate data. Since the direction of the arrangement of the road surface reflectors and the roadside reflectors represents the shape of the road, the shape of the road is judged. Further, the presence or absence of the slope of the road and the degree thereof are judged on the basis of the height positions of the reflectors or the displacement vector.

The details of identifying, sensing and judging processing of the feature quantities or the state quantities are described in Japanese Patent Application Nos. 4-305019, 6-52512 and 6-83793 filed by the same applicant.

If almost all of objects existing on the road, particularly a highway are vehicles (including two-wheeled vehicles) and road surface reflectors and roadside reflectors, the number of road surface reflectors and roadside reflectors are subtracted from the number of all objects to be sensed which are identified, whereby the approximate number of vehicles existing is calculated.

A set of sensing points which are judged to belong to one object to be sensed as described above forms one two-dimensional image on XZ planes. It is judged what is an object to be sensed on the basis of the shape of the two-dimensional image.

Figure 31A:
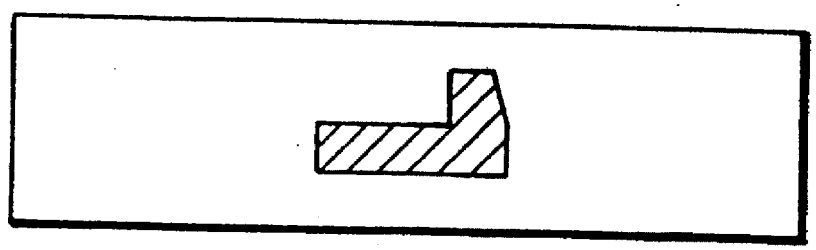
FIGS. 31a, 31b and 31c show how different shapes are respectively sensed.
Figure 31B:
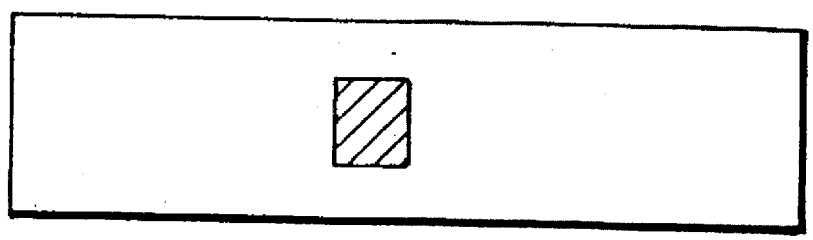
Figure 31C:
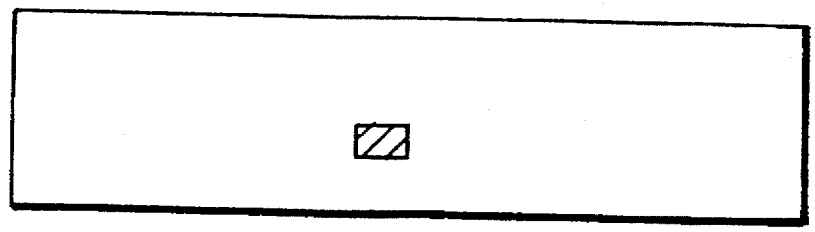

For example, it is judged that a two-dimensional image shown in FIG. 31a is of a heavy-duty truck directed sideways (in a direction crossing a road). It is judged that a two-dimensional image shown in FIG. 31b is of a heavy-duty truck directed forward or backward, and a two-dimensional image shown in FIG. 31c is of a standard-sized car directed forward or backward because the height thereof is low. Such judgment will be made by a method of pattern matching and the other method based upon comparison in the height, the width and the area. In calculating the height, the width and the area, the distance from the head 60 (the Y-coordinate value) is naturally considered.

What is an object to be sensed or the shape thereof can be judged. Moreover, the direction of the object to be sensed (sideways, forward, etc.) is also judged as described above. As described above, it is also judged whether the object to be sensed is standing still or is moving based on the displacement vector. If the object to be sensed is moving, the direction and the speed thereof are also detected.

Since the shapes of a number of objects existing on the road are represented as two-dimensional images also making use of a sensing point having a low signal level, more types of objects can be recognized. Also in this case, identifying processing as to whether or not a sensing point belongs to an identical object to be sensed is performed with regard to all sensing points, and a two-dimensional image is obtained by a set of sensing points which are judged to belong to the identical object to be sensed.

One example of the basis for judgment in recognizing an object is as follows.

An object whose transverse width is approximately 50 cm, whose height is a little less than 2 m, and whose absolute speed is small is a person.

An object whose transverse width is approximately 50 cm, whose height is approximately 1.5 m and whose absolute speed is high to some extent is a two-wheeled vehicle (if the absolute speed thereof is low, the object may be judged to be a person).

An object whose transverse width is approximately 2 m and whose height is approximately 1.5 m is a standard-sized vehicle.

An object whose transverse width is approximately 3 m and whose height is approximately 3 m is a heavy-duty truck.

An object whose transverse width is not less than 3 m and whose absolute speed is approximately zero is a wall.

An object whose absolute speed is approximately zero and which is positioned above is a signboard.

A long narrow and continuous object is a white line.

An object whose received light signal level is high, whose transverse width is small and whose absolute speed is approximately zero is a roadside reflector.

Recognizing processing as to what is an object is performed by fuzzy inference, threshold processing (judgment based on comparison with a threshold value), or the like.

The information processor 10 judges the presence or absence of a traffic jam, the degree thereof, the presence or absence of an accident, the degree thereof, and the like in the following manner mainly on the basis of the above-mentioned feature quantities or state quantities.

Description is first made of processing for creating traffic jam information. This processing is performed by fuzzy inference, whereby it is judged whether or not a traffic jam occurs on the basis of the detected number of vehicles, the average distance between vehicles, the average speed, and the duration of a state where each above factor has a certain degree of magnitude.

The number of vehicles is the number of vehicles existing in a sensing area of the laser radar 14, as described above.

When one vehicle is taken as a reference vehicle, the distance between vehicles is the distance between a vehicle closest to the reference vehicle out of vehicles traveling ahead of the reference vehicle and the reference vehicle. The positions of almost all the vehicles existing in the sensing area of the laser radar (the positions of the vehicles cannot, in some cases, be detected in a state where the preceding vehicles are hardly seen because they are overlapped with each other, as viewed from the rear) are detected by the above-mentioned feature quantities creating processing. The spacing between the front and rear vehicles adjacent to each other (the distance between the vehicles) is calculated. The average value of the calculated distances between the vehicles is the average distance between the vehicles.

The relative speeds of almost all the vehicle existing in the sensing area of the laser radar are calculated from displacement vectors of the vehicles, and the vehicle speed of the present vehicle is added to the relative speeds, to calculate the absolute speeds thereof. The average value of the absolute speeds of the vehicles in the sensing area is the average speed. The following "If, then" rule is prepared.

R1: There is a traffic jam if the number of vehicles is large.

R2: There is no traffic jam if the number of vehicles is small.

R3: There is a traffic jam if the average distance between vehicles is short.

R4: There is no traffic jam if the average distance between vehicles is long.

R5: There is a traffic jam if the average speed is low.

R6: There is no traffic jam if the average speed is high.

R7: There is a traffic jam if a state where the number of vehicles is large continues for a long time.

R8: There is no traffic jam if a state where the number of vehicles is small continues for a long time.

R9: There is a traffic jam if a state where the average distance between vehicles is short continues for a long time.

R10: There is no traffic jam if a state where the average distance between vehicles is long continues for a long time.

R11: There is a traffic jam if a state where the average speed is low continues for a long time.

R12: There is no traffic jam if a state where the average speed is high continues for a long time.

Examples of membership functions used in the rules R1 to R12 are illustrated in FIGS. 32a through 37b.

Figure 32A:
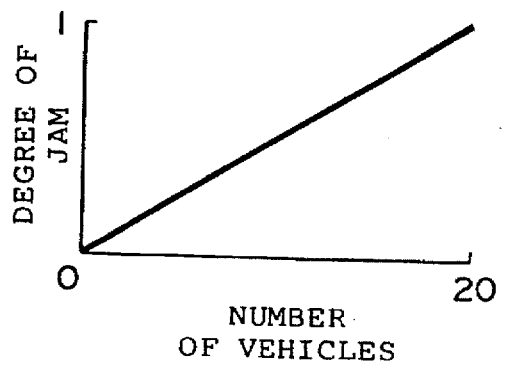
FIGS. 32a and 32b are graphs respectively showing examples of membership functions used in fuzzy inference for judgment of a traffic jam.
Figure 32B:
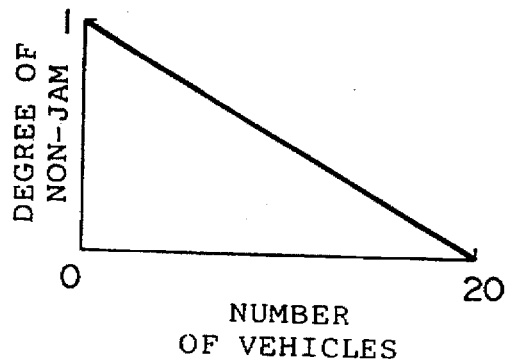

FIGS. 32a and 32b illustrate membership functions respectively used in the rules R1 and R2. The degree of jam is the degree at which it can be said that traffic is jammed, and the degree of non-jam is the degree at which it can be said that traffic is not jammed.

Figure 33A:
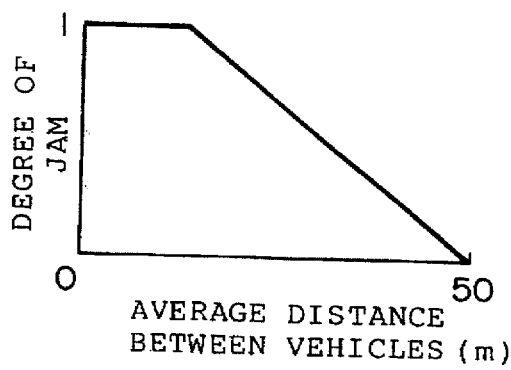
FIGS. 33a and 33b are graphs respectively showing examples of membership functions used in fuzzy inference for judgment of a traffic jam.
Figure 33B:
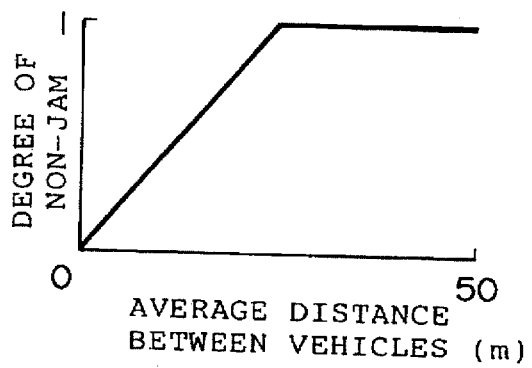

FIGS. 33a and 33b illustrate membership functions for the rules R3 and R4.

Figure 34A:
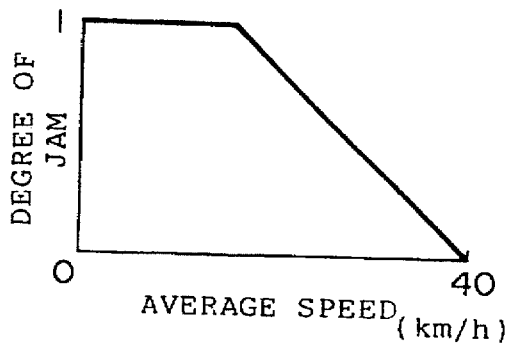
FIGS. 34a and 34b are graphs respectively showing examples of membership functions used in fuzzy inference for judgment of a traffic jam.
Figure 34B:
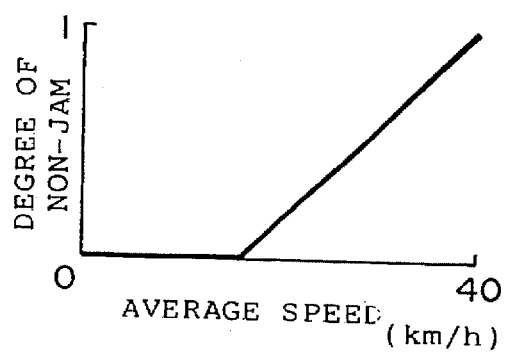

FIGS. 34a and 34b illustrate membership functions respectively used in the rules R5 and R6.

Figure 35A:
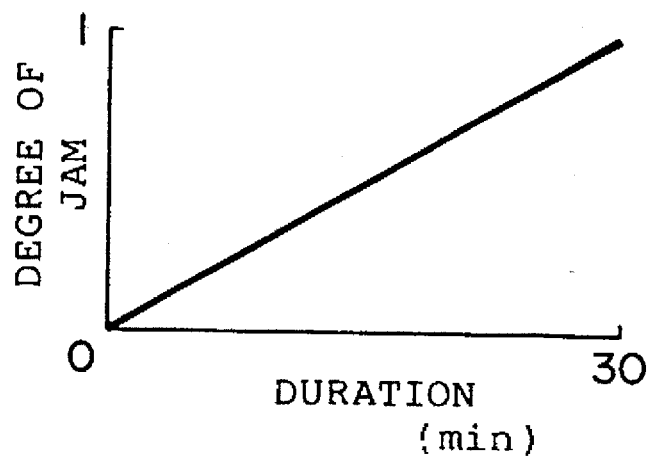
FIGS. 35a and 35b are graphs respectively showing examples of membership functions used in fuzzy inference for judgment of a traffic jam.
Figure 35B:
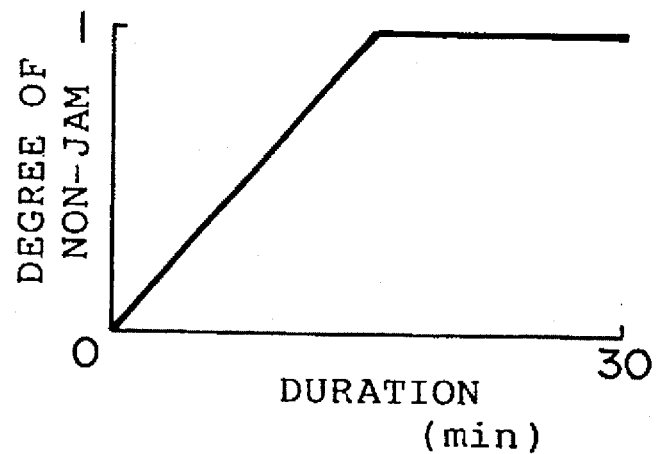

FIGS. 35a and 35b show membership functions respectively used in the rules R7 and R8. A state where the number of vehicles is large is a state where the detected number of vehicles is not less than 10, for example, while a state where the number of vehicles is small is a state where the detected number of vehicles is less than 10, for example.

Figure 36A:
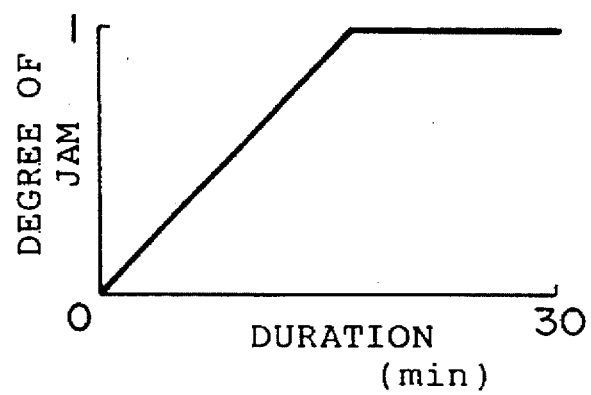
FIGS. 36a and 36b are graphs respectively showing examples of membership functions used in fuzzy inference for judgment of a traffic jam.
Figure 36B:
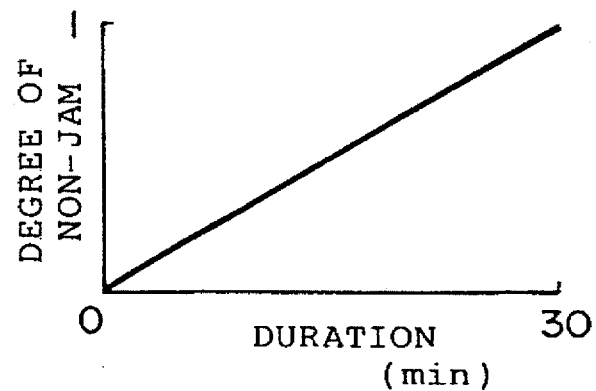

FIGS. 36a and 36b illustrate membership functions respectively for the rules R9 and R10. A state where the average distance between vehicles is short is a state where the average distance between vehicles is not more than 10 m, for example, while a state where the average distance between vehicles is long is a state where the average distance between vehicles is not less than 20 m, for example.

Figure 37A:
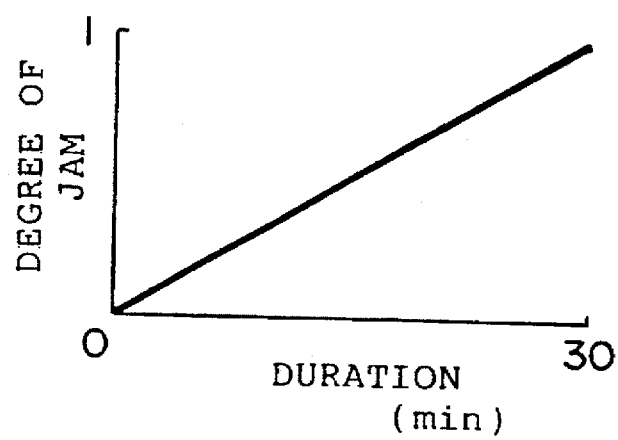
FIGS. 37a and 37b are graphs respectively showing examples of membership functions used in fuzzy inference for judgment of a traffic jam.
Figure 37B:
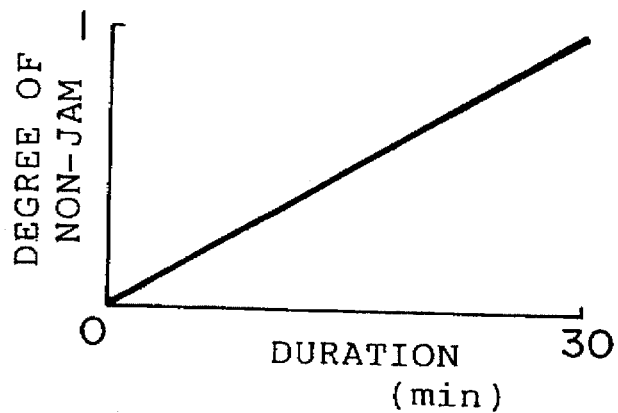

FIGS. 37a and 37b illustrate membership functions respectively used in the rules R11 and R12. A state where the average speed is low is a state where the average speed is not more than 20 Km/h, for example, while a state where the average speed is high is a state where the average speed is not less than 30 Km/h, for example.

Since the rules R7 to R12 are applied by measuring the duration of a certain state, processing based on the rules will be performed at predetermined time intervals (e.g., at intervals of 30 minutes).

FIGS. 32a to 37b illustrate membership functions indicated by straight lines. However, it goes without saying that the membership functions can be indicated by curved lines.

The detected number of vehicles, the average distance between vehicles, the average speed, the duration of a state where the number of vehicles is large, the duration of a state where the average distance between vehicles is short, and the duration of a state where the average speed is low are respectively applied to the membership functions shown in FIGS. 32a, 33a, 34a, 35a, 36a and 37a in accordance with the rules R1, R3, R5, R7, R9 and R11, to respectively obtain the degrees of jam. The sum of the degrees of jam is calculated.

Similarly, the detected number of vehicles, the average distance between vehicles, the average speed, the duration of a state where the number of vehicles is small, the duration of a state where the average distance between vehicles is long, and the duration of a state where the average speed is high are respectively applied to membership functions shown in FIGS. 32b, 33b, 34b, 35b, 36b and 37b in accordance with the rules R2, R4, R6, R8, R10 and R12, to respectively obtain the degrees of non-jam. The sum of the degrees of non-jam is calculated.

The sum of the degrees of jam and the sum of the degrees of non-jam are compared with each other. It is judged that a traffic jam occurs if the sum of the degrees of jam is larger, while it is judged that no traffic jam occurs if the sum of the degrees of non-jam is larger. When it is judged that a traffic jam occurs, the difference between the two sums is taken as the degree of jam (which is preferably normalized).

Any one or a plurality of the above-mentioned rules may be omitted, or other rules may be added.

Accident information is produced based upon the type of an object to be sensed, the direction thereof, the absolute speed thereof, the shape of the road, and the like out of the above-mentioned feature quantities.

Figure 38:
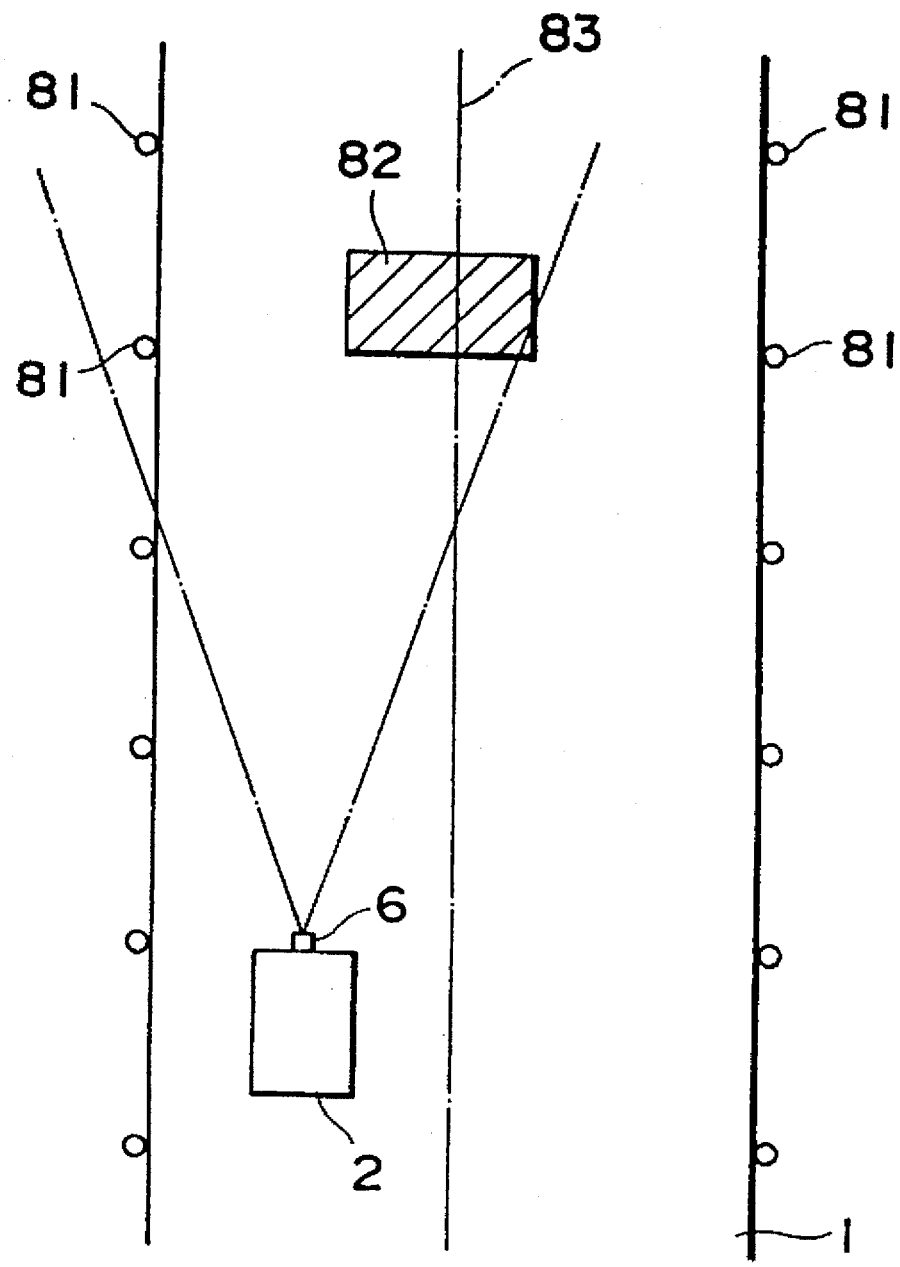
FIG. 38 shows how the occurrence of an accident is detected.

For example, as shown in FIG. 38, in a road 1 having roadside reflectors 81 provided on both its sides, if it is detected that an object to be sensed which is recognized as a heavy-duty truck is directed sideways across (almost perpendicularly intersecting) a center line 83, and that the absolute speed of the object to be sensed is zero (the object to be sensed stops), it is judged that an accident has happened. The number of vehicles involved in the accident and the distance to the scene of the accident are also detected.

The accident information will include the presence or absence of an accident, the conditions of the accident, the number of vehicles involved in the accident, the distance from the position of the present vehicle to the scene of the accident, and the like.

If a laser radar is used, weather information is also obtained.

For example, in the case of fair weather, disturbance noise caused by sunlight is received by a light receiving optical system (a light receiving element 67) of the laser radar 14. When a high-level received light signal is obtained from the light receiving element 67 at timing at which a laser diode of the light projector 64 does not emit light, it is judged that sunlight impinges, whereby the weather is judged to be fair.

When a small object to be sensed (whose width and height are very small) is detected discretely and discontinuously at close range, the weather is judged to be rainy or snowy. If there is provided a temperature sensor, it will be judged whether the weather is rainy or snowy on the basis of the sensed temperature.

Rain or snow is also recognized by detecting water drops or snow adhering to the front surface of the laser radar. For example, when there is a sensing point in a position at a distance of 0 m, it is judged to be waterdrops or snow.

In addition thereto, rain or a puddle is sensed by judging water splashed by the preceding vehicle.

Although description was made of detection and judgment of an environment surrounding the present vehicle using the laser radar, each vehicle can collect more accurate information by providing another group of sensors. Examples of the sensors include a solar radiation sensor, a raindrop sensor, a handle angle sensor, a wiper on/off sensor, a temperature sensor, and a road surface condition sensor (a road surface discriminator). The road surface discriminator and the raindrop sensor will be described in detail later.

For example, the number of times the driver stepped on the brake pedal or the accelerator pedal within a predetermined time period is counted, and the counted value can be considered in the above-mentioned judgment of a traffic jam.

The weather information can be created on the basis of information from a water droplet sensor (measuring the amount of rainfall as well), a solar radiation sensor, a sensor for sensing the number of times of on/off of a wiper, a road surface condition sensor (sensing dry, wet, freezing, rain, etc.), and the like.

When there is provided an air bag impact sensor for sensing, when the present vehicle collides, the impact thereof, it can be determined that the present vehicle develops an accident.

Accident information can be also further obtained by communication between vehicles. On developing an accident or detecting an accident, a traveling vehicle transmits the information to the succeeding vehicle by communication. An information processor 10 in the succeeding vehicle synthesizes the information obtained from the laser radar and the information obtained by the communication to create information relating to the accident.

A specific example of the construction of the road surface discriminator 15 will be described in detail. The road surface discriminator is described in International Publication Number WO95/01549 (PCT/JP94/01053).

Figure 39:
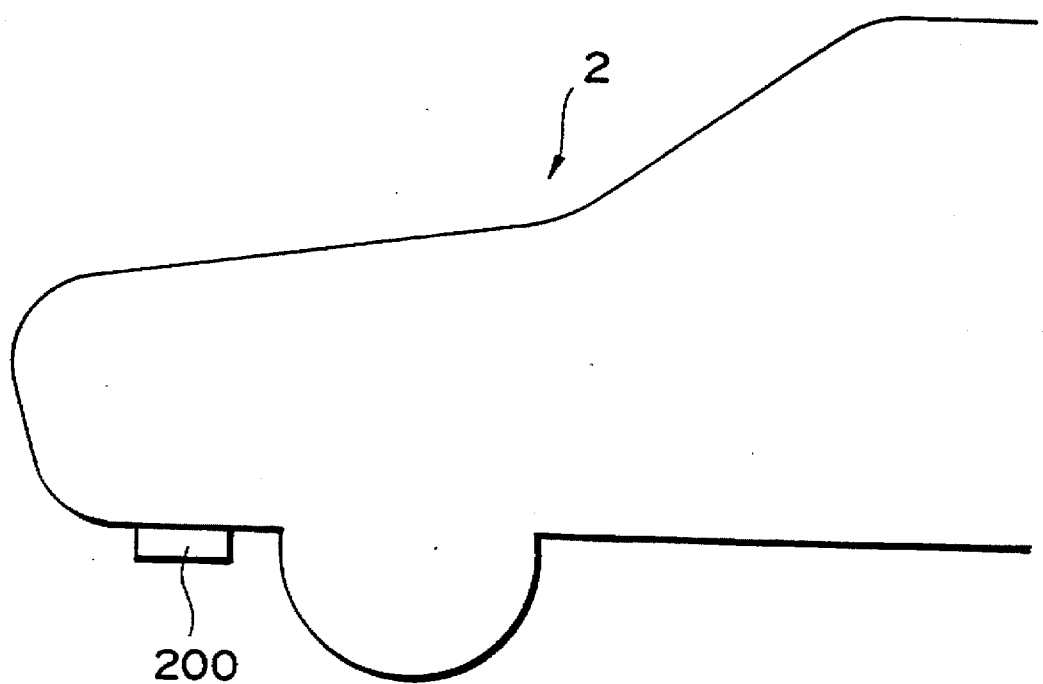
FIG. 39 illustrates a vehicle comprising an optical system of a road surface discriminator.

An optical system 200 in the road surface discriminator 15 (the construction shown in FIGS. 40, 41 and 42) is fixed and directed downward at a suitable location of the lower portion of a vehicle 2, as shown in FIG. 39. Light is projected toward a road surface LD of a road 1 from the optical system in the road surface discriminator 15, and light reflected from the road surface LD is received by the optical system. The road surface conditions are discriminated by a signal processing circuit (see FIG. 44) on the basis of an electric signal obtained from the optical system.

Typical examples of the road surface conditions discriminated are as follows:

snow;

asphalt (or concrete); and gravel (or earth (soil) or sand).

It is also judged whether or not a road surface is frozen.

Furthermore, an asphalt (concrete) road surface can be subdivided into the following two conditions:

wet asphalt (concrete), and dry asphalt (concrete).

Accordingly, the modes of discrimination include identifying an arbitrary road surface condition out of the above-mentioned road surface conditions and discriminating among two or more arbitrary road surface conditions. Representatives of the modes of discrimination are as follows:

a. identification of a snowy road;

b. identification of an asphalt road (concrete road);

c. identification of a gravel road (earth or sandy road);

d. identification of a frozen road surface;

e. identification of a wet asphalt road;

f. identification of a dry asphalt road;

g. discrimination between a snowy road and an asphalt road;

h. discrimination between a snowy road and a gravel road;

i. discrimination between an asphalt road and a gravel road;

j. discrimination among a snowy road, an asphalt road and a gravel road;

k. judgment whether an asphalt road is in a wet condition or a dry condition in cases of g, i and j mentioned above; and m. judgment whether a road surface is frozen or not in cases of g, h, i, j and k mentioned above.

The following description is focused on the mode m, which has the most types of road surface conditions to be discriminated. It goes without saying that road surface discrimination of any of the modes a to k mentioned above is possible by extracting only a required portion of the optical structure, a required portion of the electrical configuration and a required portion of an algorithm.

Figure 40:
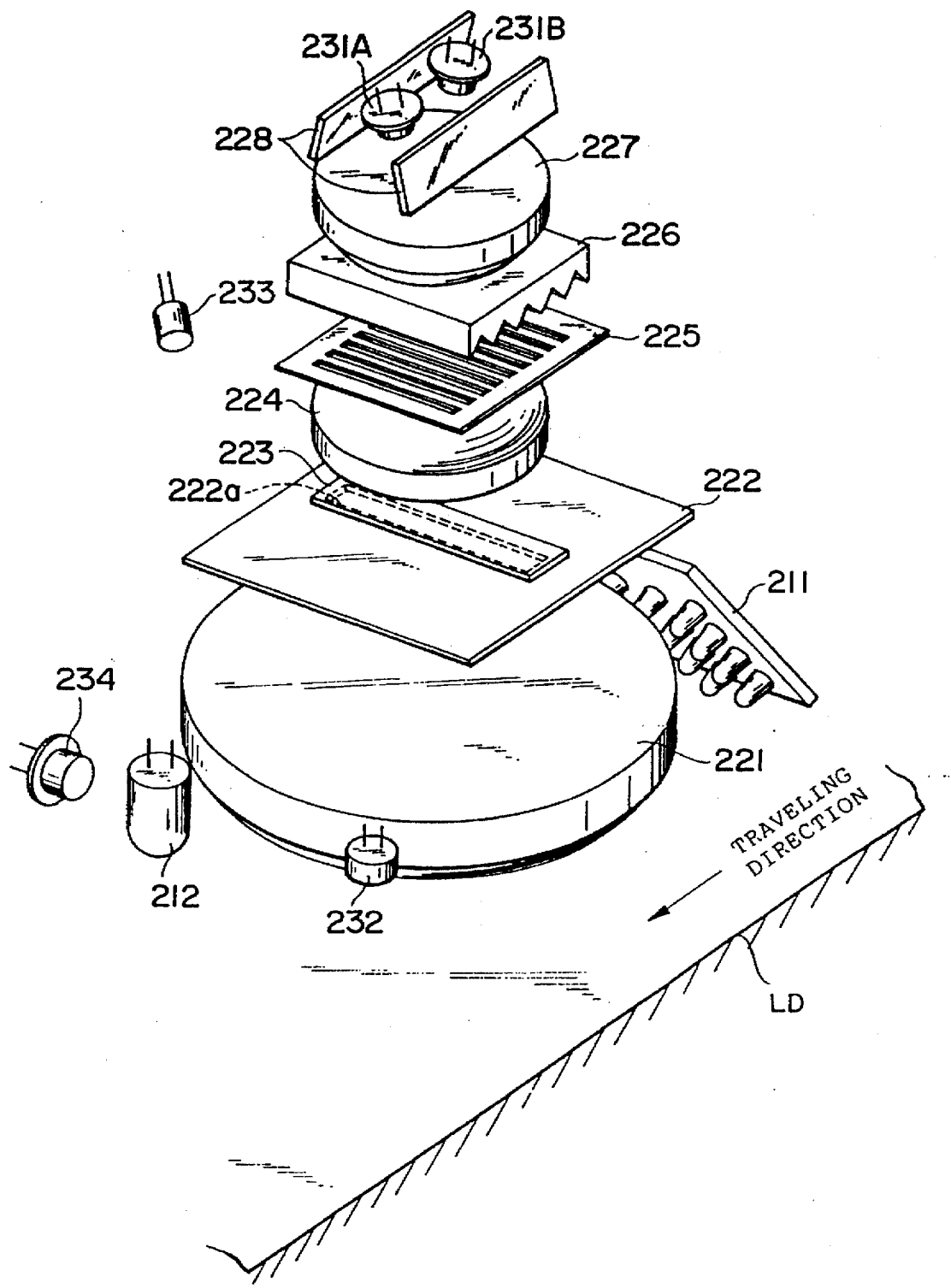
FIG. 40 is a perspective view showing the optical structure of a road surface discriminator.
Figure 41:
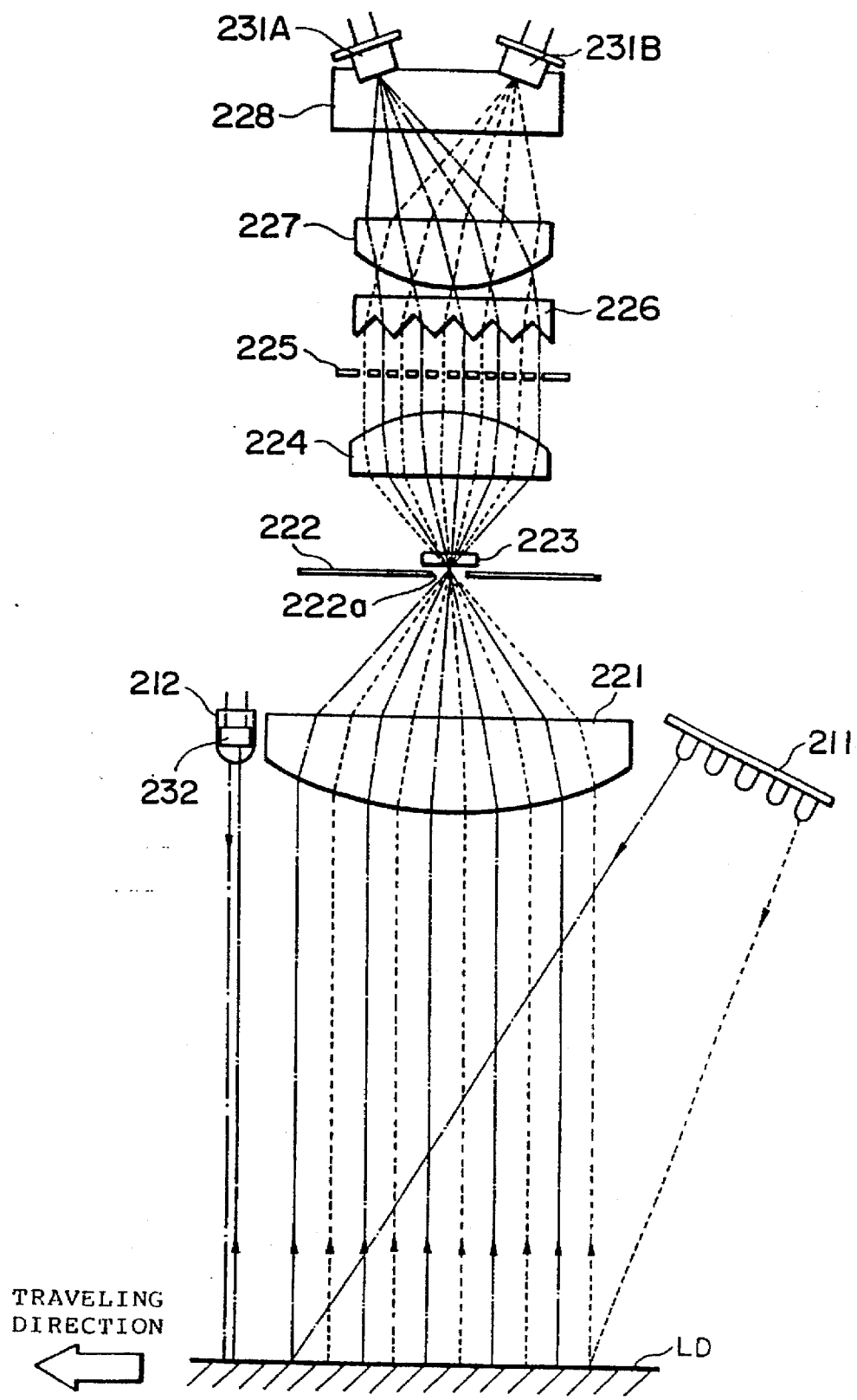
FIG. 41 is a longitudinal sectional view showing the optical structure of a road surface discriminator.
Figure 42:
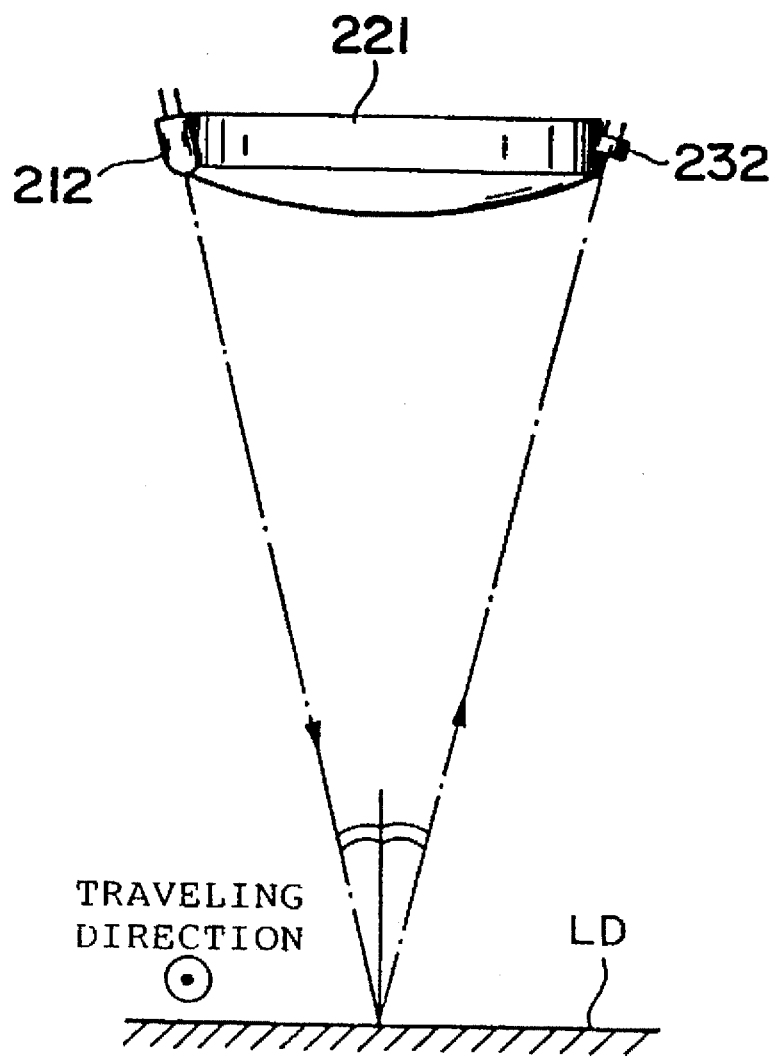
FIG. 42 is a front view of an optical system for regular reflected light.
Figure 44:
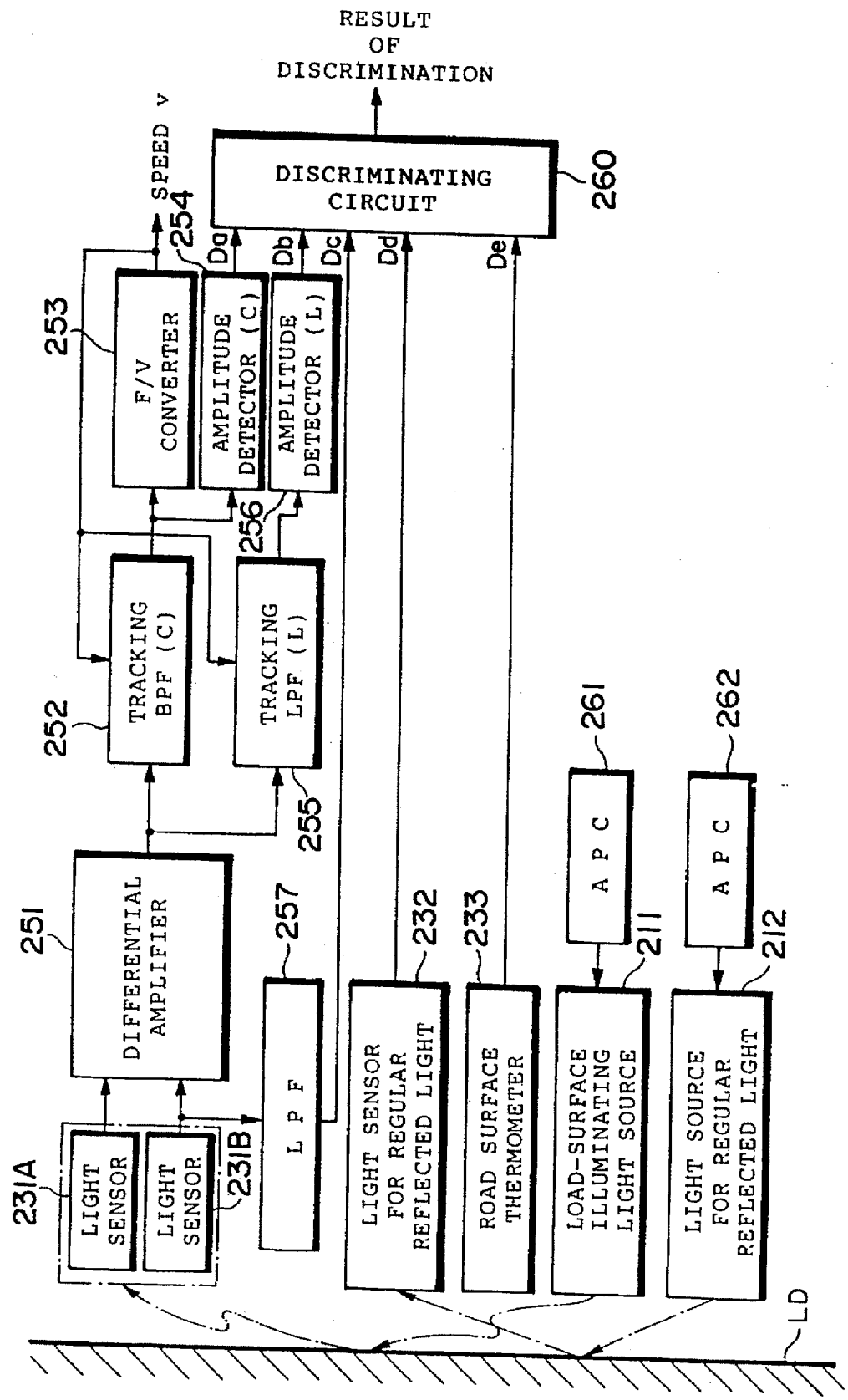
FIG. 44 is a block diagram showing the electrical configuration of a road surface discriminator.

FIGS. 40 through 42 illustrate the structure of the optical system 200 in the road surface discriminator 15. In order to reduce the number of drawings, all optical elements required to actually execute all of several road-surface discrimination algorithms described in detail later are drawn in the optical system. Conversely, this optical system also includes optical elements not required to execute a certain road-surface discrimination algorithm. Therefore FIGS. 40 through 42 express all optical elements contained in optical systems of several road surface discriminators. This fact applies to a signal processing circuit of FIG. 44 as well. When this optical system and the signal processing circuit shown in FIG. 44 are used, therefore, road surface discrimination of the above-mentioned mode m is possible. In a case where a road surface discriminator capable of road surface discrimination of any of the above-mentioned modes a to k is implemented, unnecessary optical elements and electrical circuit elements should be only deleted.

A light source 211 for road surface illumination and a light source 212 for regular (specular) reflected light are included in the optical system. Both the light sources 211 and 212 are constituted by light-emitting diodes. The light source 211 for road surface illumination projects light obliquely downward in the traveling direction of the vehicle. The light source 212 for regular reflected light projects light obliquely downward in a direction perpendicularly intersecting the traveling direction. Preferably, the wavelengths of the light projected from the light sources 211 and 212 differ. As a result, light of the light sources reflected from a road surface LD can be separated by an optical filter.

A light-receiving optical system for receiving diffuse reflected light from the road surface includes a light-receiving lens 221, a slit plate 222 and a collimating lens 224. The focal point of the light-receiving lens 221 and the focal point of the collimating lens 224 are at the same position, and a slit (diaphragm) 222a in the slit plate 222 is situated at the focal points. The slit 222a extends in a direction perpendicular to the traveling direction of the vehicle. Such an optical system is referred to as a telecentric optical system. That is, of the reflected light from the road surface LD, only light rays perpendicular to the road surface LD and parallel to one another (in FIG. 41) converge at the focal point of the light-receiving lens 221 and pass through the slit 222a. The light rays that have passed through the slit 222a are rendered parallel by the collimating lens 224. The light from the light source 211 impinges obliquely on the road surface LD. Only light reflected perpendicularly from the light source LD passes through the slit 222a. Thus, only diffuse reflected light from the road surface LD is collimated by the collimating lens 224 and enters a spatial filter optical system (that is, regular (specular) reflected light from the road surface LD does not enter the spatial filter optical system).

Preferably, an optical filter 223 is arranged at the position of the slit 222a of slit plate 222. This filter 223 exhibits wavelength selectivity for passing only the light projected from the light source 211 for road surface illumination. As a result, the light from the light source 212 for regular reflected light and other extraneous light (sunlight, light from road illuminating lamps, etc.) is prevented from impinging upon the spatial filter optical system. The light projected from the light source 211 is preferably infrared light.

The spatial filter optical system includes a grating plate (slit array) 225, a prism array 226, a condenser lens 227, and two light sensors (light-receiving elements, e.g., photodiodes or phototransistors) 231A and 231B. The prism array 226 basically acts as a spatial filter.

The prism array 226 is constituted by a number of prisms. The prisms are arrayed in the traveling direction of the vehicle and extend in a direction perpendicular to the traveling direction. The prism array 226 is preferably molded as a unitary body. The light rays rendered parallel by the collimating lens 224 are separated by refraction alternately back and forth (with the traveling direction used as a basis) each at a fixed pitch width by the prisms of the prism array 226. The separated light rays are each condensed by the condenser lens 227 and impinge upon the two light sensors 231A and 231B.

The light indicated by dots-and-dashes lines in FIG. 41 impinges upon the light sensor 231A, and the light indicated by dots lines impinges upon the light sensor 231B. The width of these light rays depends on the period at which the prisms are arrayed. The prism array period determines the characteristic (period) of the spatial filter.

A number of slits arrayed in the traveling direction of the vehicle and extending in the direction perpendicular to the traveling direction are formed in the grating plate (slit array) 225. The period at which the slits are arrayed is one-half the array period of the prisms of prism array 226. Of the light rays rendered parallel by the collimating lens 224, the light rays which have passed through the slits impinge upon the prism array 226 to be separated, as described above, and the separated light rays are received by the light sensors 231A and 231B alternately in space. The grating plate 225 prevents stray light from impinging upon the prism array 226.

The light sensors 231A and 231B are arranged with spacing in the traveling direction of the vehicle. The spacing is decided by the period of the prisms of the prism array 226 and the magnification of the condenser lens 227. Mirrors 228 are provided on both sides of the light sensors 231A and 231B and act in such a manner that light not condensed on light-receiving surfaces of the light sensors 231A and 231B by the lens 227 will impinge upon the light sensors 231A and 231B as much as possible.

As will be illustrated later, output signals from the two light sensors 231A and 231B are fed to a differential amplifier circuit, where the difference therebetween is calculated. An output signal of the differential amplifier circuit contains a frequency component (which is dependent upon the speed of the vehicle) corresponding to a spatial frequency component representing the condition of the road surface that causes fluctuations in diffuse reflected light, wherein the road surface condition includes roughness of the road surface.

The light rays incident upon the light sensor 231A and the light rays incident upon the light sensor 231B are out of phase by a period which is one-half the spatial period selected by the spatial filter. Accordingly, the spatial center frequency component is doubled by taking the difference between the output signals of both the light sensors 231A and 231B. Direct-current (DC) components are canceled out mainly by the differential processing.

The light source 212 for regular reflected light and a light sensor 232 for regular reflected light are arranged in a plane perpendicularly intersecting the traveling direction of the vehicle in such a manner that the angle of incidence of projected light from the light source 212 upon the road surface LD and the angle of reflection of reflected light from the road surface incident upon the light sensor 232 are made equal. Since the angle of incidence and the angle of reflection can be made smaller than the Brewster angle (53°), a reduction in the size of the optical system can be expected. Preferably, an optical filter which allows the passage of only light having the wavelength of the projected light from the light source 212 and a condenser lens are arranged at the front of the light sensor 232.

A road surface thermometer 233 measures the temperature of the road surface and is implemented by an infrared radiation thermometer, by way of example. The road surface thermometer 233 need not be included in the optical system and may be provided at another suitable location of the vehicle.

Furthermore, a light sensor 234 for monitoring the amount of projected light is provided to receive a part of the projected light from the light source 212 for regular reflected light.

Figure 43:
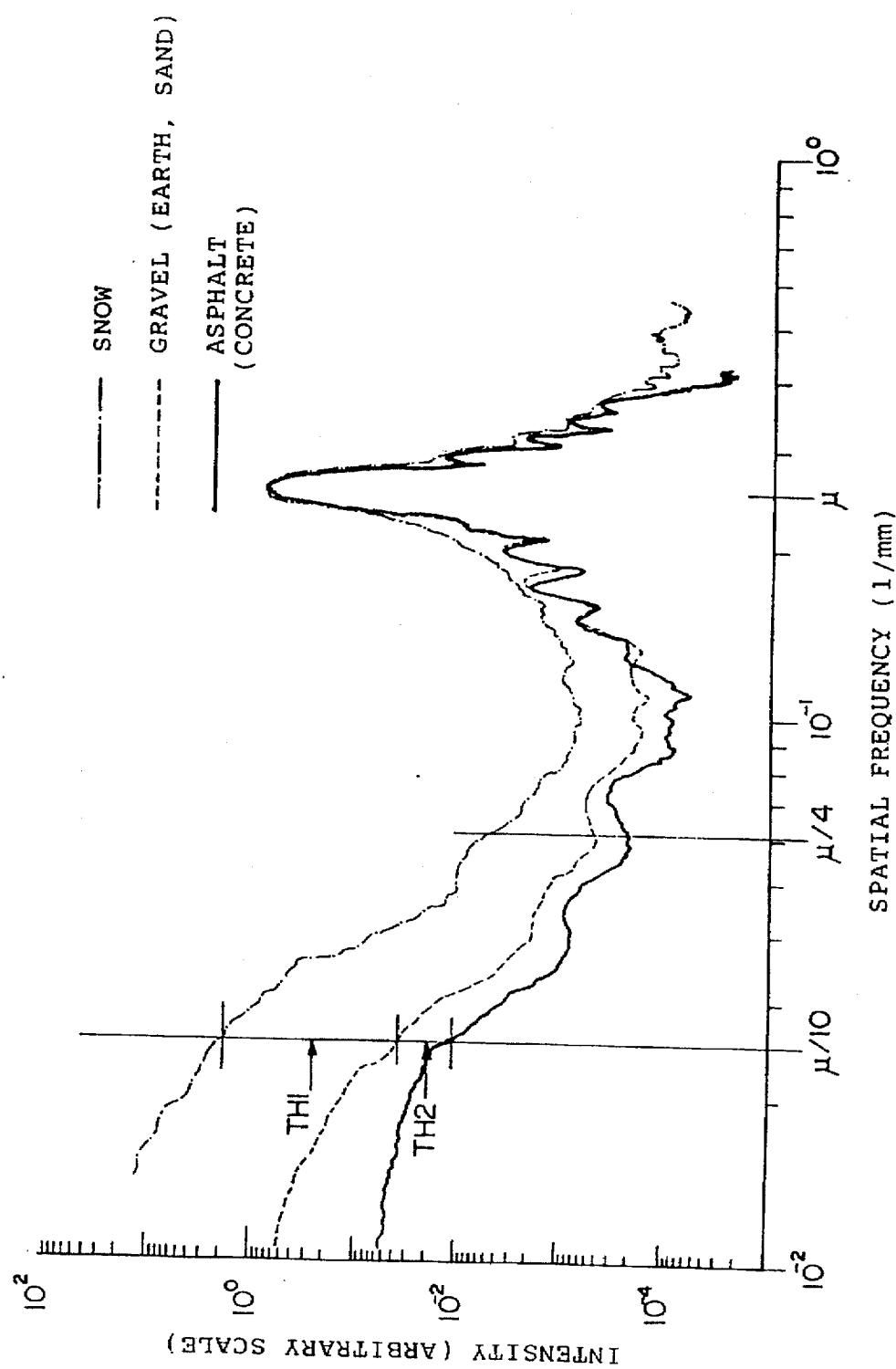
FIG. 43 is a graph showing the results of actual measurement.

FIG. 43 illustrates an example of actual measurement of a spatial frequency spectrum represented by a differential signal between the output signal of the light sensor 231A and the output signal of the light sensor 231B. This graph is the result of actually measuring three types of road surface conditions, namely snowy roads, gravel roads and asphalt roads.

The frequency (electrical center frequency) f of a center frequency signal component contained in the differential signal between the outputs of the light sensors 231A and 231B is represented by the product of a spatial center frequency μ, which is selected by the construction of the spatial filter, and the speed v of the vehicle, as follows:

$$f = \mu \times v \qquad \text{Eq. (1)}$$

The spatial center frequency μ is uniquely decided by the construction of the spatial filter. The road surface period (the period of the road surface condition that causes a change in the diffuse reflected light, wherein the road surface condition includes roughness of the road surface) selected by the spatial filter is set here to 4 (mm). FIG. 43 shows the result of subjecting an electric signal acquired by actual measurement to a Fourier transform (FFT: Fast Fourier Transform) to obtain a frequency spectrum, and then normalizing the frequency spectrum by the spatial center frequency μ. Further, data relating to snow, gravel and asphalt are normalized in such a manner that the peak values (intensities) in the spatial center frequency μ will coincide.

As can be seen from the graph, there are large and distinct differences between asphalt, snowy, and gravel roads in terms of the intensities of spatial frequency components (in the band below μ/4, for example) lower than the spatial center frequency μ. These differences are on the order of one place (factor of ten) or more. The lower the spatial frequency is, the larger the difference in intensity in the three types of road surface conditions becomes.

Accordingly, it is possible to discriminate among a snowy road, a gravel road and an asphalt road based upon a value (referred to as "[low-frequency component intensity/center-frequency component intensity]"=Db/Da) obtained by normalizing the low-frequency component intensity (at a frequency of μ/4 or μ/10, for example) of the spatial frequency by the center-frequency component intensity. Threshold values TH1 and TH2 used for discriminating among these roads should be decided as values intermediate between the values Db/Da in the respective conditions. In FIG. 43, a road is identified as a snowy road if the value Db/Da is more than the threshold value TH1, a gravel road if the value Db/Da lies between the threshold values TH1 and TH2, and an asphalt road if the value Db/Da is less than the threshold value TH2.

The snowy road mentioned here does not refer to a road covered with new snow (the entire surface of which is pure white) but rather to a snow surface worn down by vehicular and pedestrian traffic to take on a comparatively bumpy condition (i.e., considerably more bumpy than a gravel road, which road condition causes a change in the amount of diffuse reflected light).

An earthen or sandy road in which gravel is mixed also exhibits the same tendency, and the frequency spectrum of a concrete road is substantially the same as the spectrum of an asphalt road.

FIG. 44 illustrates an example of the configuration of a signal processing circuit included in the road surface discriminator.

The output signals of the light sensors 231A and 231B are fed to a differential amplifier circuit 251, which outputs a signal representing the difference between the two signals.

Figure 45:
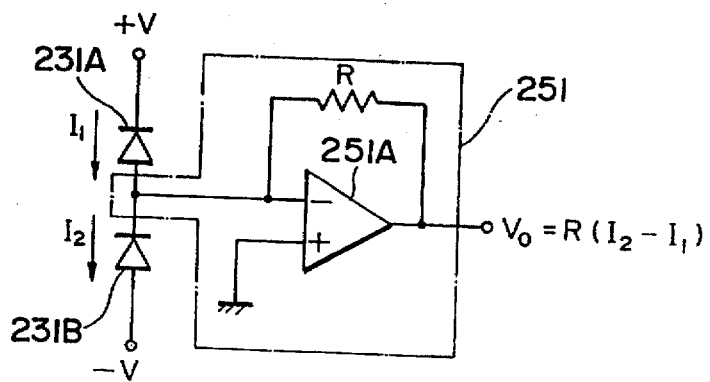
FIG. 45 is a circuit diagram showing a specific example of a differential amplifier circuit.

An example of the construction of the light sensors 231A and 231B and the differential amplifier circuit 251 is illustrated in FIG. 45. The light sensors 231A and 231B are each constituted by a photodiode, with the photodiodes being serially connected. The differential amplifier circuit 251 is constituted by an operational amplifier 251A having a feedback resistor R. The difference between a current $I_1$ which flows into the photodiode 231A and a current $I_2$ which flows into the photodiode 231B is calculated at the node of the photodiodes, and the difference current enters the operational amplifier 251A. The operational amplifier 251A converts the input difference current into a voltage signal $V_O$ and delivers the signal. The output voltage $V_O$ is given by the following equation:

$$V_O = R(I_2 - I_1)$$  Eq. (2)

The output voltage $V_O$ of the differential amplifier circuit 251 is applied to a tracking band-pass filter (tracking BPF (C)) 252 and a tracking low-pass filter (tracking LPF (L)) 255.

An output signal of the tracking BPF 252 is fed to a frequency/voltage (F/V) converter circuit 253. An output signal of the F/V converter circuit 253 represents the speed (ground speed) v of the vehicle carrying the road surface discriminator. The output signal of the F/V converter circuit 253 is fed back to the tracking BPF 252 and the tracking LPF 255 and is used for changing the cut-off frequencies (frequency bands) of the filter circuits to follow up the vehicle speed V.

The output signal of the tacking BPF 252 enters an amplitude detector circuit 254 as well. The amplitude detector circuit 254 outputs a signal representing the center-frequency component intensity Da described above.

The output signal of the tacking LPF 255 enters an amplitude detector circuit 256. The amplitude detector circuit 256 outputs a signal representing the low-frequency component intensity Db described above.

Figure 46:
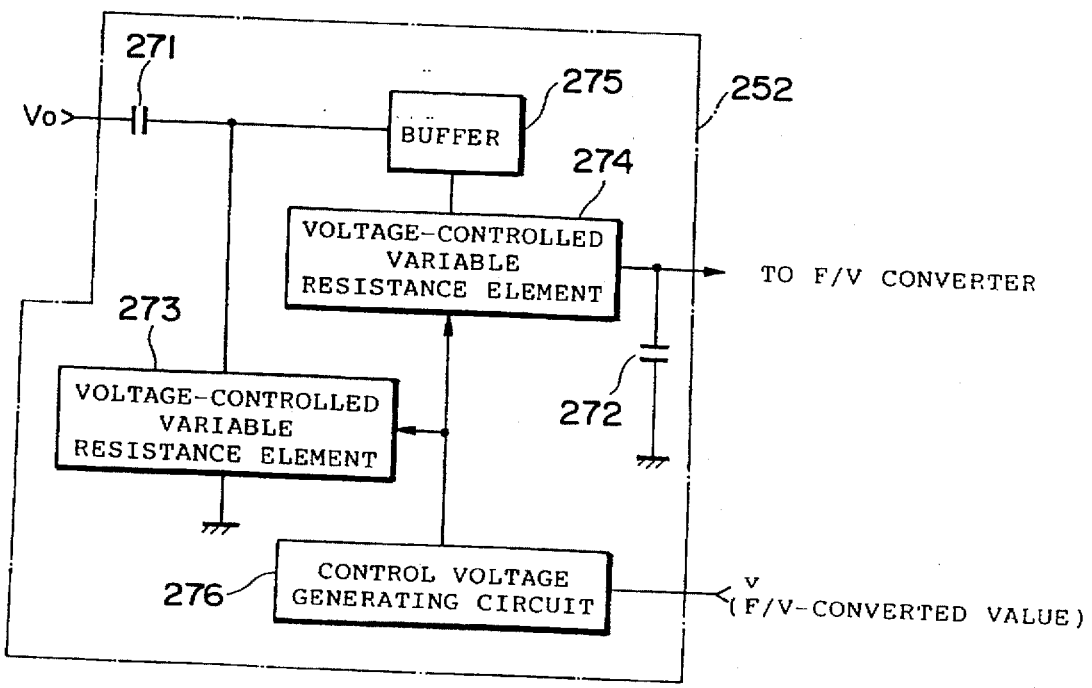
FIG. 46 is a circuit diagram showing a specific example of a tracking band-pass filter.

An example of the construction of the tracking BPF 252 is illustrated in FIG. 46. The tracking BPF 252 includes a high-pass filter (HPF) and a low-pass filter (LPF) which are connected in series via a buffer amplifier 275. The HPF comprises a capacitor 271 and a voltage-controlled variable resistance element 273. The LPF comprises a capacitor 272 and a voltage-controlled variable resistance element 274.

The voltage-controlled variable resistance elements 273 and 274 are constituted by FETs, by way of example. A control voltage is applied to the elements 273 and 274 from a control voltage generating circuit 276, and the resistance values of the elements 273 and 274 vary depending on the control voltage. A change in the resistance values of the elements 273 and 274 brings about a change in the cut-off frequencies of the HPF and LPF. The pass band of the tracking BPF 252 is the band between the cut-off frequency of the HPF and the cut-off frequency of the LPF (which is higher than that of the HPF). The control voltage generating circuit 276 generates a control voltage corresponding to the output voltage signal (which represents the vehicle speed v) of the F/V converter circuit 253.

If the period (of the roughness) of the road surface selected by the spatial filter in the above-mentioned optical system is 5 (mm), by way of example, then the spatial center frequency μ will be 0.2 (mm$^{-1}$). Let v (Km/h) represent the speed (ground speed) of the vehicle.

$$v\ (Km/h) = 1000\ v/3.6\ (mm/s)$$  Eq. (3)

The center frequency f of the electric signal obtained from the differential amplifier circuit 251 is as follows, based upon Equation (1):

$$f = \mu \times v = 200\ v/3.6\ (Hz)$$  Eq. (4)

Accordingly, it will suffice to set the center frequency of the pass band of the tracking BPF 252 to the frequency indicated by Equation (4) and to vary the center frequency depending on the vehicle speed v in accordance with Equation (4).

The tracking LPF 255 has construction identical (except for the fact that the cut-off frequency differs) with that of the LPF (composed of the capacitor 272, the voltage-controlled variable resistance element 274 and the control voltage generating circuit 276) in the tracking BPF 252, and the cut-off frequency thereof varies depending on the vehicle speed v.

When the frequency of the low-frequency components to be extracted by the tracking LPF 255 is set to one-tenth of the center frequency, the cut-off frequency of the filter should be set to 20 v/3.6 (Hz), with reference to Equation (4).

Figure 47:
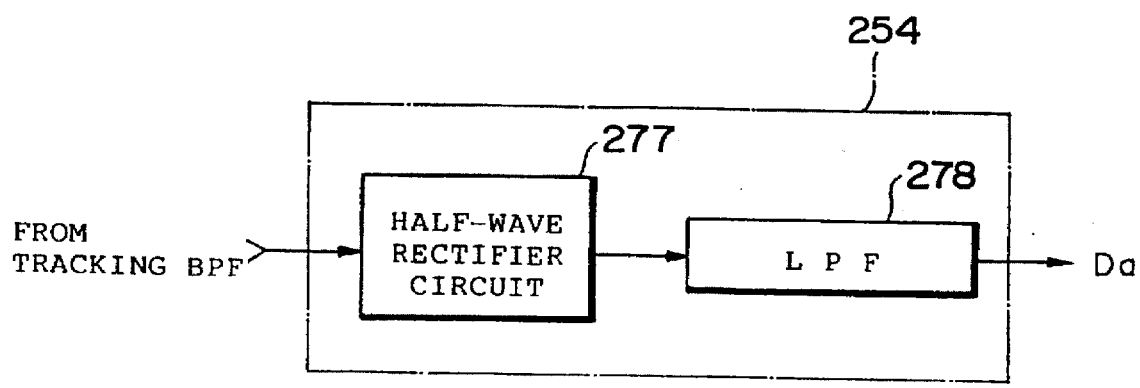
FIG. 47 is a block diagram showing a specific example of an amplitude detector circuit.

A specific example of the construction of the amplitude detector circuit 254 is shown in FIG. 47. The circuit 254 is constituted by a half-wave rectifier circuit 277 and a low-pass filter (LPF) 278. A full-wave rectifier circuit can be also used instead of the half-wave rectifier circuit 277. The pass band of the LPF 278 is decided from the standpoint of response time required for road surface detection. By way of example, if the response time is 0.1 (S) and the LPF 278 is a primary low-pass filter, then the cut-off frequency is 3.7 (Hz).

The output signal of the light sensor 231B (or of the light sensor 231A) is outputted, via a low-pass filter (LPF) 257, as a signal representing an amount Dc of diffuse reflected light. The LPF 257 is for removing very low-frequency undulations contained in the output signal of the photoelectric detector 231B. The cut-off frequency of the filter is set to about 1 (Hz) (fixed), by way of example.

The output signal of the light sensor 232 for regular reflected light is a signal representing an amount Dd of regular reflected light. A low-pass filter having an approximate pass band may be connected to the output side of the light sensor 232.

The output signal of the road surface thermometer 233 is a signal representing road surface temperature De. This may be a thermometer (thermosensitive element) for sensing air temperature rather than the temperature of the road surface. In this case, the thermometer would be provided at a location in contact with the outside air.

The light source 211 for illuminating the road surface and the light source 212 for regular reflected light are controlled by automatic power control (APC) circuits 261 and 262, respectively. As a result, the amount of light projected from each of the light sources 211 and 212 is always held constant.

Fed into a discriminating circuit 260 are the signal outputted from the amplitude detector circuit 254 representing the intensity Da of the center-frequency component, the signal outputted from the amplitude detector circuit 256 representing the intensity Db of the low-frequency component, the signal outputted from the LPF 257 representing the amount Dc of diffuse reflected light, the signal outputted from the light sensor 232 representing the amount Dd of regular reflected light, and the signal outputted from the road surface thermometer 233 representing the road surface temperature De.

The discriminating circuit 260 uses two or more of these input signals to identify or discriminate the road surface conditions in accordance with road-surface discrimination algorithms described later. Preferably, the discriminating circuit 260 is constituted by a CPU (e.g., a microcomputer), a memory and other periphery circuitry. In such a case, the above-mentioned signals Da to De would be fed to the discriminating circuit 260 upon being converted to digital data by an A/D converter circuit.

Figure 48:
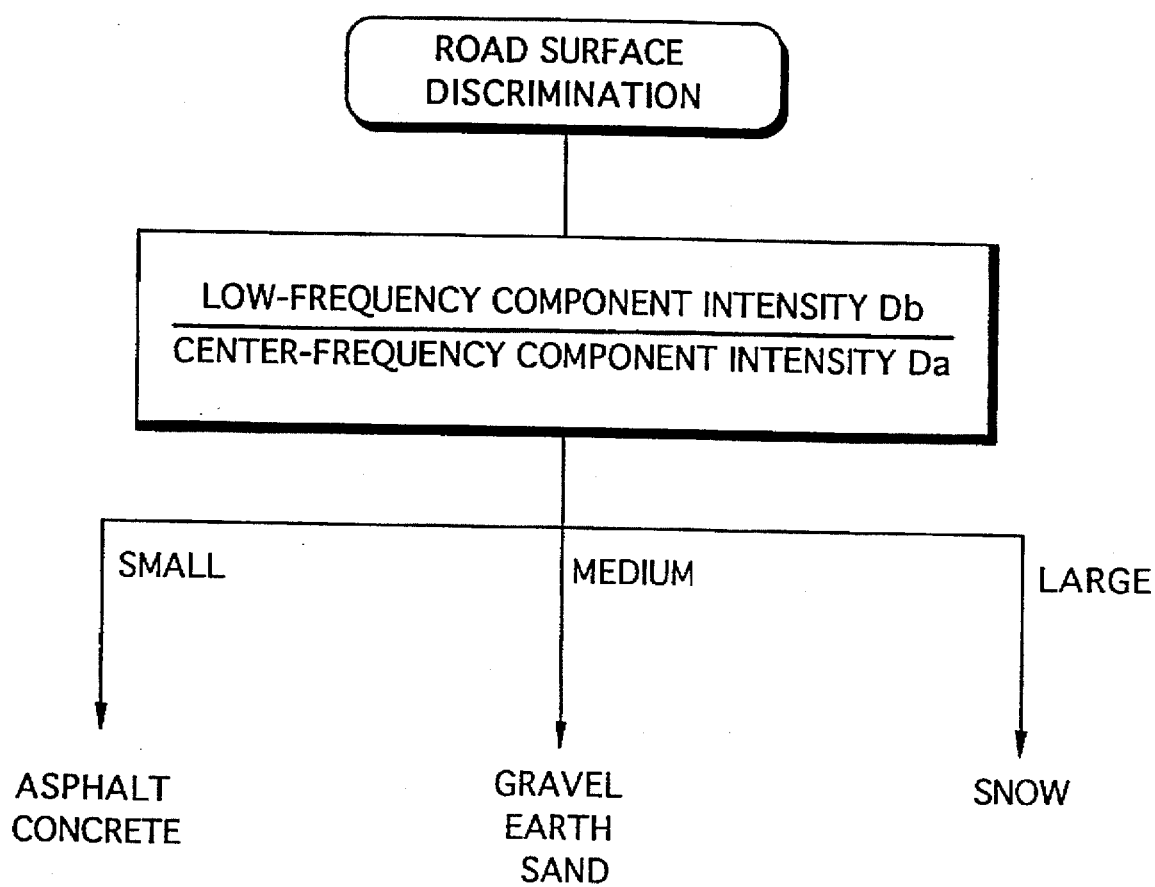
FIG. 48 is a flow chart showing one example of a road-surface judgment algorithm.

FIG. 48 illustrates the simplest road-surface discrimination algorithm. Processing in accordance with this road-surface discrimination algorithm is executed in the discriminating circuit 260. This is true for the other road-surface discrimination algorithms as well.

The ratio Db/Da of the low-frequency component intensity Db to the center-frequency component intensity Da is calculated, and the ratio is compared with the above-mentioned threshold values TH1 and TH2. The road is judged to be a snowy road if the ratio Db/Da is more than the threshold value TH1 (this ratio shall be called "large"); a gravel road if the ratio is between the threshold values TH1 and TH2 (this ratio shall be called "medium"); and an asphalt road if the ratio is not more than the threshold value TH2 (this ratio shall be called "small").

Solely the threshold value TH1 may be set in the discriminating circuit 260 in advance and only snowy and gravel roads may be discriminated.

Solely the threshold value TH2 (or a suitable value ranging from TH1 to TH2 may be set in the discriminating circuit 260 in advance and only snowy and asphalt roads may be discriminated.

Solely the threshold value TH2 may be set in the discriminating circuit 260 in advance and only gravel and asphalt roads may be discriminated.

Figure 49:
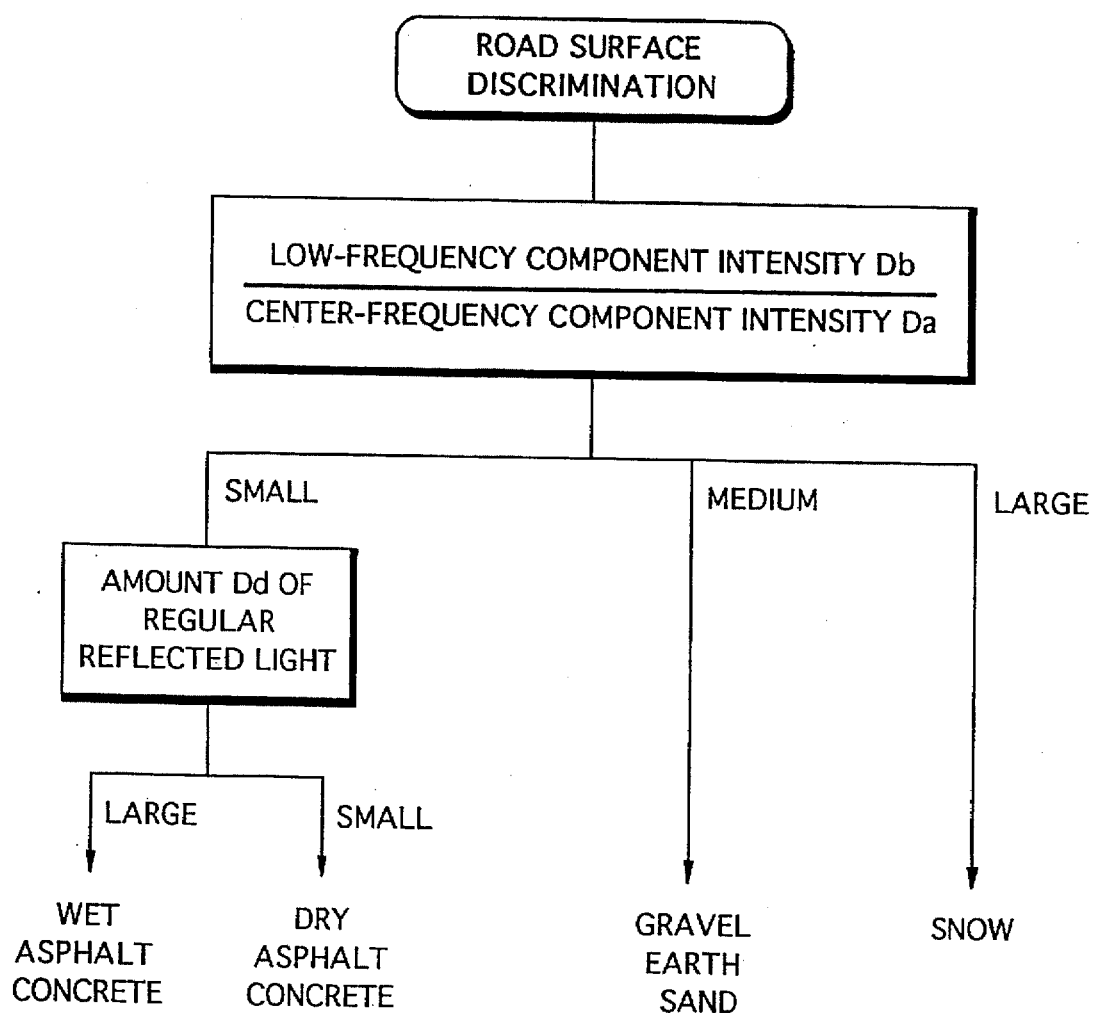
FIG. 49 is a flow chart showing another example of a road-surface judgment algorithm.

FIG. 49 illustrates a road-surface judgment algorithm which further uses the signal representing the amount Dd of regular reflected light, fed from the light sensor 232, to judge whether an asphalt road is in a wet condition or dry condition.

The road is an asphalt road in a case where the ratio Db/Da is not more than the threshold value TH2.

In a case where the surface of an asphalt road is wet, the road surface is in a state approximating a mirror surface and the amount Dd of regular reflected light becomes large in comparison with the dry state. A threshold value is set to a level approximately intermediate between the amount of regular reflected light obtained when the asphalt road is in the wet state and the amount of regular reflected light obtained when the asphalt road is in the dry state. The condition is judged to be wet asphalt if the amount Dd of regular reflected light is not less than the threshold value (this amount shall be referred to as "large"), and dry asphalt if the amount Dd of regular reflected light is less than the threshold value (this amount shall be referred to as "small").

Judgment on a gravel road and a snowy road is the same as that based upon the algorithm shown in FIG. 48.

It goes without saying that an arrangement may be adopted in which only a wet asphalt road and a dry asphalt road are discriminated, judgment on a gravel road can be added thereto, or judgment on a snowy road can be added thereto.

Figure 50:
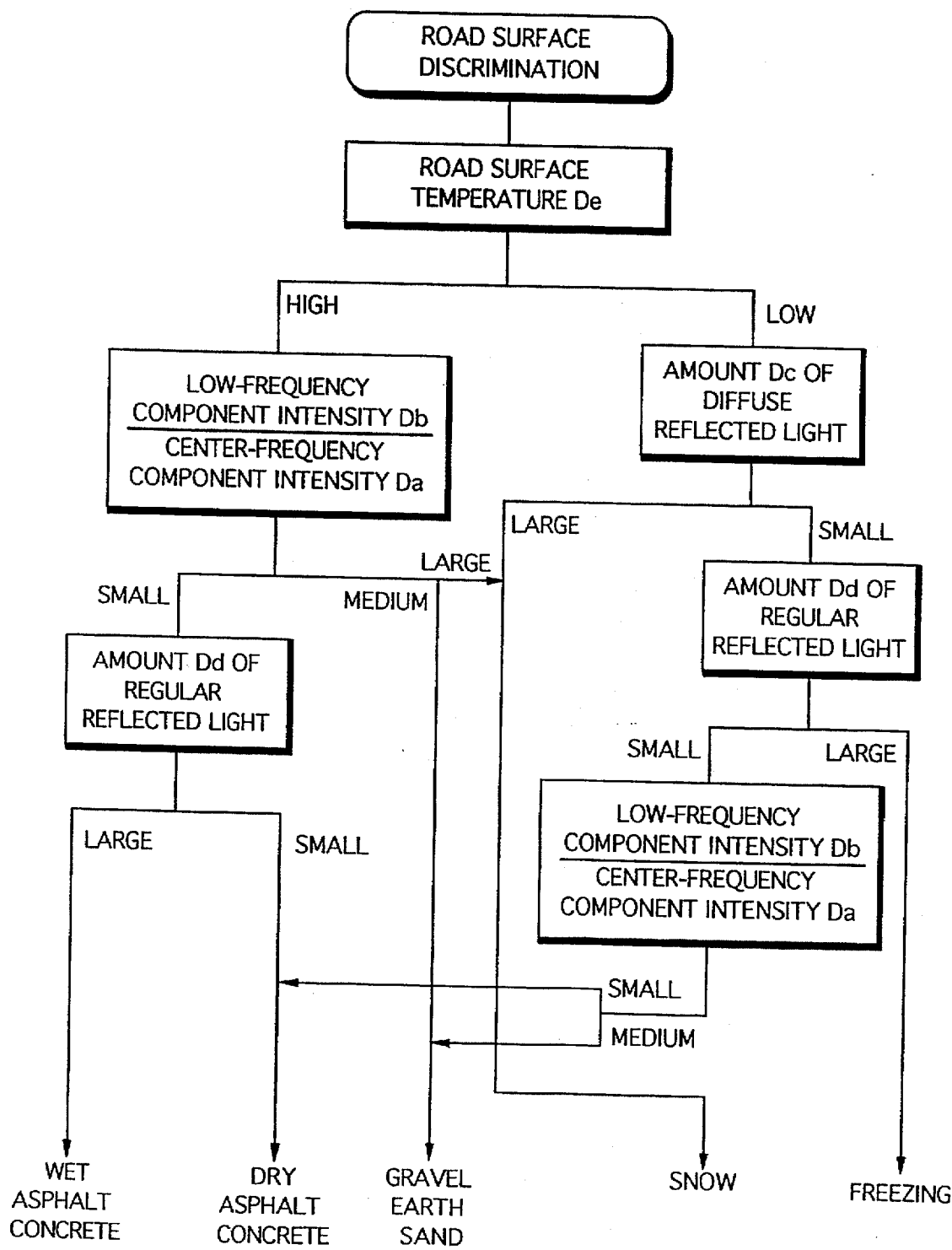
FIG. 50 is a flow chart showing still another example of a road-surface judgment algorithm.

FIG. 50 is for making a more detailed judgment as to a the road surface condition by further utilizing the signal outputted from the LPF 257 representing the amount Dc of diffuse reflected light and the signal outputted from the road surface thermometer 233 representing the road surface temperature De.

In general, water freezes at 0 (°C.). If the road surface temperature De is 0 (°C.) or less, therefore, there is a possibility of freezing. It is determined whether the road surface temperature De exceeds the freezing temperature (this temperature shall be referred to as "high") or is equal to or less than the freezing temperature (this temperature shall be referred to as "low").

The freezing temperature need not be exactly 0 (°C.) but may be determined to be optimum temperature based upon experience. In a case where air temperature is used instead of road surface temperature, air temperature at which a frozen road surface can remain frozen without thawing or air temperature at which a road surface starts to be frozen would serve as a threshold value for making judgments.

Since a frozen road surface approximates a mirror surface similarly to a wet road surface, the amount Dd of regular reflected light is "large".

Accordingly, a road surface is judged to be a frozen road surface if the road surface temperature De is "low" and the amount Dd of regular reflected light is "large". In this case, the amount Dc of diffuse reflected light is generally "small".

A road surface is not a frozen road surface if the road surface temperature De is "low" and the amount Dd of regular reflected light is "small". In this case, the road surface condition is judged (to be a dry asphalt road or gravel road) based upon the ratio of the low-frequency component intensity Db to the center-frequency component intensity Da. The reason why snow is excluded from this judgment is that snow is judged based upon the amount Dc of diffuse reflected light. However, with respect to judgment of snow based upon the ratio Db/Da and judgment of snow based upon the amount Dc of diffuse reflected light, the condition of snow differs only slightly (and there are times when the conditions are the same). Therefore, snow may be judged based upon the ratio Db/Da.

New snow and snow a part of which remains white even after being traveled upon by passing bodies (vehicles, passersby, etc.) reflect light diffusely. Since the amount of diffuse reflected light from snow is extremely large in comparison with the other road surface conditions, snow and the other road surface conditions can be judged based upon the amount Dc of diffuse reflected light. A threshold value for making this judgment is set to a level between the amount of diffuse reflected light at the time of snow and the amount of diffuse reflected light at the time of the other road surface conditions.

Snow is determined in a case where the road surface temperature De is "low" and the amount Dc of diffuse reflected light is not less than the threshold value (this amount is referred to as "large"). It goes without saying that the threshold value of road surface temperature in a case where freezing is determined and the threshold value of road surface temperature in a case where snow is determined are made different from each other.

Snow determined based upon the amount Dc of diffuse reflected light is snow all or a part of the surface of which is white. By contrast, snow determined based upon the ratio Db/Da is snow which causes fluctuations in the amount of diffuse reflected light at a period greater than that for gravel. This snow includes not only white snow but also snow darkened by being traveled on.

A judgment algorithm in a case where the road surface temperature De is "high" is the same as that shown in FIG. 49.

It goes without saying that only a part of the judgment algorithm shown in FIG. 50 can be used so as to identify or judge only one or two or more types of road surface conditions out of freezing, snow, gravel, dry asphalt and wet asphalt.

Figure 51:
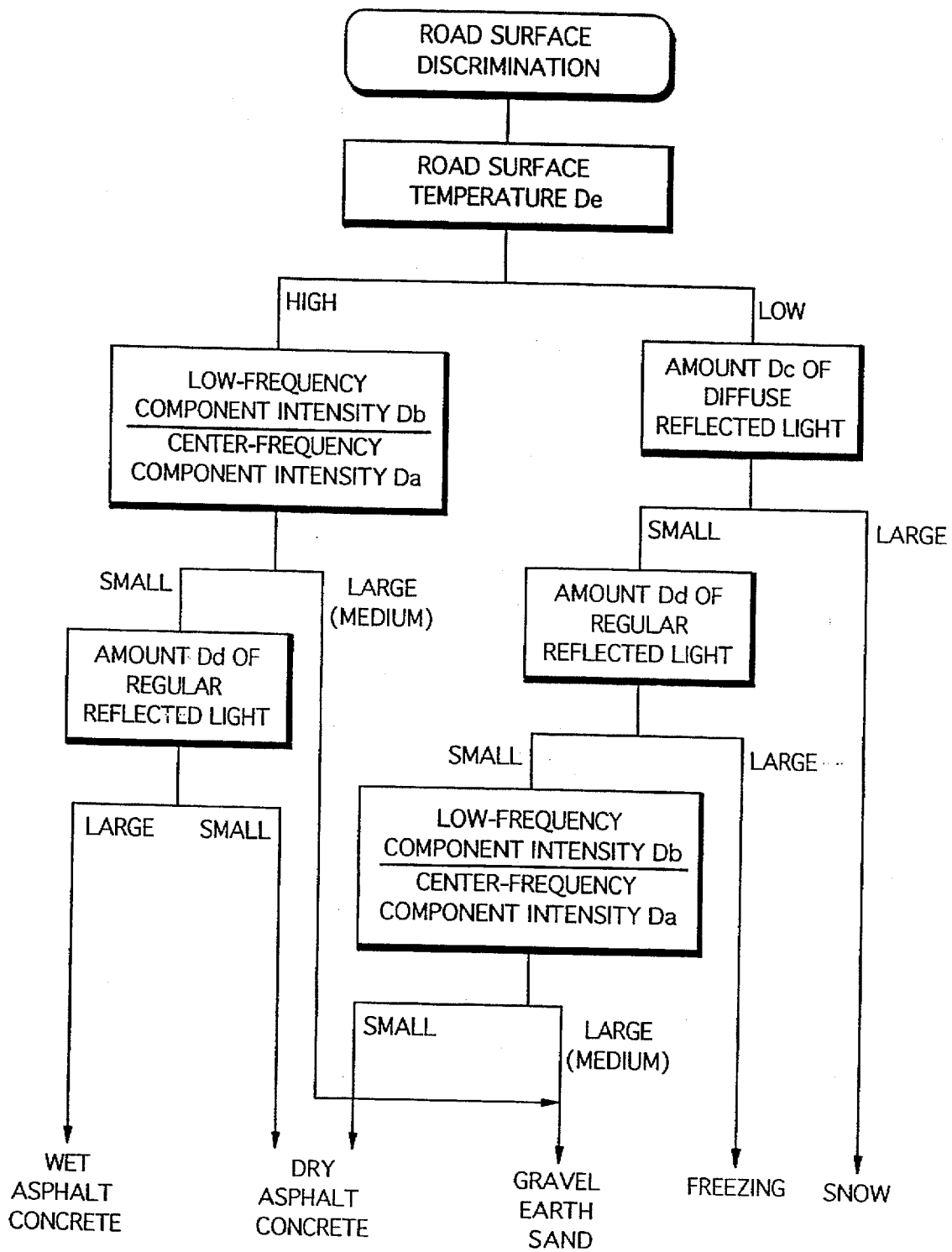
FIG. 51 is a flow chart showing a further example of a road-surface judgment algorithm.

A road-surface judgment algorithm shown in FIG. 51 is similar to that shown in FIG. 50. In FIG. 51, gravel and asphalt are discriminated based upon the ratio Db/Da. The fact that snow is not judged based upon the ratio Db/Da differs from the algorithm shown in FIG. 50. The algorithm shown in FIG. 51 may be considered to be a variation of the algorithm shown in FIG. 50.

The results of discrimination of various road surface conditions are thus obtained from the road surface discriminator 15. Particularly, the results of discrimination of wet, snow and freezing will be effectively utilized in the traffic information system.

Figure 60:
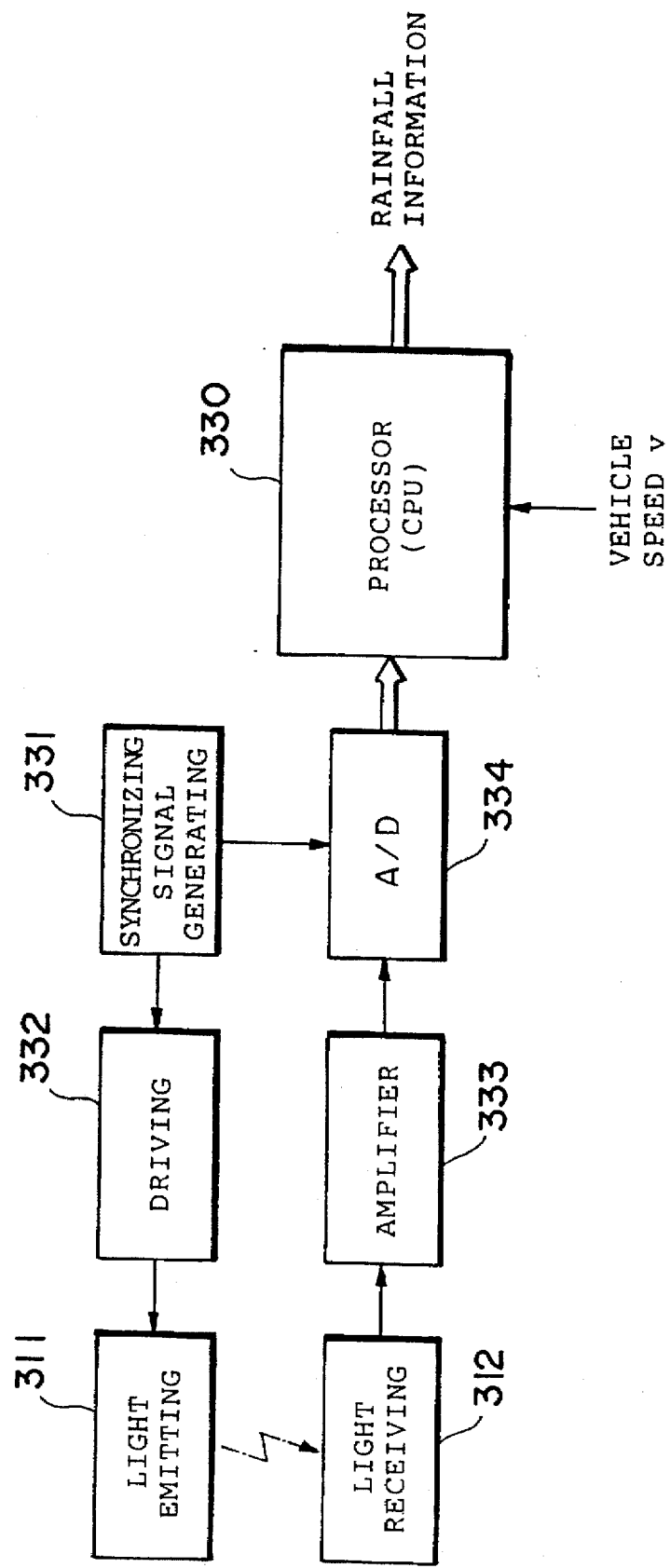
FIG. 60 is a block diagram showing a signal processing circuit of a raindrop sensor.

The details of the construction of the raindrop sensor 16 will be described. The raindrop sensor 16 comprises an optical system (FIGS. 52 and 53) and a signal processing circuit (FIG. 60).

Figure 52:
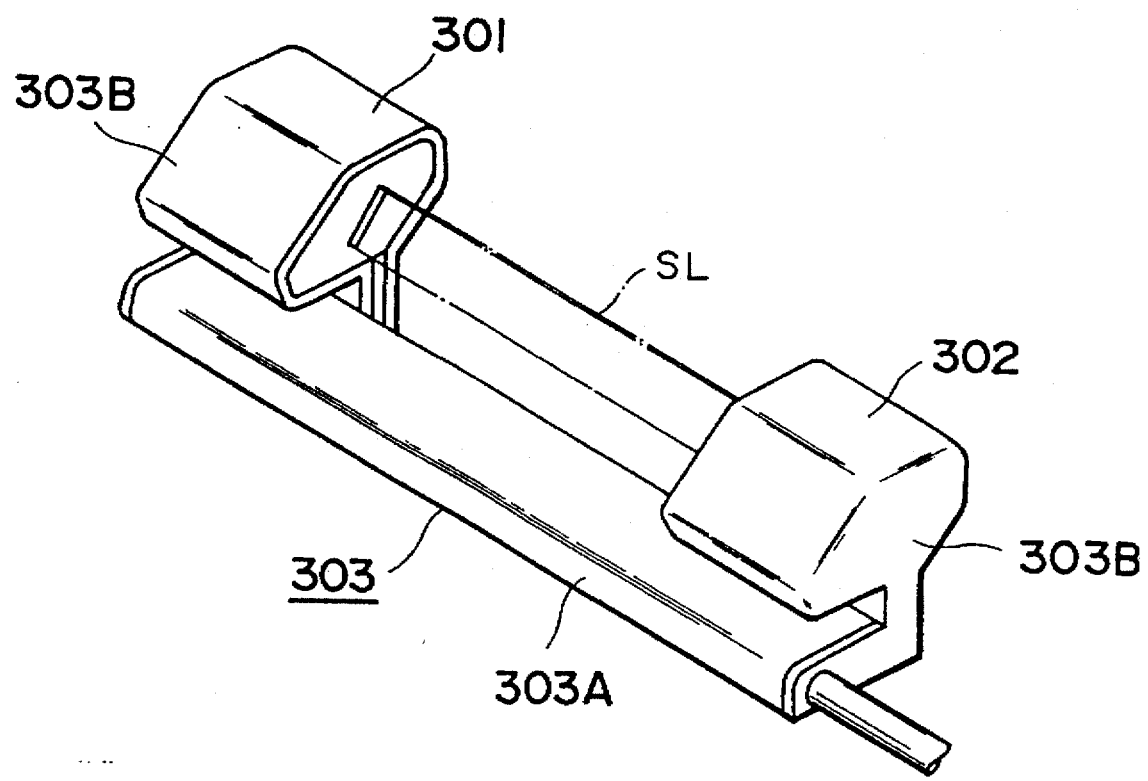
FIG. 52 is a perspective view illustrating a head of a raindrop sensor.

The optical system in the raindrop sensor 16 comprises a light projector 301 and a light receiver 302 which are arranged so as to oppose to each other, as shown in FIG. 52. Slit (strip)-shaped light is projected onto the light receiver 302 from the light projector 301. The light projector 301 and the light receiver 302 are contained in a case 303. The case 303 comprises heads 303B respectively containing the light projector 301 and the light receiver 302 and a connection 303A connecting the heads 303B.

Figure 53:
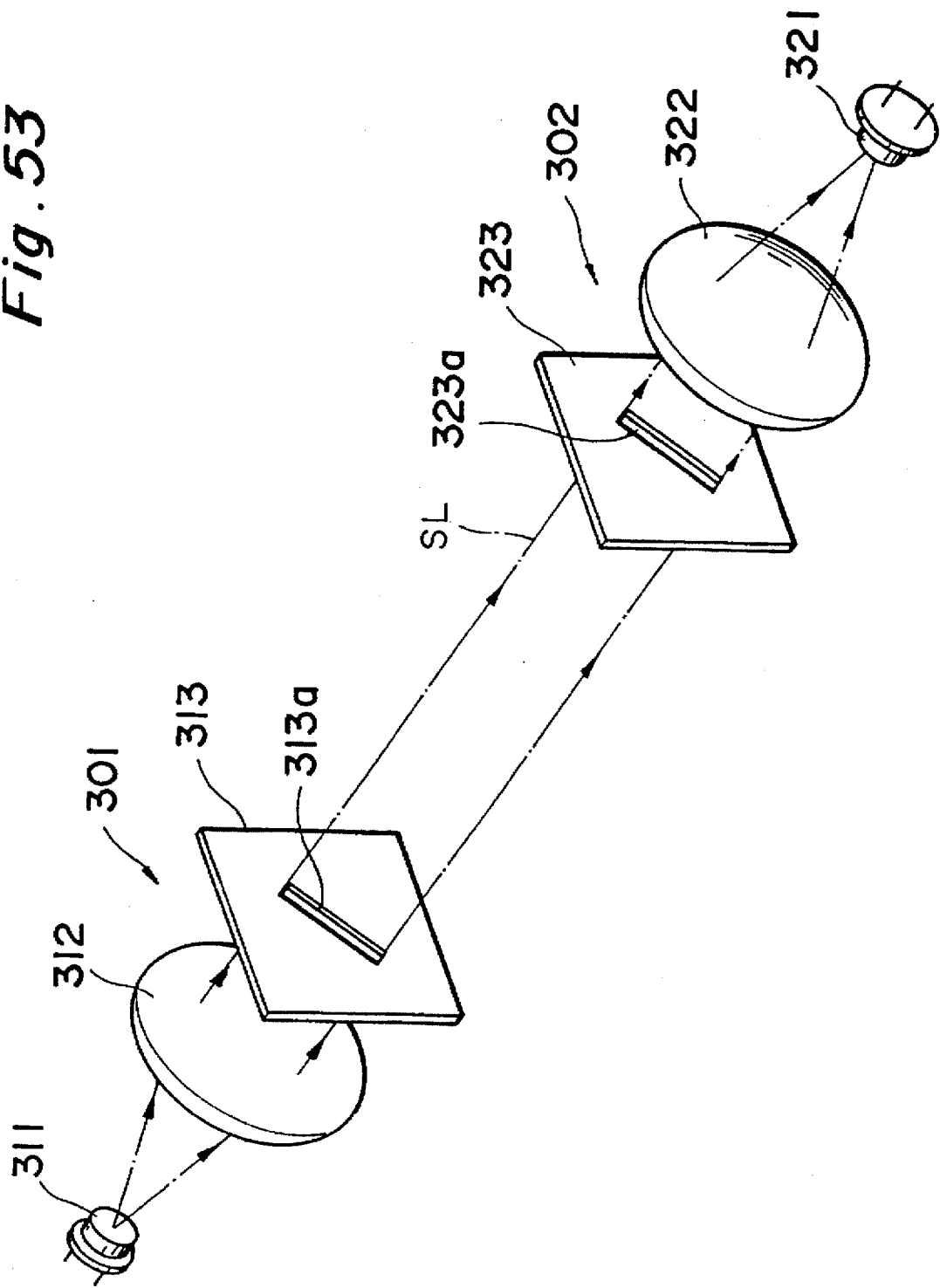
FIG. 53 is a perspective view illustrating an optical system of a raindrop sensor.

The light projector 301 comprises a light emitting element 311, a collimating lens 312 for collimating light from the light emitting element 311, and a slit plate 313 provided with a slit 313a, as shown in FIG. 53. The light collimated by the collimating lens 312 is shaped into slit light SL via the slit 313a, and the slit light SL is projected.

The light receiver 302 comprises a slit plate 323 provided with a slit 323a through which the slit light SL from the light projector 301 is passed, a condenser lens 322 for condensing the light passed through the slit 323a, and a light receiving element 321 for receiving the condensed light. Infrared light may be preferably used for the slit light SL.

Figure 54:
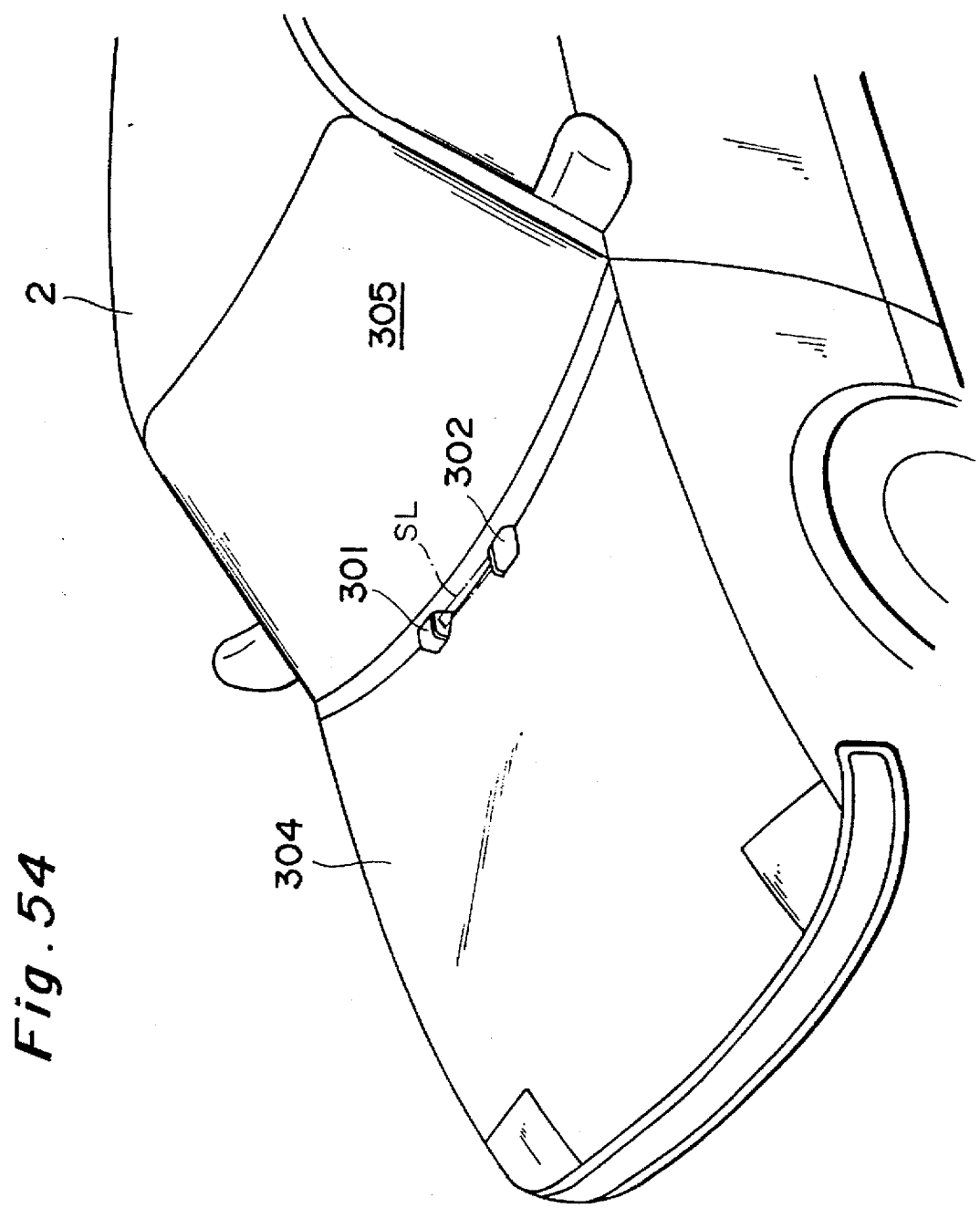
FIG. 54 is a perspective view showing a vehicle comprising a raindrop sensor.

The optical system in the raindrop sensor 16 is provided in the boundary between a hood 304 of the vehicle 2 and a windshield (including a frame for supporting the windshield) 305, as shown in FIG. 54. The optical system is so arranged that the slit light SL directed from the light projector 301 to the light receiver 302 horizontally progresses in the width direction of the body of the vehicle.

Figure 55:
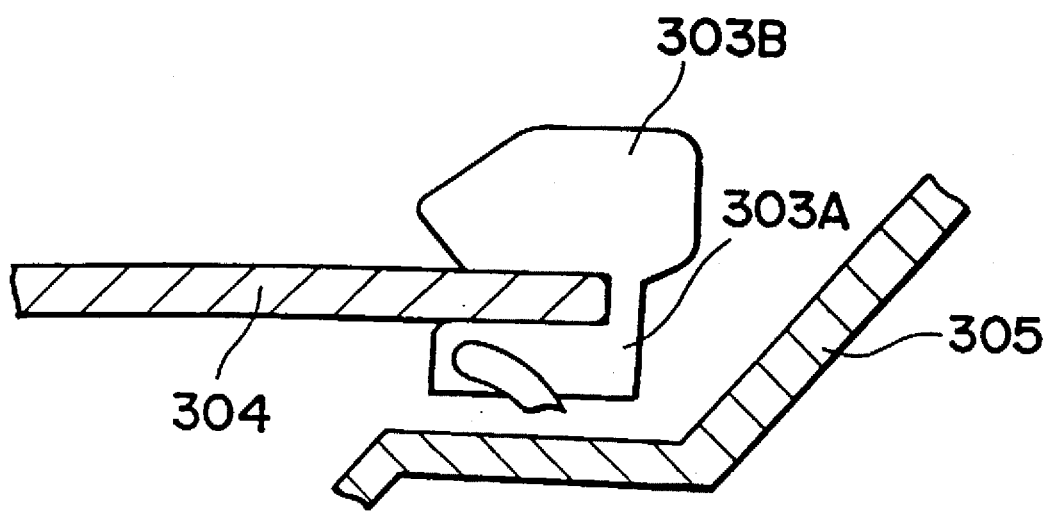
FIG. 55 is a cross sectional view showing a state where a raindrop sensor head is mounted.

Preferably, the optical system is so mounted as to interpose the leading edge of the hood 304 between the heads 303B and the connection 303A of the case 303, as shown in FIG. 55.

When the vehicle 2 is traveling, raindrops fall down toward the vehicle 2 obliquely from above the front of the vehicle 2. The optical system is so arranged that the raindrops vertically pass the slit light SL in the thickness direction thereof. That is, the optical system is so arranged that a normal of the surface of the slit light SL is parallel to the falling raindrops (the width direction of the slit light SL is directed from the lower front of the vehicle to the upper rear thereof).

More preferably, the size of a raindrop sensing area (defined by the spacing between the light projector 301 and the light receiver 302 and the width of the slit light SL) is so determined that one raindrop enters the raindrop sensing area in order to measure the size of the raindrop or the speed at which the raindrop crosses (passes through) the slit light SL as accurately as possible.

Figure 56:
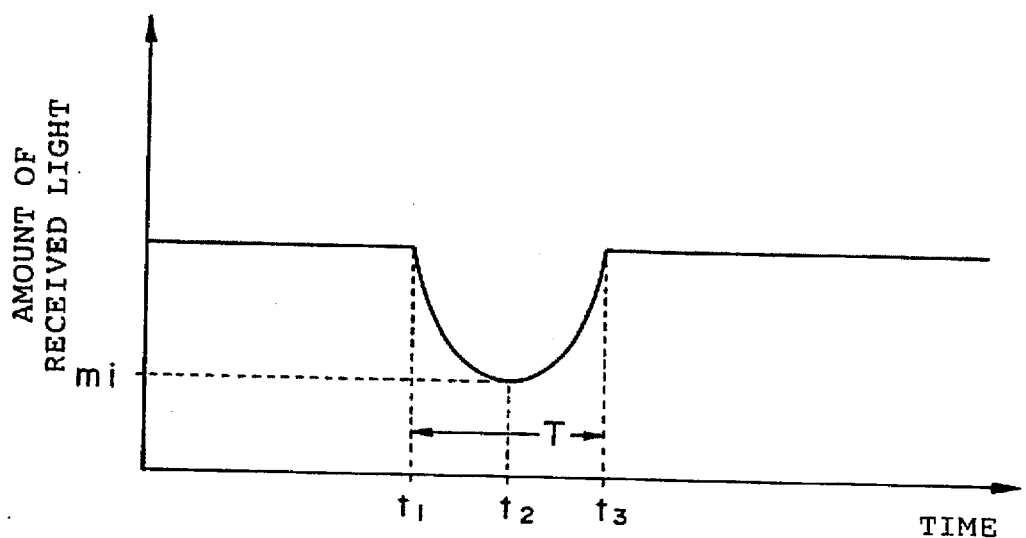
FIG. 56 is a graph showing the change in the amount of received light in a case where a raindrop enters slit light.

FIG. 56 illustrates the change in the amount of received light of the light receiver 302 (the light receiving element 321) in a case where the raindrop passes through the slit light SL. When the raindrop passes through the slit light SL, the amount of received light is reduced.

During a time period from the time point $t_1$ where the reduction in the amount of received light is started to the time point $t_3$ where the amount of received light is returned to the original amount, the raindrop passes through the slit light SL. Time $T=t_3-t_1$ is time required for the raindrop to pass. During a time period from the time points $t_1$ to $t_3$ (the time point $t_2$), the amount of received light is reduced to the minimum mi.

Figure 57:
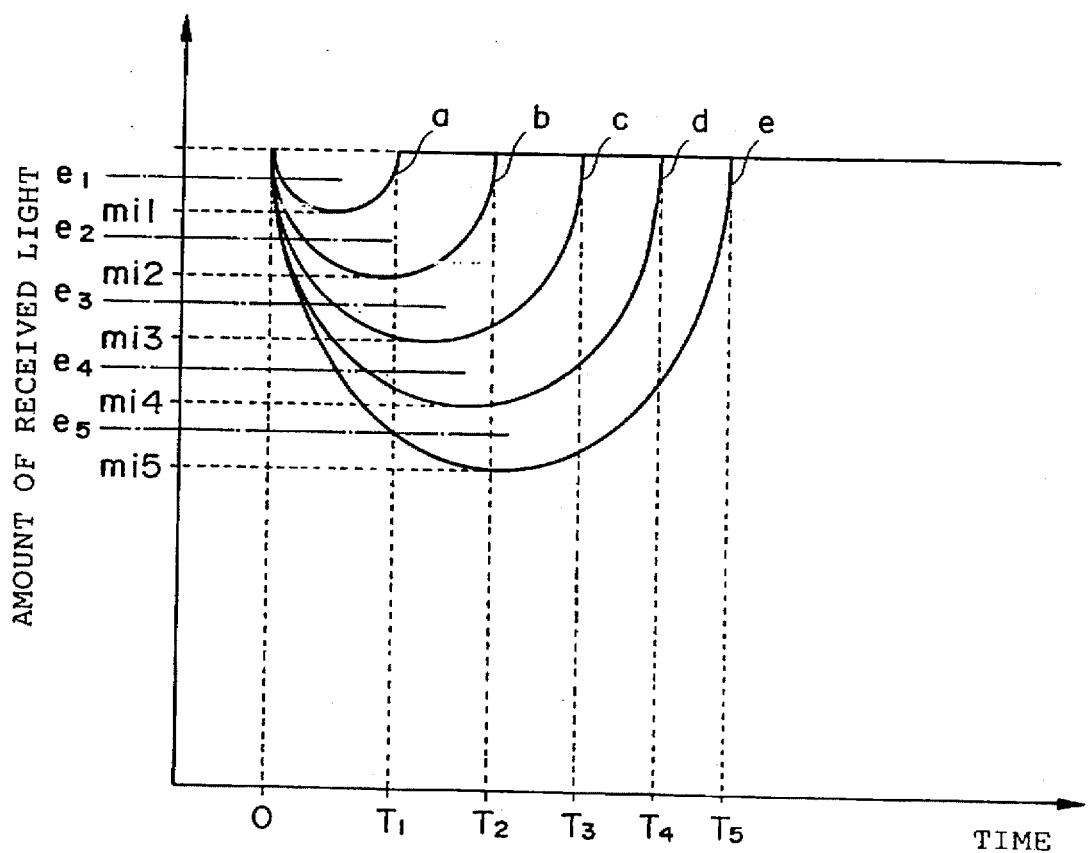
FIG. 57 is a graph showing the change in the amount of received light with raindrops of various sizes.

FIG. 57 illustrates times T1, T2, T3, T4 and T5 when raindrops having diameters of 1 mm, 2 mm, 3 mm, 4 mm and 5 mm (respectively indicated by symbols a, b, c, d and e) respectively pass through the slit light SL and the minimum values mi1, mi2, mi3, mi4 and mi5 of the amount of light.

Each of threshold values e1, e2, e3 and e4 is set between the adjacent minimum values of the amount of received light, whereby the size of the raindrop can be judged based upon the minimum values of the amount of received light.

Figure 58:
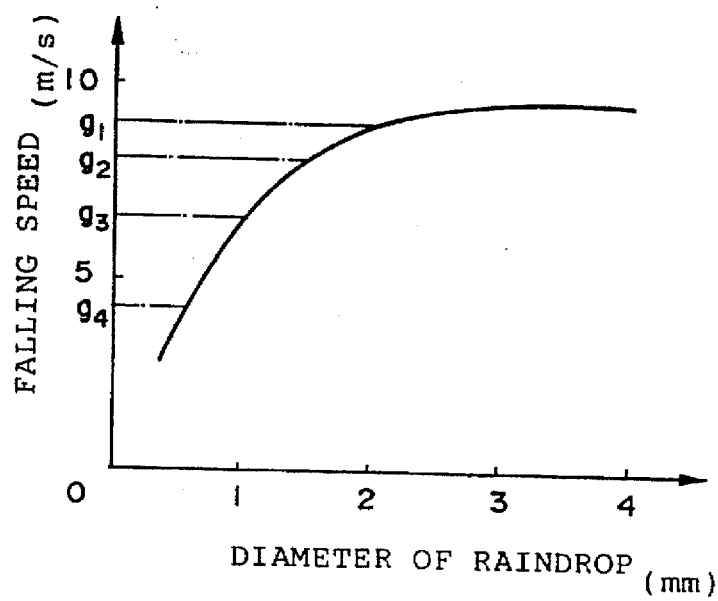
FIG. 58 is a graph showing the relationship between the size of a raindrop and the speed at which the raindrop falls.

FIG. 58 illustrates the relationship between the falling speed dv of the raindrop near the surface of the ground and the size (the diameter) of the raindrop. The size of the raindrop can be also judged by setting threshold values $g_1$, $g_2$, $g_3$ and $g_4$ relating to the falling speed dv.

Figure 59A:
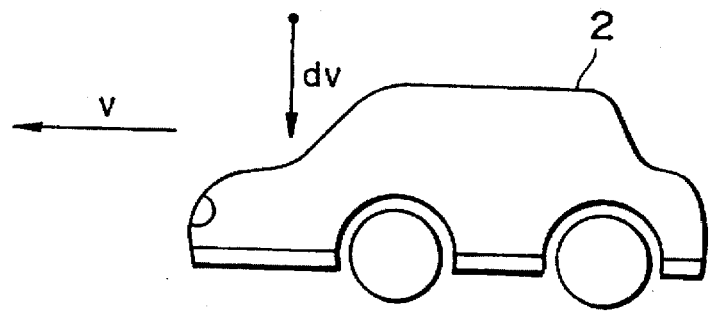
FIG. 59a illustrates the vehicle speed and the speed at which a raindrop falls.
Figure 59B:
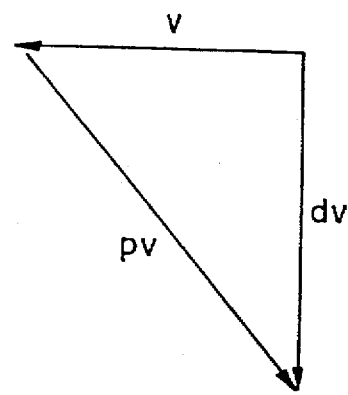
FIG. 59b is a vector diagram showing the relationship among the vehicle speed, the speed at which a raindrop falls and the speed at which the raindrop passes through a slit light.

As shown in FIG. 59a, the vehicle 2 is traveling at the speed v, so that the speed pv at which the raindrop passes through the slit light SL is not equal to the falling speed dv of the raindrop. The relationship among the speeds v, pv and dv is illustrated in FIG. 59b.

The falling speed dv of the raindrop is found by the following equation:

$$dv=[(pv)^2-v^2]^{1/2} \qquad \text{Eq. (5)}$$

The traveling speed v of the vehicle 2 is obtained from the vehicle speed sensor 13, or the like. The passing speed pv is calculated on the basis of the passing time T required for the raindrop to pass through the slit light SL and the thickness of the slit light SL. Accordingly, it is possible to find the falling speed dv of the raindrop.

FIG. 60 illustrates a signal processing circuit of the raindrop sensor 16.

A synchronizing signal generating circuit 331 generates a high-frequency pulse signal. The pulse signal is fed to a driving circuit 332 and an A/D converter circuit 334.

Figure 61A:
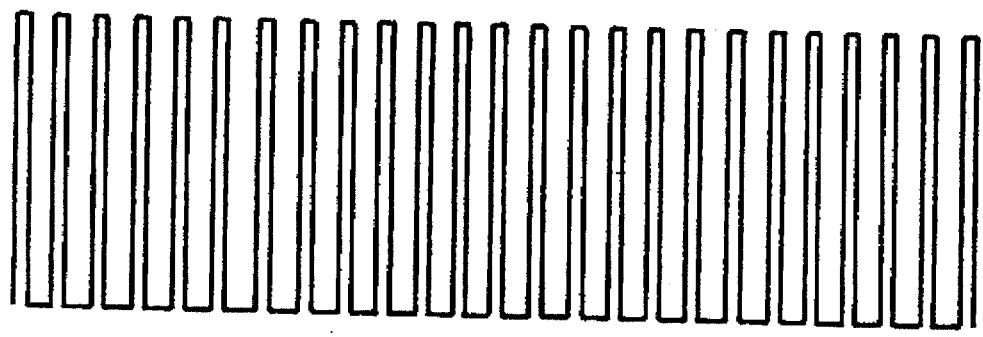
FIG. 61a illustrates the waveform of emitted light.

The driving circuit 332 drives a light emitting element 311 in synchronization with the input pulse signal. The waveform of projected light (the slit light SL) outputted from the light emitting element 311 is illustrated in FIG. 61a.

Figure 61B:
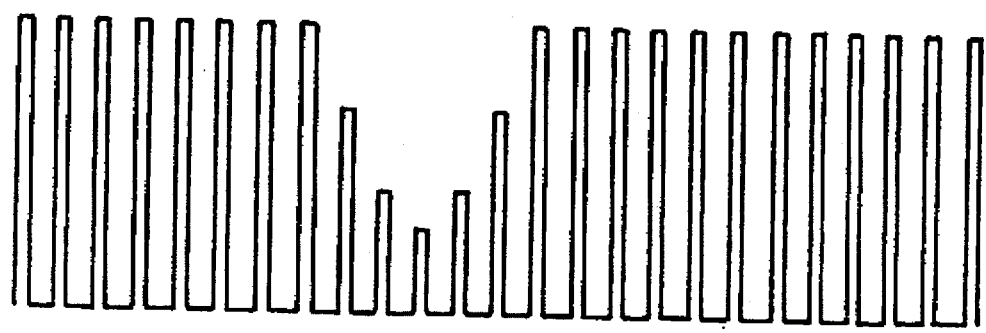
FIG. 61b illustrates the waveform of a received light signal.

FIG. 61b illustrates the waveform of a received light signal of a light receiving element 312. When the raindrop passes through the slit light SL, the level of the received light signal is lowered. The received light signal outputted from the light receiving element 312 is amplified in an amplifier 333, and is then fed to the A/D converter circuit 334.

The A/D converter circuit 334 converts the input received light signal into a digital signal representing the level thereof in synchronization with the pulse signal fed from the synchronizing signal generating circuit 331. The digital signal enters a processor 330.

The processor 330 is constituted by a CPU, a memory, and the like. The processor 330 measures the minimum value mi of the amount of received light or the passing time T on the basis of the inputted digital signal. The size of the raindrop is judged based upon the measured minimum value of the amount of received light. Alternatively, the falling speed dv of the raindrop is calculated using Equation (5) on the basis of the measured passing time T and the vehicle speed v entering the processor 330. The size of the raindrop is judged based upon the falling speed dv. The amount of rainfall per unit time is calculated using the number of raindrops entering the slit light SL per unit time, the judged sizes of the raindrops and a predetermined coefficient. A signal representing the calculated amount of rainfall is outputted from the processor 330.

Information relating to a traffic jam, information relating to the road surface condition (wet, freezing, snow, etc.), and information relating to the amount of rainfall are thus mainly obtained, respectively, from the laser radar 14, the road surface discriminator 15, and the raindrop sensor 16 (the information relating to the road surface condition and the information relating to the amount of rainfall may, in some cases, be collectively called weather information).

The information is transmitted to the center 9 via the repeaters 4 or directly from the on-vehicle apparatus 3.

There are various systems for transmitting various information to the center a from the on-vehicle apparatus 3.

The first system is manual transmission. The on-vehicle apparatus 3 is provided with a transmission button. Only when a driver presses the transmission button, transmission is made. The type of information to be transmitted (traffic jam information, accident information, weather information, etc.) is displayed if required (the touch switches 31A to 31C), to make the driver select information to be transmitted out of the information. The selected information is sent to the center.

The second system is predetermined interval auto transmission. This is for automatically transmitting information at that time at predetermined time intervals (e.g., one minute).

The third system is variable interval auto transmission. This is for transmitting information at a particular time point. For example, created information is transmitted when it varies. In addition, the information is transmitted only when the detected number of vehicles is small. When the detected number of vehicles is large, it is considered that the other vehicles similarly transmit collected and created information to the center. Accordingly, the burden of the center is increased. In such a case, information is transmitted at long time intervals, or no information is transmitted.

A telegraphic message transmitted to the center will include created information, a vehicle ID, time data, and position data. Since the time data can be replaced with the time when the center has received information, the time data need not be necessarily transmitted to the center from the vehicle.

The center computer 50 in the center 9 which has received information from vehicles judges for each area or block and for each type of information the conditions of the area or block by the average value or the principle of decision by majority in the same manner as that in the above-mentioned first embodiment. The results of the judgment are distributed for each area among the vehicles via the repeaters 4.

One example of processing in the center 9 will be described with reference to FIGS. 62 and 63.

Figure 62:
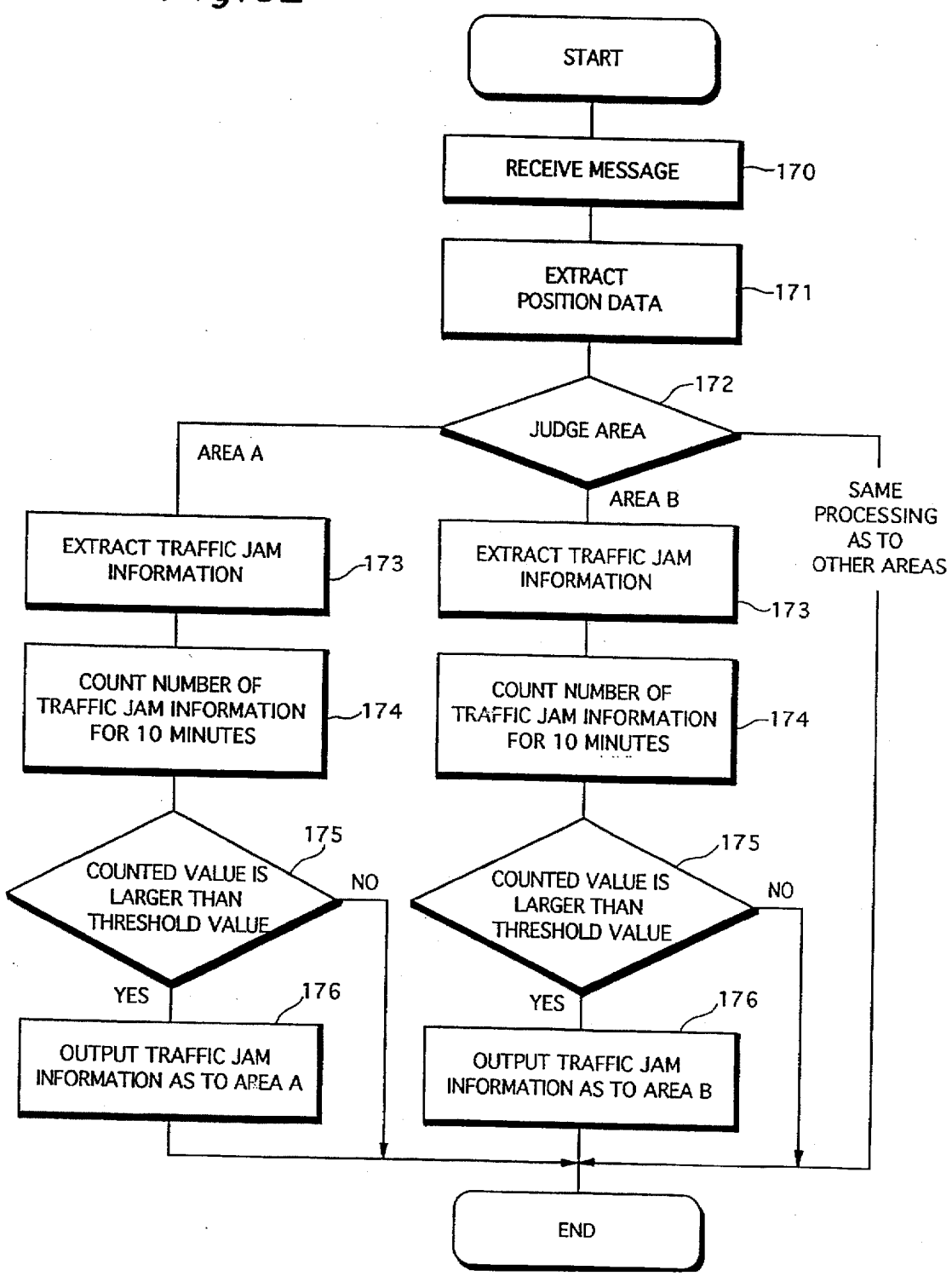
FIG. 62 is a flow chart showing the procedure for traffic jam information processing in a center.

FIG. 62 shows processing relating to traffic jam information. When a telegraphic message from the on-vehicle apparatus 3 on the vehicle is received (step 170), position data included therein is extracted (step 171), and an area where the vehicle exists is judged (step 172).

The following processing is performed for each area. Traffic jam information (the presence or absence of a traffic jam) is extracted from the telegraphic message (step 173). The number of information indicating that there is a traffic jam included in telegraphic messages from vehicles existing in the area is counted (step 174). If the number of information indicating that there is a traffic jam is not less than a threshold value previously determined with respect to the area (which generally differs for each area), it is judged that a traffic jam occurs in the area (step 175), and the information indicating that there is a traffic jam, along with an area ID of the area, is transmitted to the repeater 4 (assigned a repeater ID) in the area (step 176). The traffic jam information, along with the area ID, may be sent to repeaters in the other areas. It goes without saying that this information is transmitted to each of vehicles, etc. existing in the area from the repeater 4.

When information relating to the degree of jam is included in the traffic jam information, the average value of the degree of jam is found, or the degree of jam is determined by decision by majority. Information representing the determined degree of jam is also transmitted to the repeater 4 and the vehicles.

The above-mentioned processing may be performed not for each area but for each block considering a lane. Since the presence or absence of a traffic jam generally differs depending on the lane even on the same road, the processing for each area will be performed in consideration of the lane. At this time, the lane is judged from the traveling direction of the vehicle as described above, or lane information is included in the telegraphic message from the vehicle.

Figure 63:
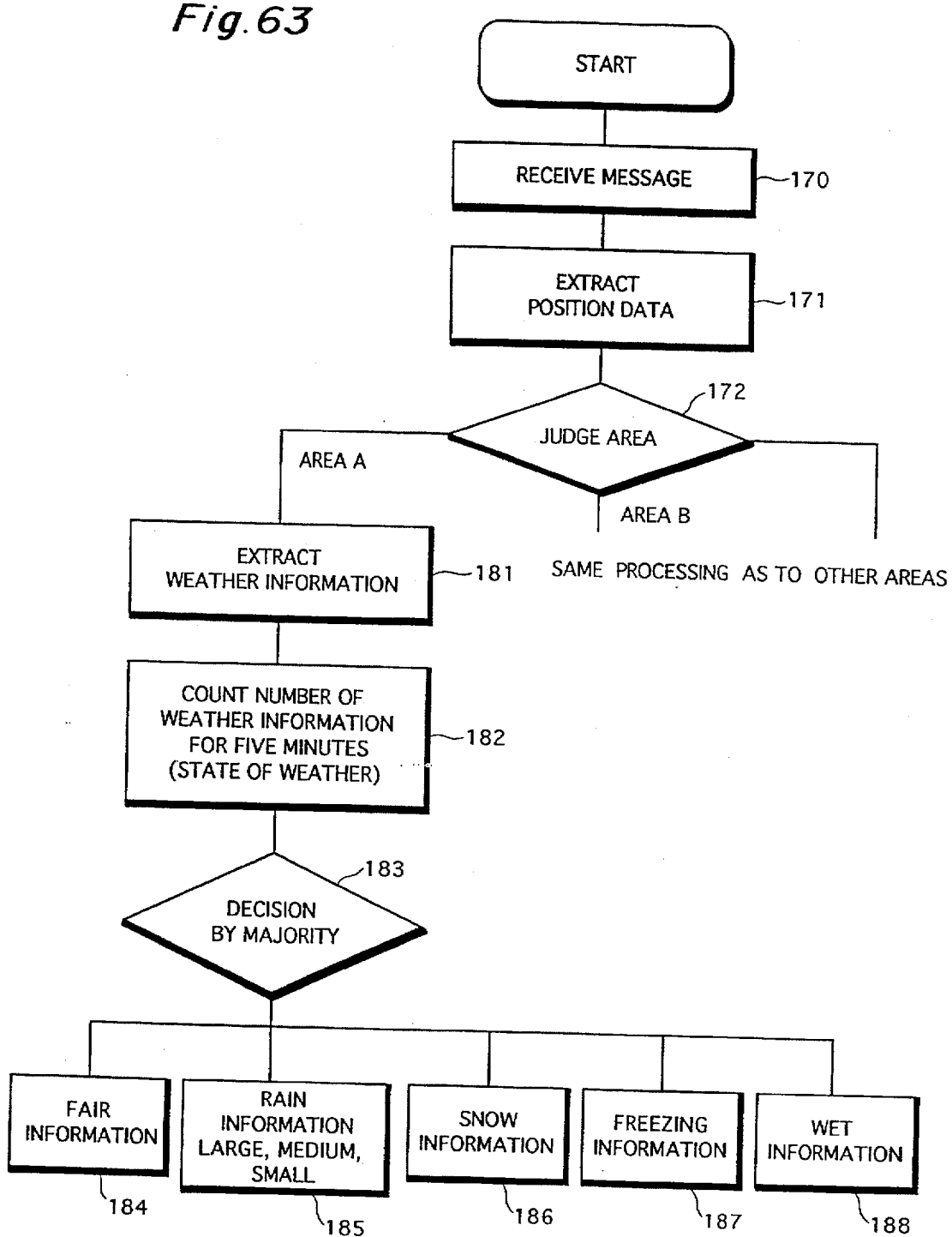
FIG. 63 is a flow chart showing the procedure for weather information processing in a center.

FIG. 63 shows judging processing with respect to the weather information. The weather information shall include information indicating whether or not the weather is fair (this may be eliminated), information indicating whether or not it is raining (including, when the on-vehicle apparatus 3 creates detailed information representing the large, medium and small stages depending on the amount of rainfall, the detailed information), information indicating whether or not a road surface is covered with snow, whether or not a road surface is frozen, whether or not a road surface is wet, and the like. The steps 170 to 172 are the same as those shown in FIG. 62.

The weather information is extracted from the telegraphic messages for each area (step 181), and the numbers of fair information, rain information, snow information, freezing information and wet information are respectively counted (step 182). The detailed information relating to large, medium and small are added as required with respect to the rain information. When the counting for a predetermined time (e.g., for five minutes) is terminated, the largest counted value is selected as determinate information (steps 183, 184, 185, 186, 187 and 188). When the rain information is determined, the wet information are also determined when the number of wet information is as large as that of the rain information. Two or more information may be thus determined. The determined weather information are transmitted to the vehicles via the repeater.

Description is made of processing in the center relating to an accident and a traffic jam caused by the accident and display on the on-vehicle apparatus on the vehicle. With respect to the accident, detailed contents such as the position and the scale thereof must be also judged in the center.

Figure 64:
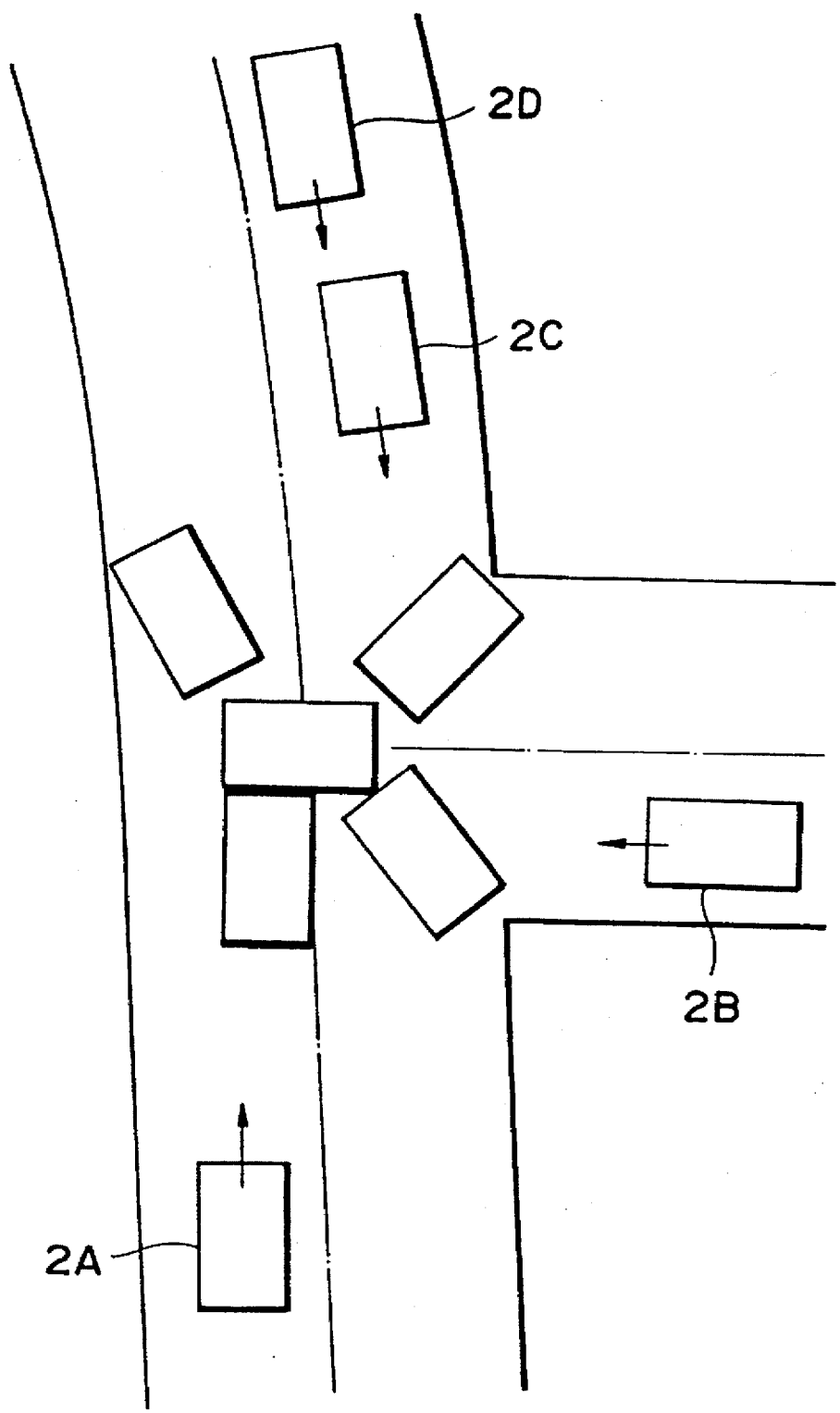
FIG. 64 illustrates the place where an accident occurs.

Suppose an accident has happened in a three-forked road in FIG. 64. Information relating to the accident is transmitted to the center from vehicles 2A, 2B, 2C, 2D, etc. near the scene of the accident. The accident information includes the presence or absence of an accident, the states of the accident, the number of vehicles involved in the accident, the distance from the position of the present vehicle to the scene of the accident, and the like, as described above. In addition thereto, a vehicle ID, position data, time, and the like of a vehicle which has transmitted the accident information are included in a telegraphic message.

Since from a plurality of vehicles, position data of the vehicles and the distances to the scene of the accident are transmitted, the position of the scene of the accident can be accurately judged on a map in the center 9. Further, the scale (the spread) of the accident is made clear from the number of vehicles involved in the accident, the states of the accident, and the like. The elapsed time from the time point where the accident information is first received is also measured.

Information relating to a traffic jam caused by the accident is also transmitted from the other vehicles moving toward the scene of the accident or moving farther apart from the scene of the accident. A lane in which traffic is jammed is judged from the directions of the progress of the vehicles. A starting point and an ending point of the traffic jam are judged from the positions of the vehicles which have transmitted the traffic jam information.

The information relating to the accident and the traffic jam thus obtained are transmitted from the center to a repeater in not only an area where the accident and the traffic jam have occurred but also an area in the vicinity thereof. Since repeater IDs (transmission addresses) are assigned to repeaters, the center can designate a repeater and send the information to the repeater.

The on-vehicle apparatus 3 on the vehicle which has received the accident information and the traffic jam information reports the information to a driver by graphic display, message display using characters or the like, or voice output using sound, speech or the like, as in the first embodiment. For example, when the driver selects the information report mode using the touch switch 31E and selects the accident information using the touch switch 31A, the accident information, along with a map, is displayed on the display device 25.

Figure 65:
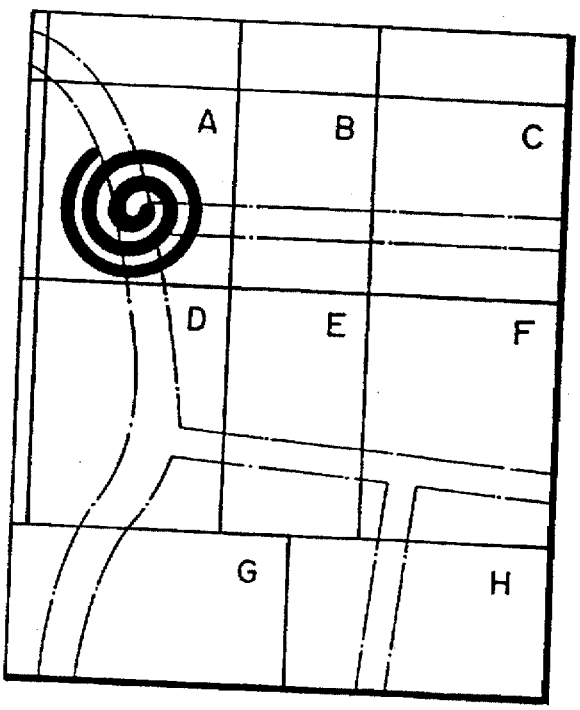
FIG. 65 illustrates an example of display of accident information.
Figure 66:
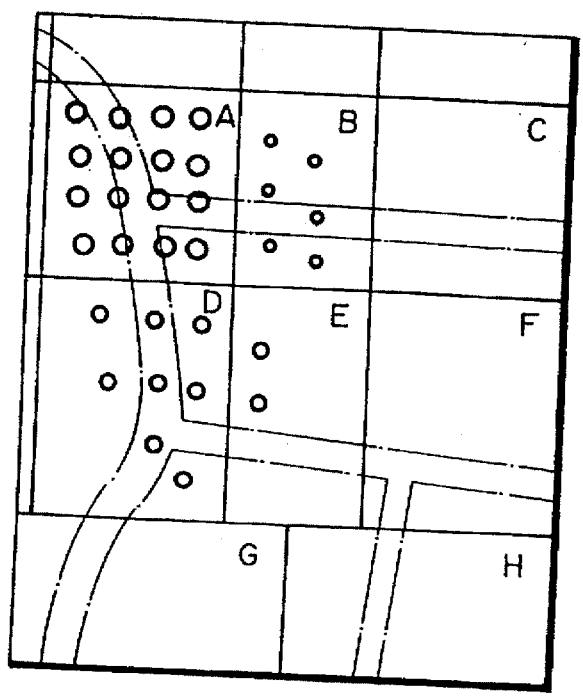
FIG. 66 illustrates another example of display of accident information.
Figure 67:
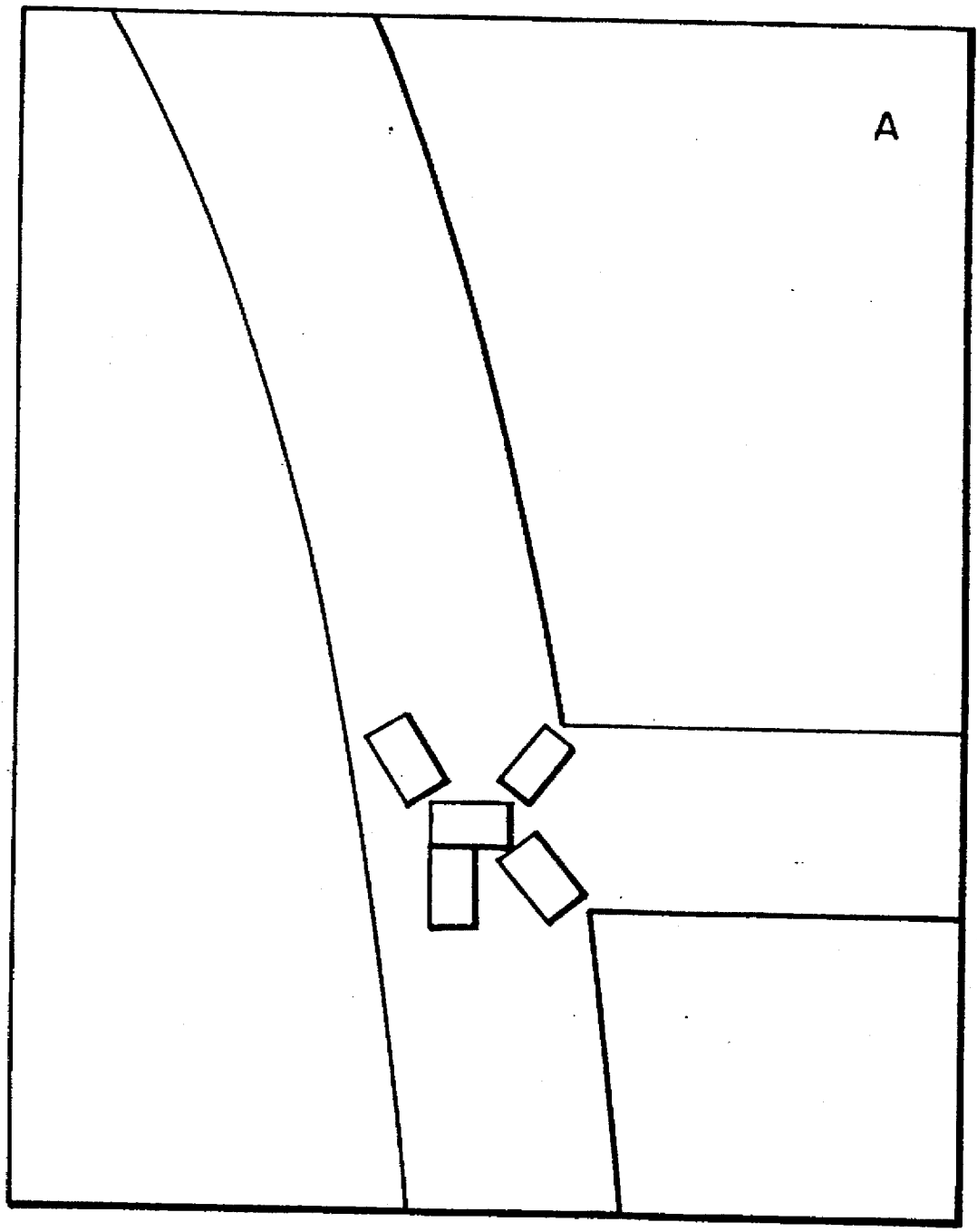
FIG. 67 illustrates an example of display of accident information.
Figure 68:
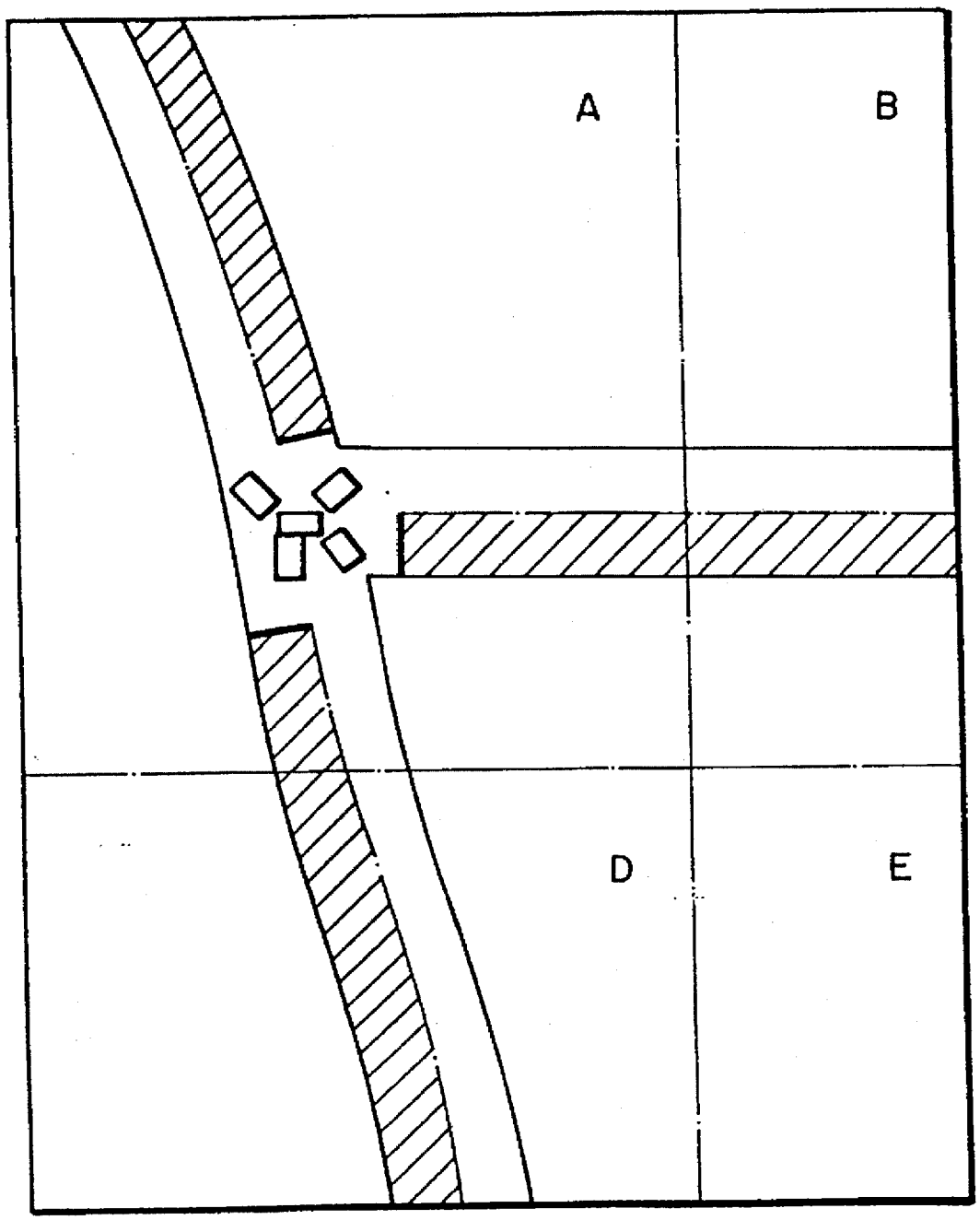
FIG. 68 illustrates another example of display of accident information.

For example, in the graphic display, the occurrence of an accident in an area A is first roughly displayed, as shown in FIGS. 65 and 66. The scene of the accident is displayed in an enlarged manner on the map so that the position thereof can be accurately judged, as shown in FIG. 67, in response to an instruction of the driver (e.g., by depressing the enlargement key 35) or automatically. When the traffic jam information is selected using the touch switch 31B, the range in which traffic is jammed is also displayed, as shown in FIG. 68.

The scale of the accident, the number of involved vehicles, the elapsed time from the occurrence of the accident, and the like are also displayed in addition to the position of the accident on the map using characters, or the like.

Examples of the message display and the voice output include "An accident occurs in an area A" (rough report), and "A medium-scale accident in which five vehicles are involved has occurred in a three-forked road in an area A about two in the afternoon" (detailed report).

The weather information will be also reported in various forms, in the same manner as described above.

Figure 69:
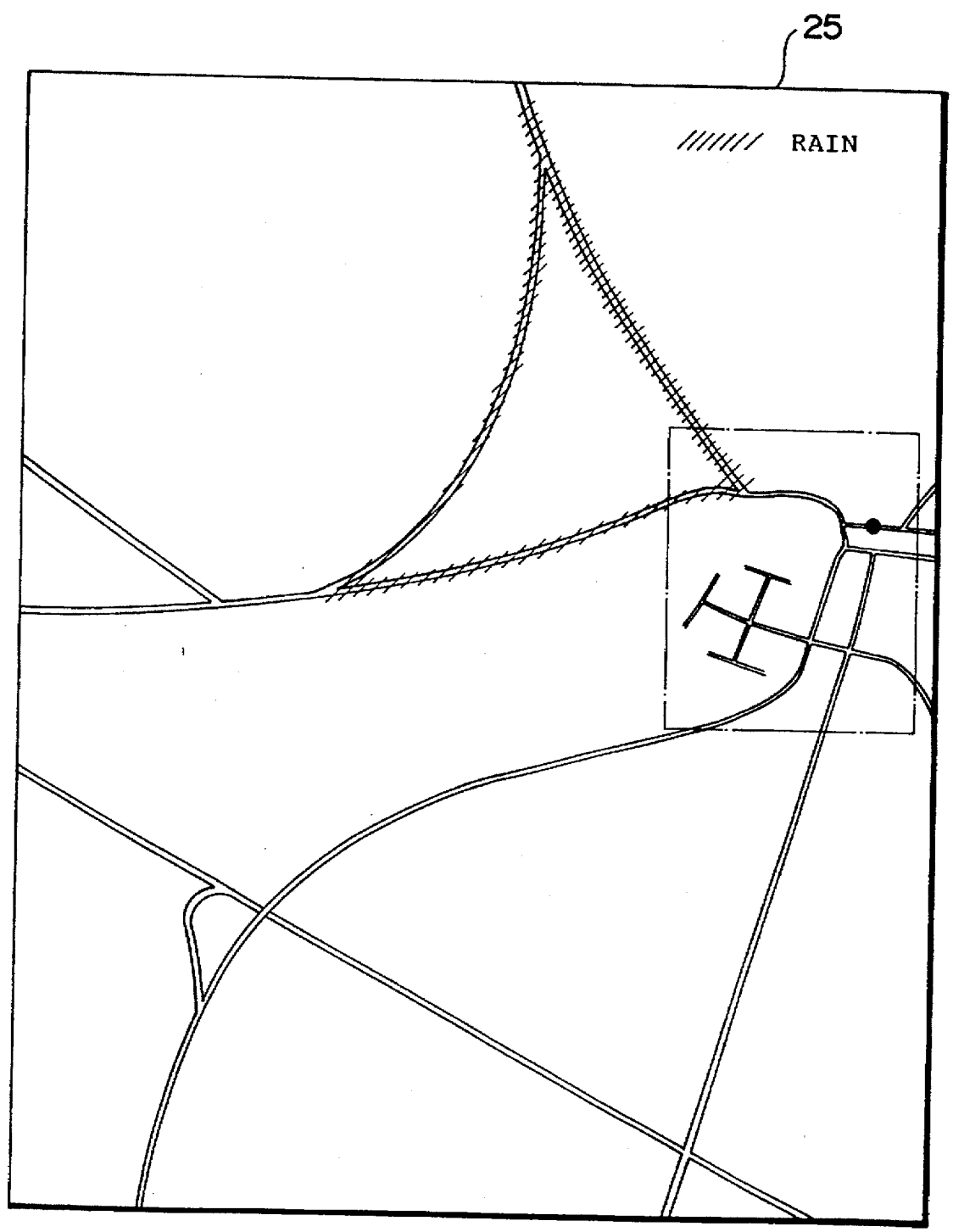
FIG. 69 illustrates an example of display of rain information.
Figure 70:
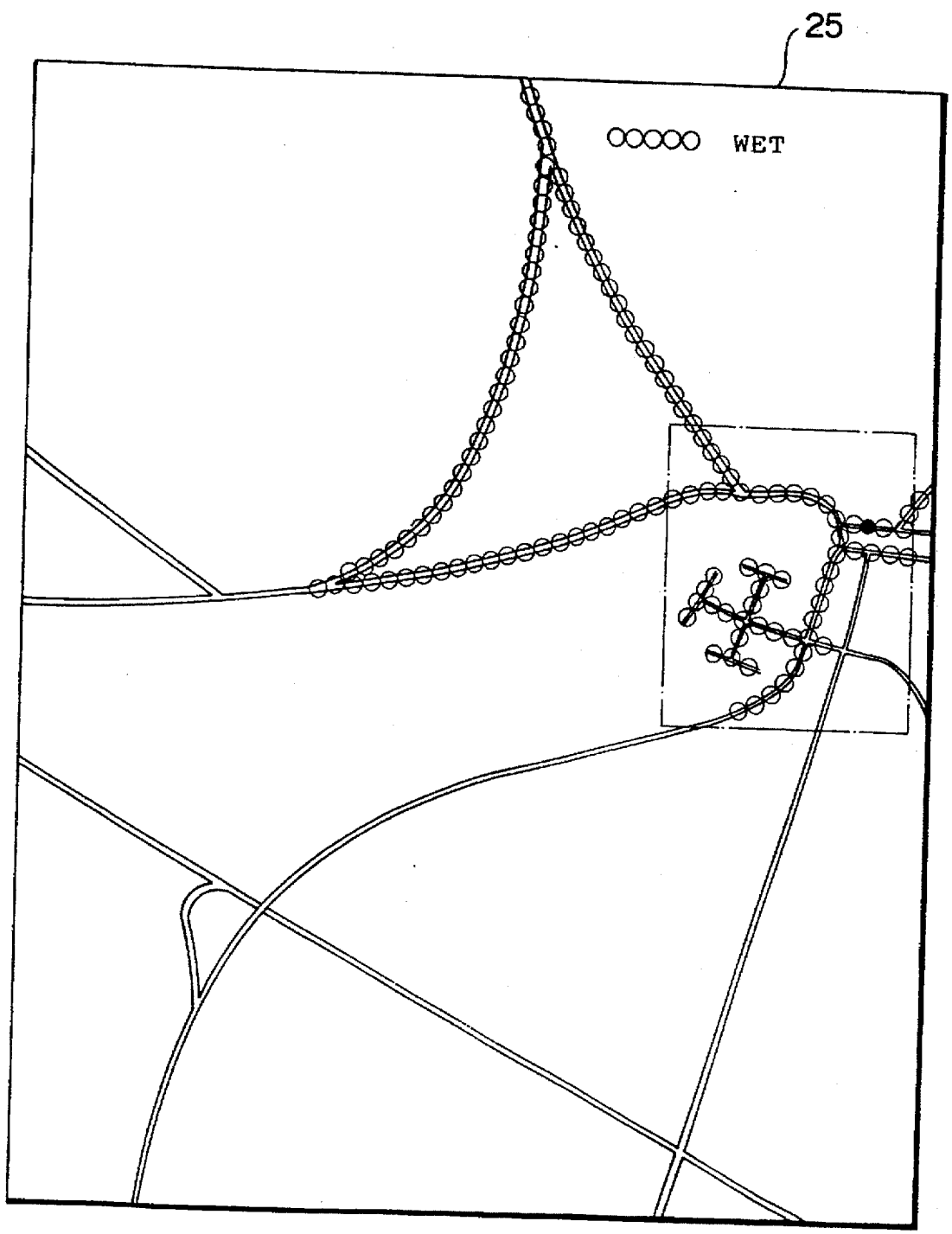
FIG. 70 illustrates an example of display of wet information.
Figure 71:
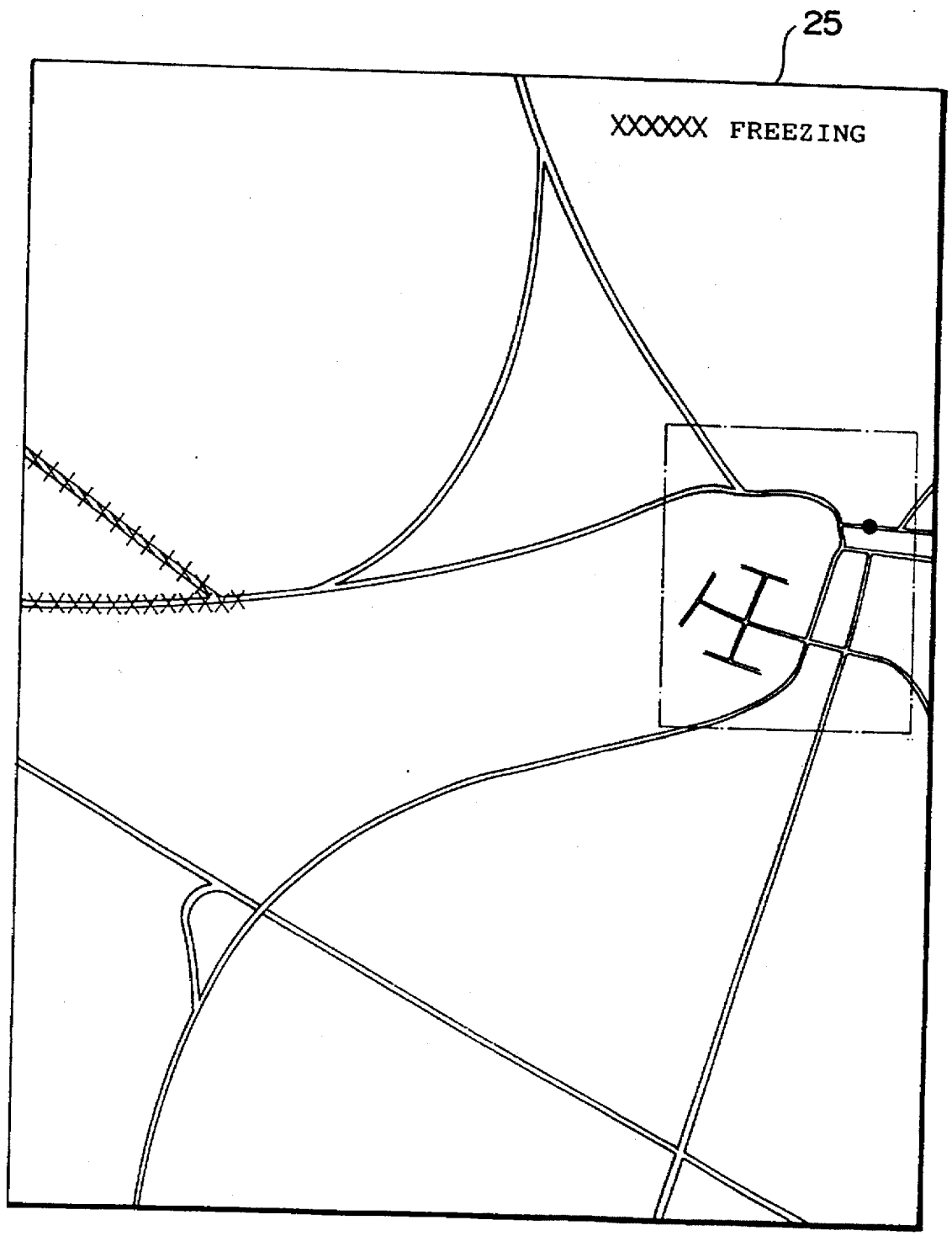
FIG. 71 illustrates an example of display of freezing information.
Figure 72:
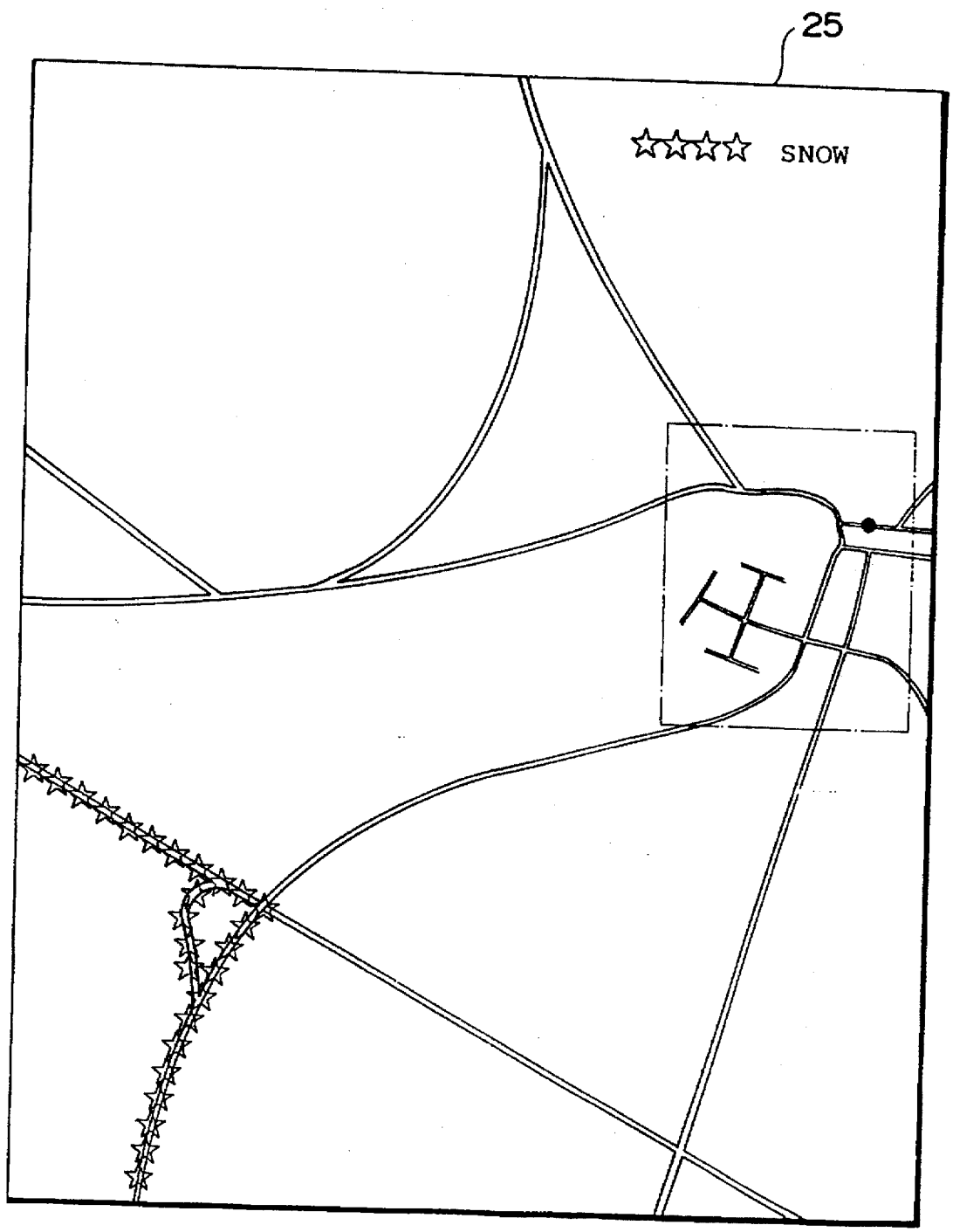
FIG. 72 illustrates an example of display of snow information.

For example, the driver selects the information report mode using the touch switch 31E and selects the weather information using the touch switch 31C. Consequently, a road in which it is raining is displayed on the display device 25, as shown in FIG. 69. The position of the present vehicle is also displayed (indicated by a black circle). When the touch switch 31C is depressed again, the display is switched into display of a wet road, as shown in FIG. 70. When the driver further depresses the touch switch 31C, a frozen road is displayed, as shown in FIG. 71. When the driver further depresses the touch switch 31C, a road in which it is snowing or a road covered with snow is displayed, as shown in FIG. 72. The display is thus changed every time the touch switch 31C is depressed. The plurality of weather conditions (road surface conditions) may be displayed one over the other on one map.

Although the function of the repeater 4 is to repeat a telegraphic message from the on-vehicle apparatus 3 to the center 9 and from the center 9 to the on-vehicle apparatus 3, as described above, the repeater may have the following function.

When local information is transmitted to the repeater 4 from the on-vehicle apparatus 3 on the vehicle 2, the repeater 4 transmits the information as is or after processing to vehicles existing in an area of which it takes charges. The same is true for information to be quickly reported such as accident information. When accident information is sent from a plurality of vehicles, for example, the repeater performs the above-mentioned processing of the center in place of the center, and directly transmits the results of the processing to the vehicles without via the center. The repeater thus has the function of selectively transmitting information from vehicles to the center and processing the information as required to transmit the information to the vehicles.

The repeater 4 also has the function of processing information of vehicles from an area of which it takes charge to transmit the information to the center 9. For example, when rain information is sent from 50 vehicles, the information is transmitted to the center after putting the information together as, for example, data "rain, 50 vehicles" in the area managed by the repeater 4. Consequently, the burden of the center is reduced.

The repeater 4 may be also provided with various sensors such as the above-mentioned laser radar so that the repeater itself collects and processes various information to transmit the information to the center or the vehicles.

The repeaters are assigned transmission addresses, as described above. The center designates a plurality of repeaters with respect to general information and transmits the information to the repeaters. The center transmits local information only to a repeater in one area. The center or the repeater may assign a telegraphic message including information a vehicle ID (a vehicle address) and sent the information only to particular vehicles.

Fourth Embodiment

In the first to third embodiments, the on-vehicle apparatus 3 carried on the vehicle basically collects information relating to the present vehicle and environmental circumstances, and processes the information as required. An owner of the vehicle must install an on-vehicle apparatus having the function of collecting information, processing the information as required, and transmitting the information to a repeater or a center. A driver must offer labor of manually entering information, as in the first embodiment. Further, in order to collect, process and transmit information, power must be supplied to the on-vehicle apparatus from a battery carried on the vehicle. On the other hand, there may be a driver who does not provide information and only receives information.

The traffic information system according to the present invention presumes that there is a person who collects various information and provides the collected information. It can be said that the system does not hold if there exists no information provider.

In the sense, it is important to reward an information provider depending on the amount of information provided by the information provider. The fourth embodiment is directed to rewarding an information provider depending on the amount of information provided by the information provider.

An identification code of a person who has the will to provide information and carries the above-mentioned on-vehicle apparatus 3 on a vehicle in his/her possession is previously registered in a memory 53 of a center computer 50 in a center 9, as shown in FIG. 73. The identification code is herein a vehicle ID. There is provided an area storing the number of times of provision of information with respect to the corresponding vehicle ID.

Figure 74:
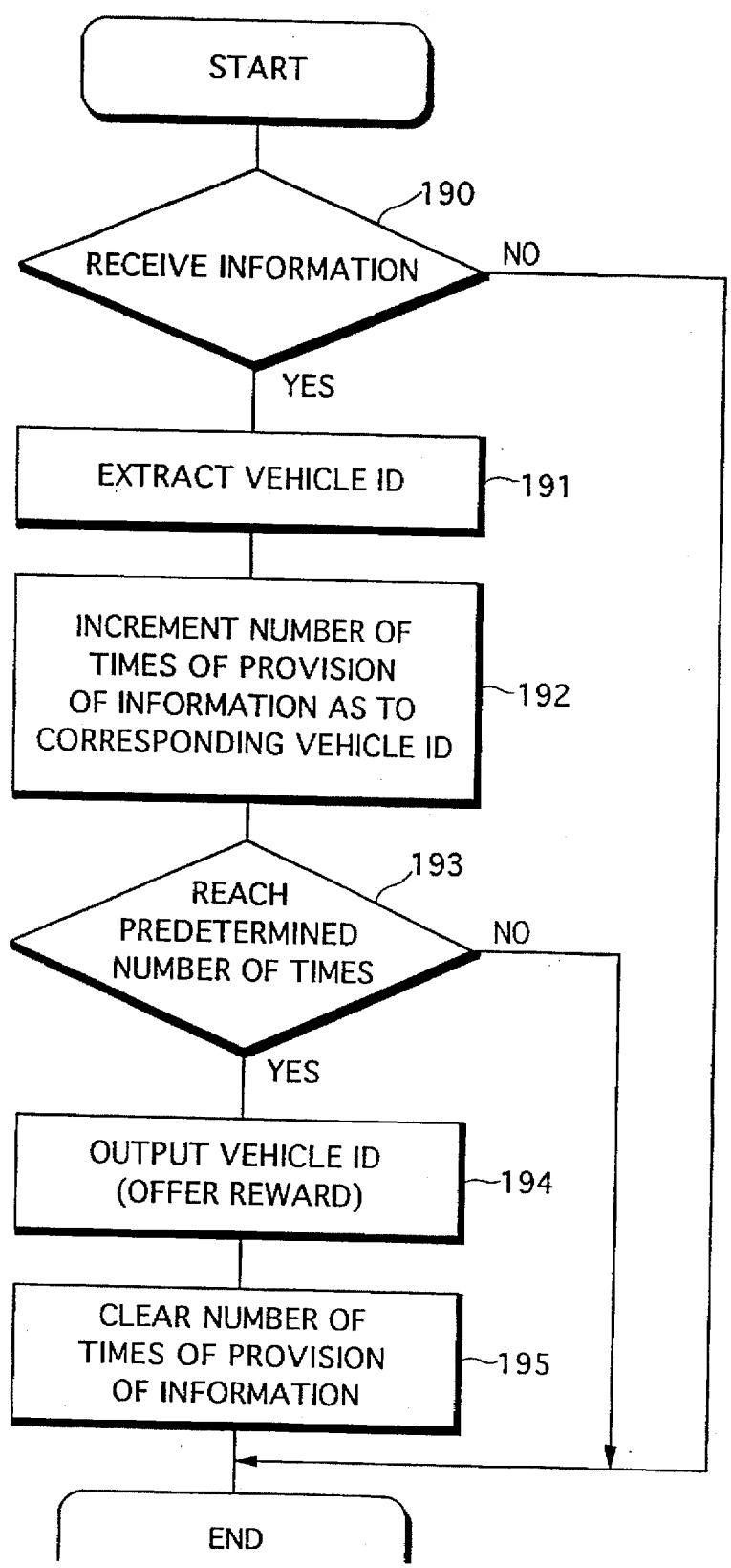
FIG. 74 is a flow chart showing the procedure for offering a reward to an information provider.

FIG. 74 shows processing in the center. In this processing, information delivering processing of the center as in the above-mentioned first to third embodiments is omitted in this processing.

When a telegraphic message including various information from vehicles is received directly or via a repeater 4 from the on-vehicle apparatus 3 on the vehicle (step 190), the computer 50 in the center extracts a vehicle ID included in the telegraphic message (step 191).

The number of times of provision of information which is stored in the memory 53 is incremented by one with respect to the corresponding vehicle ID extracted (step 192).

When the number of times of provision of information has reached a predetermined number of times (10 times, 20 times or 50 times, 100 times, etc.), the vehicle ID (the name, the address, etc. of an owner which are registered in relation to the vehicle ID, if required) is outputted from a printer or is displayed on a display device (step 194).

A reward such as a prize, a commodity or particular information is offered to a person who provided information a predetermined number of times.

The number of times of provision of information corresponding to the vehicle ID which has reached a predetermined number of times is cleared (step 195). The number of times of provision of information will be counted starting with zero again with respect to the vehicle ID.

When the number of times of provision of information reaches a predetermined number of times, the vehicle ID need not be immediately outputted. The vehicle ID with regard to which the number of times of provision of information has exceeded a predetermined number of times may be periodically outputted. In this case, the result obtained in subtracting a predetermined number of times from the number of times of provision of information at a time where the vehicle ID is outputted is stored with respect to the corresponding ID as a new number of times of provision of information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A traffic information system comprising:

an individual information collecting apparatus, which is to be used on a vehicle, for collecting individual information including information relating to traffic; and a center apparatus for creating synthesis information relating to a region within a predetermined range on the basis of the individual information transmitted from said individual information collecting apparatus, wherein said individual information collecting apparatus comprises:

position sensing means for measuring at least a position to produce position data, manual information entering means for manually entering environmental information to be transmitted to said center apparatus, said environmental information representing environmental circumstances, a first transmitter for transmitting a signal representing individual information including the position data produced by said position sensing means and the environmental information entered by said manual information entering means, a first receiver for receiving a signal representing the synthesis information transmitted from said center apparatus, and a reporting device for reporting the synthesis information received by said first receiver, and wherein said center apparatus comprises:

a second receiver for receiving the signal representing the individual information transmitted from said first transmitter in said individual information collecting apparatus, information processing means for creating the synthesis information relating to said region within said predetermined range on the basis of said individual information received by said second receiver, and second transmitting means for transmitting a signal representing the synthesis information created by said information processing means to said individual information collecting apparatus.

2. The traffic information system according to claim 1, wherein said individual information collecting apparatus comprises clocking means for measuring time, time data obtained by said clocking means being included in the individual information transmitted by said first transmitter.

3. The traffic information system according to claim 2, wherein said individual information collecting apparatus further comprises a storage device for storing an identification code of one of said individual information collecting apparatus and the vehicle carrying the individual information collecting apparatus, said first transmitter in said individual information collecting apparatus transmits at least the position data, the time data and the identification code at least twice at a predetermined time interval, and transmits, in response to entry of the environmental information from said manual information entering means, the entered information and at least the identification code, and said information processing means in said center apparatus judges the traveling direction of the vehicle carrying said individual information collecting apparatus on the basis of the position data, the time data and the identification code which are received at least twice.

4. The traffic information system according to claim 1, wherein information relating to at least one of an accident, a traffic jam and weather is entered by said manual information entering means in said individual information collecting apparatus.

5. An information collecting apparatus, used in a traffic information system comprising said information collecting apparatus, which is to be used on a vehicle, for collecting individual information including information relating to traffic and a center apparatus for creating synthesis information relating to a region within a predetermined range on the basis of the individual information transmitted from said information collecting apparatus, said information collecting apparatus comprising:

position sensing means for measuring at least a position to produce position data;

manual information entering means for manually entering environmental information to be transmitted to said center apparatus, said environmental information representing environmental circumstances; and a first transmitter for transmitting a signal representing individual information including the position data produced by said position sensing means, an identification code relating to said information collecting apparatus, and the environmental information entered by said manual information entering means.

6. The information collecting apparatus according to claim 5, further comprising clocking means for measuring time, time data obtained by said clocking means being included in the individual information transmitted by said first transmitter.

7. The information collecting apparatus according to claim 5, further comprising a first receiver for receiving a signal representing synthesis information transmitted from said center apparatus, and a reporting device for reporting the synthesis information received by said first receiver.

8. The information collecting apparatus according to claim 5, further comprising a car navigation system, the car navigation system comprising at least said position sensing means and said manual information entering means.

9. A traffic information system comprising an individual information collecting apparatus, which is to be used on a vehicle, for collecting individual information relating to the travel of the vehicle and a center apparatus for creating traffic information in a region within a predetermined range on the basis of the individual information transmitted from said individual information collecting apparatus, wherein said individual information collecting apparatus comprises position sensing means for measuring at least a position to produce position data, a storage device for storing an identification code of said individual information collecting apparatus or the vehicle carrying the individual information collecting apparatus, a first transmitter for transmitting individual information including the position data produced by said position sensing means and the identification code stored in said storage device at least twice at a predetermined time interval, a first receiver for receiving the traffic information transmitted from said center apparatus, and a reporting device for reporting the traffic information received by said first receiver, and said center apparatus comprises a second receiver for receiving the individual information transmitted from said first transmitter in said individual information collecting apparatus, information processing means for creating the traffic information in a region within a predetermined range on the basis of the individual information received at least twice by said second receiver, and second transmitting means for transmitting the traffic information created by said information processing means to said individual information collecting apparatus.

10. The traffic information system according to claim 9, wherein said individual information collecting apparatus comprises clocking means for measuring time, time data obtained by said clocking means being included in said individual information transmitted by said first transmitter.

11. The traffic information system according to claim 9, wherein the traffic information created by said information processing means in said center apparatus is traffic jam information.

12. The traffic information system according to claim 11, wherein said traffic jam information includes the presence or absence of a traffic jam and the degree thereof.

13. The traffic information system according to claim 9, wherein said individual information collecting apparatus comprises vehicle speed sensing means for sensing the traveling speed of the vehicle carrying the individual information collecting apparatus, and said first transmitter transmits data representing the traveling speed sensed by said vehicle speed sensing means to said center apparatus.

14. An information collecting apparatus, used in a traffic information system comprising said information collecting apparatus, which is to be used on a vehicle, for collecting individual information relating to the travel of the vehicle and a center apparatus for creating traffic information in a region within a predetermined range on the basis of the individual information transmitted from said information collecting apparatus, comprising:

position sensing means for measuring at least a position to produce position data;

a storage device for storing an identification code of said information collecting apparatus or the vehicle carrying the information collecting apparatus; and a first transmitter for transmitting individual information including the position data produced by said position sensing means and the identification code stored in said storage device at least twice at a predetermined time interval.

15. The information collecting apparatus according to claim 14, further comprising clocking means for measuring time, time data obtained by said clocking means being included in the individual information transmitted by said first transmitter.

16. The information collecting apparatus according to claim 14, further comprising a first receiver for receiving the traffic information transmitted from said center apparatus, and a reporting device for reporting the traffic information received by said first receiver.

17. A traffic information system comprising an individual information collecting apparatus, which is to be used on a vehicle, for collecting individual information including information relating to traffic and a center apparatus for creating synthesis information relating to a region within a predetermined range on the basis of the individual information transmitted from said individual information collecting apparatus, wherein said individual information collecting apparatus comprises position sensing means for measuring at least a position to produce position data, a radar for projecting an electromagnetic wave into a predetermined range, receiving its reflected wave, and creating environmental information representing environmental circumstances of said vehicle on the basis of a received wave signal, a first transmitter for transmitting individual information including the position data produced by said position sensing means and the environmental information created by said radar, a first receiver for receiving the synthesis information transmitted from said center apparatus, and a reporting device for reporting the synthesis information received by said first receiver, and said center apparatus comprises a second receiver for receiving said individual information transmitted from said first transmitter in said individual information collecting apparatus, information processing means for creating the synthesis information relating to a region within a predetermined range on the basis of said individual information received by said second receiver, and second transmitting means for transmitting the synthesis information created by said information processing means to said individual information collecting apparatus.

18. The traffic information system according to claim 17, wherein said individual information collecting apparatus comprises clocking means for measuring time, time data obtained by said clocking means being included in the individual information transmitted by said first transmitter.

19. The traffic information system according to claim 17, wherein the environmental information created by said radar is at least one of the position, the shape, the direction of movement, and the speed of an object to be sensed existing in the vicinity of said vehicle, the number of vehicles, the distance between vehicles, and the shape of a road.

20. The traffic information system according to claim 17, wherein said individual information collecting apparatus further comprises traffic information creating means for creating traffic information on the basis of the environmental information created by said radar, and said first transmitter transmits the traffic information created by said traffic information creating means to said center apparatus.

21. The traffic information system according to claim 17, wherein said individual information collecting apparatus further comprises vehicle speed sensing means for sensing the speed of said vehicle.

22. An information collecting apparatus, used in a traffic information system comprising said information collecting apparatus, which is to be used on a vehicle, for collecting individual information including information relating to traffic and a center apparatus for creating synthesis information relating to a region within a predetermined range on the basis of the individual information transmitted from said information collecting apparatus, comprising:

position sensing means for measuring at least a position to produce position data;

a radar for projecting an electromagnetic wave into a predetermined range, receiving its reflected wave, and creating environmental information representing environmental circumstances of said vehicle on the basis of a received wave signal; and a first transmitter for transmitting individual information including the position data produced by said position sensing means and the environmental information created by said radar.

23. The information collecting apparatus according to claim 22, further comprising clocking means for measuring time, time data obtained by said clocking means being included in the individual information transmitted by said first transmitter.

24. The information collecting apparatus according to claim 22, further comprising a first receiver for receiving the synthesis information transmitted from said center apparatus, and a reporting device for reporting the synthesis information received by said first receiver.

25. The information collecting apparatus according to claim 22, wherein the environmental information created by said radar is at least one of the position, the shape, the direction of movement, and the speed of an object to be sensed existing in the vicinity of said vehicle, the number of vehicles, the distance between vehicles, and the shape of a road.

26. The information collecting apparatus according to claim 22, further comprising traffic information creating means for creating traffic information on the basis of the environmental information created by said radar, said first transmitter transmitting the traffic information created by said traffic information creating means to said center apparatus.

27. The information collecting apparatus according to claim 22, further comprising vehicle speed sensing means for sensing the speed of said vehicle.

28. A traffic information system comprising an individual information collecting apparatus, which is to be used on a vehicle, for collecting individual information, including information relating to traffic, and a center apparatus for creating synthesis information relating to a region within a predetermined range on the basis of the individual information transmitted from said individual information collecting apparatus, wherein said individual information collecting apparatus comprises:

position sensing means for measuring at least a position to produce position data, a sensor for sensing information representing natural environmental circumstances, including one of a road surface circumstance and a weather circumstance, based on a physical amount sensed from outside said vehicle, a first transmitter for transmitting individual information including the position data produced by said position sensing means and the information sensed by said sensor, a first receiver for receiving the synthesis information transmitted from said center apparatus, and a reporting device for reporting the synthesis information received by said first receiver, and wherein said center apparatus comprises:

a second receiver for receiving said individual information transmitted from said first transmitter in said individual information collecting apparatus, information processing means for creating the synthesis information relating to said region within said predetermined range on the basis of said individual information received by said second receiver, and second transmitting means for transmitting the synthesis information created by said information processing means to said individual information collecting apparatus.

29. The traffic information system according to claim 28, wherein said individual information collecting apparatus comprises clocking means, time data obtained by said clocking means being included in said individual information transmitted by said first transmitter.

30. The traffic information system according to claim 28, wherein said sensor is at least one of a sensor for sensing traffic information and a sensor for sensing weather information.

31. The traffic information system according to claim 28, wherein said sensor is at least one of a sensor for sensing accident information, a sensor for sensing traffic jam information, and a sensor for sensing weather information.

32. The traffic information system according to claim 28, wherein said sensor is at least one of a laser radar, a road surface condition discriminator and a rainfall sensor.

33. An information collecting apparatus, used in a traffic information system comprising said information collecting apparatus, which is to be used on a vehicle, for collecting individual information, including information relating to traffic, and a center apparatus for creating synthesis information relating to a region within a predetermined range on the basis of the individual information transmitted from said information collecting apparatus, said information collecting apparatus comprising:

position sensing means for measuring at least a position to produce position data;

a sensor for sensing information representing natural environmental circumstances, including one of a road surface circumstance and a weather circumstance, based on a physical amount sensed from outside the vehicle; and a first transmitter for transmitting individual information including the position data produced by said position sensing means, an identification code relating to said information collecting apparatus, and the information sensed by said sensor.

34. The information collecting apparatus according to claim 33, further comprising clocking means for measuring time, time data obtained by said clocking means being included in the individual information transmitted by said first transmitter.

35. The information collecting apparatus according to claim 33, further comprising a first receiver for receiving the synthesis information transmitted from said center apparatus, and a reporting device for reporting the synthesis information received by said first receiver.

36. The information collecting apparatus according to claim 33, wherein said sensor is at least one of a sensor for sensing traffic information and a sensor for sensing weather information.

37. The information collecting apparatus according to claim 33, wherein said sensor is at least one of a sensor for sensing accident information, a sensor for sensing traffic jam information and a sensor for sensing weather information.

38. The information collecting apparatus according to claim 33, wherein said sensor is at least one of a laser radar, a road surface condition discriminator and a rainfall sensor.

39. The traffic information system according to claim 1, further comprising a repeater for repeating communication between said individual information collecting apparatus and said center apparatus.

40. The traffic information system according to claim 9, further comprising a repeater for repeating communication between said individual information collecting apparatus and said center apparatus.

41. The traffic information system according to claim 17, further comprising a repeater for repeating communication between said individual information collecting apparatus and said center apparatus.

42. The traffic information system according to claim 28, further comprising a repeater for repeating communication between said individual information collecting apparatus and said center apparatus.

43. A vehicle carrying the information collecting apparatus according to claim 5.

44. A vehicle carrying the information collecting apparatus according to claim 14.

45. A vehicle carrying the information collecting apparatus according to claim 22.

46. A vehicle carrying the information collecting apparatus according to claim 33.

47. The traffic information system according to claim 1, wherein said first receiver and said reporting device are provided in a large-sized reporting apparatus installed in the vicinity of the road instead of being provided in said individual information collecting apparatus, and said second transmitting means transmits said synthesis information to said large-sized reporting apparatus.

48. The traffic information system according to claim 9, wherein said first receiver and said reporting device are provided in a large-sized reporting apparatus installed in the vicinity of the road instead of being provided in said individual information collecting apparatus, and said second transmitting means transmits said synthesis information to said large-sized reporting apparatus.

49. The traffic information system according to claim 17, wherein said first receiver and said reporting device are provided in a large-sized reporting apparatus installed in the vicinity of the road instead of being provided in said individual information collecting apparatus, and said second transmitting means transmits said synthesis information to said large-sized reporting apparatus.

50. The traffic information system according to claims 28, wherein said first receiver and said reporting device are provided in a large-sized reporting apparatus installed in the vicinity of the road instead of being provided in said individual information collecting apparatus, and said second transmitting means transmits said synthesis information to said large-sized reporting apparatus.

51. The traffic information system according to claim 3, wherein said center apparatus further comprises means for storing for each identification code the number of times of receiving of said individual information transmitted from said individual information collecting apparatus having the identification code, and means for outputting data relating to the identification code corresponding to the number of times of receiving which reached a predetermined value.

52. The traffic information system according to claim 9, wherein said center apparatus further comprises means for storing for each identification code the number of times of receiving of said individual information transmitted from said individual information collecting apparatus having the identification code, and means for outputting data relating to the identification code corresponding to the number of times of receiving which reached a predetermined value.

53. The traffic information system according to claim 17, wherein said center apparatus further comprises means for storing for each identification code the number of times of receiving of said individual information transmitted from said individual information collecting apparatus having the identification code, and means for outputting data relating to the identification code corresponding to the number of times of receiving which reached a predetermined value.

54. The traffic information system according to claim 28, wherein said center apparatus further comprises means for storing for each identification code the number of times of receiving of said individual information transmitted from said individual information collecting apparatus having the identification code, and means for outputting data relating to the identification code corresponding to the number of times of receiving which reached a predetermined value.

55. A traffic information system comprising an individual information collecting apparatus, which is to be used on a vehicle, for collecting and transmitting individual information relating to traffic including an identification code of the vehicle carrying the individual information collecting apparatus and a center apparatus for creating synthesis information on the basis of the individual information transmitted from said individual information collecting apparatus, wherein said center apparatus comprises means for storing for each identification code the number of times of receiving of said individual information transmitted from said individual information collecting apparatus having the identification code, and means for outputting data relating to the identification code corresponding to the number of times of receiving which reached a predetermined value.

56. A method for collecting and synthesizing traffic information, comprising the steps of:

(a) providing an individual information collecting apparatus, suitable for use on a vehicle;

(b) storing an identification code corresponding to said individual information collecting apparatus;

(c) manually entering environmental information into said individual information collection apparatus;

(d) transmitting information, including environmental information and said identification code, to a center apparatus;

(e) creating traffic information, using said center apparatus, on the basis of the transmitted information; and (f) transmitting the traffic information to said individual information collecting apparatus for reporting the traffic information.

* * * * *